(12) United States Patent
Zass

(10) Patent No.: US 12,447,963 B2
(45) Date of Patent: **\*Oct. 21, 2025**

(54) CONTROLLING VEHICLES IN RESPONSE TO OUTRIGGERS

(71) Applicant: Ron Zass, Kiryat Tivon (IL)

(72) Inventor: Ron Zass, Kiryat Tivon (IL)

( * ) Notice: Subject to any disclaimer, the term of this patent is extended or adjusted under 35 U.S.C. 154(b) by 65 days.

This patent is subject to a terminal disclaimer.

(21) Appl. No.: 18/504,568

(22) Filed: Nov. 8, 2023

(65) Prior Publication Data

US 2024/0075929 A1 Mar. 7, 2024

Related U.S. Application Data

(63) Continuation of application No. 17/151,185, filed on Jan. 17, 2021, now Pat. No. 11,851,060.

(60) Provisional application No. 62/989,847, filed on Mar. 15, 2020.

(51) Int. Cl.
*B60W 30/18* (2012.01)
*B60W 10/30* (2006.01)
*E05F 15/70* (2015.01)

(52) U.S. Cl.
CPC ............ *B60W 30/18* (2013.01); *B60W 10/30* (2013.01); *E05F 15/70* (2015.01); *B60W 2420/403* (2013.01); *B60W 2420/54* (2013.01); *E05Y 2400/45* (2013.01); *E05Y 2900/148* (2013.01); *E05Y 2900/55* (2013.01)

(58) Field of Classification Search
CPC ................. B60W 30/18; B60W 10/30; B60W 2420/403; B60W 2420/54; E05F 15/70; E05Y 2400/45; E05Y 2900/148; E05Y 2900/55
See application file for complete search history.

(56) References Cited

U.S. PATENT DOCUMENTS

| | | | |
|---|---|---|---|
| 3,986,782 | A | 10/1976 | Durham |
| 10,108,867 | B1 * | 10/2018 | Vallespi-Gonzalez ....................... G06V 20/58 |
| 10,207,707 | B2 | 2/2019 | Kurata |
| 10,814,868 | B2 | 10/2020 | Seo |
| 10,967,884 | B2 | 4/2021 | Kozak |
| 11,409,283 | B2 * | 8/2022 | Marukawa ............. G06Q 30/06 |
| 11,511,770 | B2 * | 11/2022 | Ladd ........................ G06N 3/04 |
| 2010/0007500 | A1 | 1/2010 | Mestres |
| 2015/0195518 | A1 | 7/2015 | Shikii |
| 2017/0151982 | A1 | 6/2017 | Fujii |
| 2018/0111609 | A1 | 4/2018 | Woo |

(Continued)

*Primary Examiner* — Peter D Nolan
*Assistant Examiner* — Wae L Louie

(57) ABSTRACT

Systems, methods and non-transitory computer readable media for controlling vehicles in response to outriggers are provided. In some examples, images captured using image sensors from an environment of a first vehicle may be obtained. The images may be analyzed to detect a second vehicle. The images may be analyzed to determine that the second vehicle is connected to an outrigger. The images may be analyzed to determine a state of the outrigger. The first vehicle may be caused to initiate an action responding to the second vehicle based on the determined state of the outrigger. For example, in response to a first determined state of the outrigger, the first vehicle may be caused to initiate the action responding to the second vehicle, and in response to a second determined state of the outrigger, causing the first vehicle to initiate the action may be avoided.

20 Claims, 19 Drawing Sheets

(56) References Cited

U.S. PATENT DOCUMENTS

| | | |
|---|---|---|
| 2018/0224852 A1 | 8/2018 | Ito |
| 2018/0268700 A1 | 9/2018 | Aoki |
| 2019/0019045 A1 | 1/2019 | Ogura |
| 2019/0047469 A1 | 2/2019 | Nishiguchi |
| 2019/0073907 A1 | 3/2019 | Takaki |
| 2019/0179315 A1* | 6/2019 | Marukawa ............... G08G 1/16 |
| 2019/0283747 A1 | 9/2019 | Okabe |
| 2019/0286892 A1 | 9/2019 | Li |
| 2020/0223431 A1* | 7/2020 | Zass ....................... B60W 30/09 |
| 2020/0231160 A1* | 7/2020 | Zass ............... B60W 30/18163 |
| 2020/0327690 A1 | 10/2020 | Cai |
| 2020/0341479 A1 | 10/2020 | Kim |
| 2021/0056492 A1* | 2/2021 | Zass ....................... G06V 20/52 |
| 2021/0064051 A1* | 3/2021 | Dudar .................... B60N 2/002 |
| 2021/0139031 A1* | 5/2021 | Zass ....................... E05F 15/70 |
| 2021/0237736 A1 | 8/2021 | Keller |
| 2022/0032927 A1 | 2/2022 | Keene |
| 2022/0227373 A1* | 7/2022 | Harouche ............. B60W 40/04 |
| 2022/0292686 A1* | 9/2022 | Yasui .................... G06V 40/103 |
| 2022/0381081 A1* | 12/2022 | Katsu ................. B60R 16/0373 |

\* cited by examiner

800

710 Obtaining images captured from an environment of a first vehicle

720 Analyzing the images to detect a second vehicle

830 Analyzing the images to determine that the second vehicle is connected to a lift 840 Analyzing the images to determine a state of the lift 850 In response to a first determined state of the lift, causing the first vehicle to initiate an action responding to the second vehicle

- 710 Obtaining images captured from an environment of a first vehicle
- 720 Analyzing the images to detect a second vehicle
- 1030 Analyzing the images to determine that the second vehicle is connected to a pump
- 1040 Analyzing the images to determine a state of the pump
- 1050 In response to a first determined state of the pump, causing the first vehicle to initiate an action responding to the second vehicle

- 710 Obtaining images captured from an environment of a first vehicle
- 1220 Analyzing the images to detect an object
- 1230 Analyzing the images to determine whether the object is carried by a second vehicle
- 1240 In response to a determination that the object is not carried by a second vehicle, causing the first vehicle to initiate an action responding to the object
- 1250 In response to a determination that the object is carried by a second vehicle, forgoing causing the first vehicle to initiate the action

| 710 Obtaining images captured from an environment of a first vehicle |

| 720 Analyzing the images to detect a second vehicle |

| 1330 Analyzing the images to determine a state of a door of the second vehicle |

| 1340 In response to a first determined state of the door, causing the first vehicle to initiate an action responding to the second vehicle |

| 710 Obtaining images captured from an environment of a first vehicle |

| 720 Analyzing the images to detect a second vehicle |

| 1430 Analyzing the images to determine a state of a user associated with the second vehicle |

| 1440 In response to a first determined state of the user, causing the first vehicle to initiate an action responding to the second vehicle |

710 Obtaining images captured from an environment of a first vehicle

720 Analyzing the images to detect a second vehicle

1530 Analyzing the images to determine at least one of a cargo loading event associated with the second vehicle and a cargo unloading event associated with the second vehicle 1540 In response to the determined at least one of cargo loading event associated with the second vehicle and cargo unloading event associated with the second vehicle, causing the first vehicle to initiate an action responding to the second vehicle

| 710 Obtaining images captured from an environment of a first vehicle |
|---|

| 720 Analyzing the images to detect a second vehicle |
|---|

| 1630 Analyzing the images to determine that the second vehicle is a street cleaning vehicle |
|---|

| 1640 In response to the determination that the second vehicle is a street cleaning vehicle, causing the first vehicle to initiate an action responding to the second vehicle |
|---|

| 710 Obtaining images captured from an environment of a first vehicle |
|---|

| 720 Analyzing the images to detect a second vehicle |
|---|

| 1730 Analyzing the images to determine a state of a hood of the second vehicle |
|---|

| 1740 In response to a first determined state of the hood, causing the first vehicle to initiate an action responding to the second vehicle |
|---|

| 710 Obtaining images captured from an environment of a first vehicle |

| 720 Analyzing the images to detect a second vehicle |

| 1830 Analyzing the images to determine a state of a trunk lid of the second vehicle |

| 1840 In response to a first determined state of the trunk lid, causing the first vehicle to initiate an action responding to the second vehicle |

| 710 Obtaining images captured from an environment of a first vehicle |

| 720 Analyzing the images to detect a second vehicle |

| 1930 Analyzing the images to determine that the second vehicle emits smoke not through an exhaust system |

| 1940 In response to the determination that the second vehicle emits smoke not through an exhaust system, causing the first vehicle to initiate an action responding to the second vehicle |

| 710 Obtaining images captured from an environment of a first vehicle |

| 2020 Analyzing the images to detect a two-wheeler vehicle |

| 2030 Analyzing the images to determine whether at least one rider rides the two-wheeler vehicle |

| 2040 In response to a determination that no rider rides the two-wheeler vehicle, causing the first vehicle to initiate an action responding to the two-wheeler vehicle |

| 710 Obtaining images captured from an environment of a first vehicle |

| 720 Analyzing the images to detect a second vehicle |

| 2130 Analyzing the images to determine that the second vehicle is a winter service vehicle |

| 2140 In response to the determination that the second vehicle is a winter service vehicle, causing the first vehicle to initiate an action responding to the second vehicle |

| 710 Obtaining images captured from an environment of a first vehicle |

↓

| 720 Analyzing the images to detect a second vehicle |

↓

| 2230 Analyzing the images to determine that the second vehicle is a waste collection vehicle |

↓

| 2240 In response to the determination that the second vehicle is a waste collection vehicle, causing the first vehicle to initiate an action responding to the second vehicle |

| 710 Obtaining images captured from an environment of a vehicle |

↓

| 2320 Analyzing the images to detect a first window in the environment |

↓

| 2330 Navigating the vehicle to a stopping position, where the stopping position of the vehicle is positioned at a selected position with respect to the first window |

FIG. 23

CONTROLLING VEHICLES IN RESPONSE TO OUTRIGGERS

CROSS-REFERENCE TO RELATED APPLICATIONS

This application is a continuation of U.S. patent application Ser. No. 17/151,185, filed on Jan. 17, 2021, which claims the benefit of priority of U.S. Provisional Patent Application No. 62/989,847, filed on Mar. 15, 2020, the disclosures of which incorporated herein by reference in their entirety.

BACKGROUND OF THE INVENTION

Technological Field

The disclosed embodiments generally relate to systems, methods and computer readable media for controlling vehicles and vehicle related systems. More specifically, the disclosed embodiments relate to systems, methods and computer readable media for controlling vehicles and vehicle related systems in response to outriggers.

Background Information

Usage of vehicles is common and key to many everyday activities.

Audio and image sensors, as well as other sensors, are now part of numerous devices, from mobile phones to vehicles, and the availability of audio data and image data, as well as other information produced by these devices, is increasing.

SUMMARY OF THE INVENTION

In some embodiments, systems, methods and computer readable media for controlling vehicles and vehicle related systems are provided.

In some embodiments, systems, methods and computer readable media for controlling vehicles in response to cranes are provided. For example, one or more images captured using one or more image sensors from an environment of a first vehicle may be obtained. The one or more images may be analyzed to detect a second vehicle. The one or more images may be analyzed to determine that the second vehicle is connected to a crane. The one or more images may be analyzed to determine a state of the crane. In response to a first determined state of the crane, the first vehicle may be caused to initiate an action responding to the second vehicle, and in response to a second determined state of the crane, causing the first vehicle to initiate the action may be withheld.

In some embodiments, systems, methods and computer readable media for controlling vehicles in response to lifts are provided. For example, one or more images captured using one or more image sensors from an environment of a first vehicle may be obtained. The one or more images may be analyzed to detect a second vehicle. The one or more images may be analyzed to determine that the second vehicle is connected to a lift. The one or more images may be analyzed to determine a state of the lift. In response to a first determined state of the lift, the first vehicle may be caused to initiate an action responding to the second vehicle, and in response to a second determined state of the lift, causing the first vehicle to initiate the action may be withheld.

In some embodiments, systems, methods and computer readable media for controlling vehicles in response to outriggers are provided. For example, one or more images captured using one or more image sensors from an environment of a first vehicle may be obtained. The one or more images may be analyzed to detect a second vehicle. The one or more images may be analyzed to determine that the second vehicle is connected to an outrigger. The one or more images may be analyzed to determine a state of the outrigger. In response to a first determined state of the outrigger, the first vehicle may be caused to initiate an action responding to the second vehicle, and in response to a second determined state of the outrigger, causing the first vehicle to initiate the action may be withheld.

In some embodiments, systems, methods and computer readable media for controlling vehicles in response to pumps are provided. For example, one or more images captured using one or more image sensors from an environment of a first vehicle may be obtained. The one or more images may be analyzed to detect a second vehicle. The one or more images may be analyzed to determine that the second vehicle is connected to a pump. The one or more images may be analyzed to determine a state of the pump. In response to a first determined state of the pump, the first vehicle may be caused to initiate an action responding to the second vehicle, and in response to a second determined state of the pump, causing the first vehicle to initiate the action may be withheld.

In some embodiments, systems, methods and computer readable media for controlling vehicles in response to pipes are provided. For example, one or more images captured using one or more image sensors from an environment of a first vehicle may be obtained. The one or more images may be analyzed to detect a second vehicle. The one or more images may be analyzed to determine that the second vehicle is connected to a pipe. The one or more images may be analyzed to determine a state of the pipe. In response to a first determined state of the pipe, the first vehicle may be caused to initiate an action responding to the second vehicle, and in response to a second determined state of the pipe, causing the first vehicle to initiate the action may be withheld.

In some embodiments, systems, methods and computer readable media for controlling vehicles in response to objects are provided. For example, one or more images captured using one or more image sensors from an environment of a first vehicle may be obtained. The one or more images may be analyzed to detect an object. It may be determined whether the object is carried by a second vehicle. In response to a determination that the object is not carried by a second vehicle, the first vehicle may be caused to initiate an action responding to the object, and in response to a determination that the object is carried by a second vehicle, causing the first vehicle to initiate the action may be withheld.

In some embodiments, systems, methods and computer readable media for controlling vehicles based on doors of other vehicles are provided. For example, one or more images captured using one or more image sensors from an environment of a first vehicle may be obtained. The one or more images may be analyzed to detect a second vehicle. The one or more images may be analyzed to determine a state of a door of the second vehicle. In response to a first determined state of the door, the first vehicle may be caused to initiate an action responding to the second vehicle, and in response to a second determined state of the door, causing the first vehicle to initiate the action may be withheld.

In some embodiments, systems, methods and computer readable media for controlling vehicles based on users of other vehicles are provided. For example, one or more images captured using one or more image sensors from an environment of a first vehicle may be obtained. The one or more images may be analyzed to detect a second vehicle. The one or more images may be analyzed to determine a state of a user associated with the second vehicle. In response to a first determined state of the user, the first vehicle may be caused to initiate an action responding to the second vehicle, and in response to a second determined state of the user, causing the first vehicle to initiate the action may be withheld.

In some embodiments, systems, methods and computer readable media for controlling vehicles based on loading and unloading events are provided. For example, one or more images captured using one or more image sensors from an environment of a first vehicle may be obtained. The one or more images may be analyzed to detect a second vehicle. At least one of a cargo loading event associated with the second vehicle and a cargo unloading event associated with the second vehicle may be determined. In response to the determined at least one of cargo loading event associated with the second vehicle and cargo unloading event associated with the second vehicle, the first vehicle may be caused to initiate an action responding to the second vehicle.

In some embodiments, systems, methods and computer readable media for controlling vehicles in response to street cleaning vehicles are provided. For example, one or more images captured using one or more image sensors from an environment of a first vehicle may be obtained. The one or more images may be analyzed to detect a second vehicle. The one or more images may be analyzed to determine that the second vehicle is a street cleaning vehicle. In response to the determination that the second vehicle is a street cleaning vehicle, the first vehicle may be caused to initiate an action responding to the second vehicle.

In some embodiments, systems, methods and computer readable media for controlling vehicles based on hoods of other vehicles are provided. For example, one or more images captured using one or more image sensors from an environment of a first vehicle may be obtained. The one or more images may be analyzed to detect a second vehicle. The one or more images may be analyzed to determine a state of a hood of the second vehicle. In response to a first determined state of the hood, the first vehicle may be caused to initiate an action responding to the second vehicle, and in response to a second determined state of the hood, causing the first vehicle to initiate the action may be withheld.

In some embodiments, systems, methods and computer readable media for controlling vehicles based on trunk lids of other vehicles are provided. For example, one or more images captured using one or more image sensors from an environment of a first vehicle may be obtained. The one or more images may be analyzed to detect a second vehicle. The one or more images may be analyzed to determine a state of a trunk lid of the second vehicle. In response to a first determined state of the trunk lid, the first vehicle may be caused to initiate an action responding to the second vehicle, and in response to a second determined state of the trunk lid, causing the first vehicle to initiate the action may be withheld.

In some embodiments, systems, methods and computer readable media for controlling vehicles in response to smoke are provided. For example, one or more images captured using one or more image sensors from an environment of a first vehicle may be obtained. The one or more images may be analyzed to detect a second vehicle. The one or more images may be analyzed to determine that the second vehicle emits smoke not through an exhaust system. In response to the determination that the second vehicle emits smoke not through an exhaust system, the first vehicle may be caused to initiate an action responding to the second vehicle.

In some embodiments, systems, methods and computer readable media for controlling vehicles in response to two-wheeler vehicles are provided. For example, one or more images captured using one or more image sensors from an environment of a first vehicle may be obtained. The one or more images may be analyzed to detect a two-wheeler vehicle. The one or more images may be analyzed to determine whether at least one rider rides the two-wheeler vehicle, and in response to a determination that no rider rides the two-wheeler vehicle, the first vehicle may be caused to initiate an action responding to the two-wheeler vehicle.

In some embodiments, systems, methods and computer readable media for controlling vehicles in response to winter service vehicles are provided. For example, one or more images captured using one or more image sensors from an environment of a first vehicle may be obtained. The one or more images may be analyzed to detect a second vehicle. The one or more images may be analyzed to determine that the second vehicle is a winter service vehicle. In response to the determination that the second vehicle is a winter service vehicle, the first vehicle may be caused to initiate an action responding to the second vehicle.

In some embodiments, systems, methods and computer readable media for controlling vehicles in response to waste collection vehicles are provided. For example, one or more images captured using one or more image sensors from an environment of a first vehicle may be obtained. The one or more images may be analyzed to detect a second vehicle. The one or more images may be analyzed to determine that the second vehicle is a waste collection vehicle. In response to the determination that the second vehicle is a waste collection vehicle, the first vehicle may be caused to initiate an action responding to the second vehicle.

In some embodiments, systems, methods and computer readable media for controlling vehicles in response to windows are provided. For example, one or more images captured using one or more image sensors from an environment of a vehicle may be obtained. The one or more images may be analyzed to detect a first window in the environment. The vehicle may be navigated to a stopping position, where in the stopping position a window of the vehicle may be positioned at a selected position with respect to the first window.

BRIEF DESCRIPTION OF DRAWINGS

FIG. 8 illustrates an example of a method for controlling vehicles in response to lifts.

FIG. 10 illustrates an example of a method for controlling vehicles in response to pumps.

FIG. 12 illustrates an example of a method for controlling vehicles in response to objects.

FIG. 13 illustrates an example of a method for controlling vehicles based on doors of other vehicles.

FIG. 14 illustrates an example of a method for controlling vehicles based on users of other vehicles.

FIG. 15 illustrates an example of a method for controlling vehicles based on loading and/or unloading events.

FIG. 16 illustrates an example of a method for controlling vehicles in response to street cleaning vehicles.

FIG. 17 illustrates an example of a method for controlling vehicles based on hoods of other vehicles.

FIG. 18 illustrates an example of a method for controlling vehicles based on trunk lids of other vehicles.

FIG. 19 illustrates an example of a method 1900 for controlling vehicles in response to smoke.

FIG. 20 illustrates an example of a method for controlling vehicles in response to two-wheeler vehicles.

FIG. 21 illustrates an example of a method for controlling vehicles in response to winter service vehicles.

FIG. 22 illustrates an example of a method for controlling vehicles in response to waste collection vehicles.

FIG. 23 illustrates an example of a method for controlling vehicles in response to windows.

DETAILED DESCRIPTION OF THE INVENTION

Figure 1A:
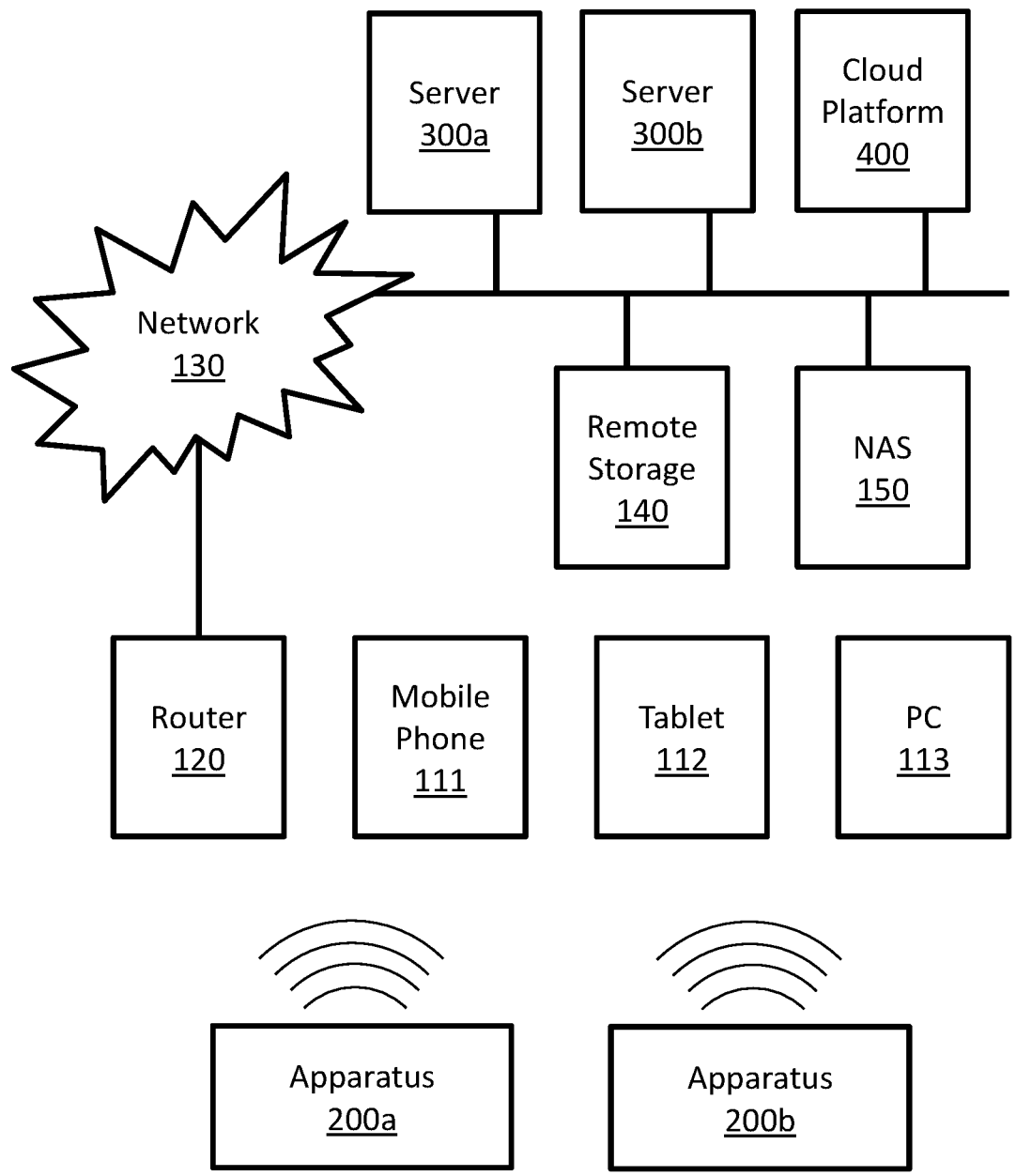
FIGS. 1A and 1B are block diagrams illustrating some possible implementations of a communicating system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating a possible implementation of a communicating system. In this example, apparatuses 200a and 200b may communicate with server 300a, with server 300b, with cloud platform 400, with each other, and so forth. Possible implementations of apparatuses 200a and 200b may include apparatus 200 as described in FIGS. 2A and 2B. Possible implementations of servers 300a and 300b may include server 300 as described in FIG. 3. Some possible implementations of cloud platform 400 are described in FIGS. 4A, 4B and 5. In this example apparatuses 200a and 200b may communicate directly with mobile phone 111, tablet 112, and personal computer (PC) 113. Apparatuses 200a and 200b may communicate with local router 120 directly, and/or through at least one of mobile phone 111, tablet 112, and personal computer (PC) 113. In this example, local router 120 may be connected with a communication network 130. Examples of communication network 130 may include the Internet, phone networks, cellular networks, satellite communication networks, private communication networks, virtual private networks (VPN), and so forth. Apparatuses 200a and 200b may connect to communication network 130 through local router 120 and/or directly. Apparatuses 200a and 200b may communicate with other devices, such as servers 300a, server 300b, cloud platform 400, remote storage 140 and network attached storage (NAS) 150, through communication network 130 and/or directly.

Figure 1B:
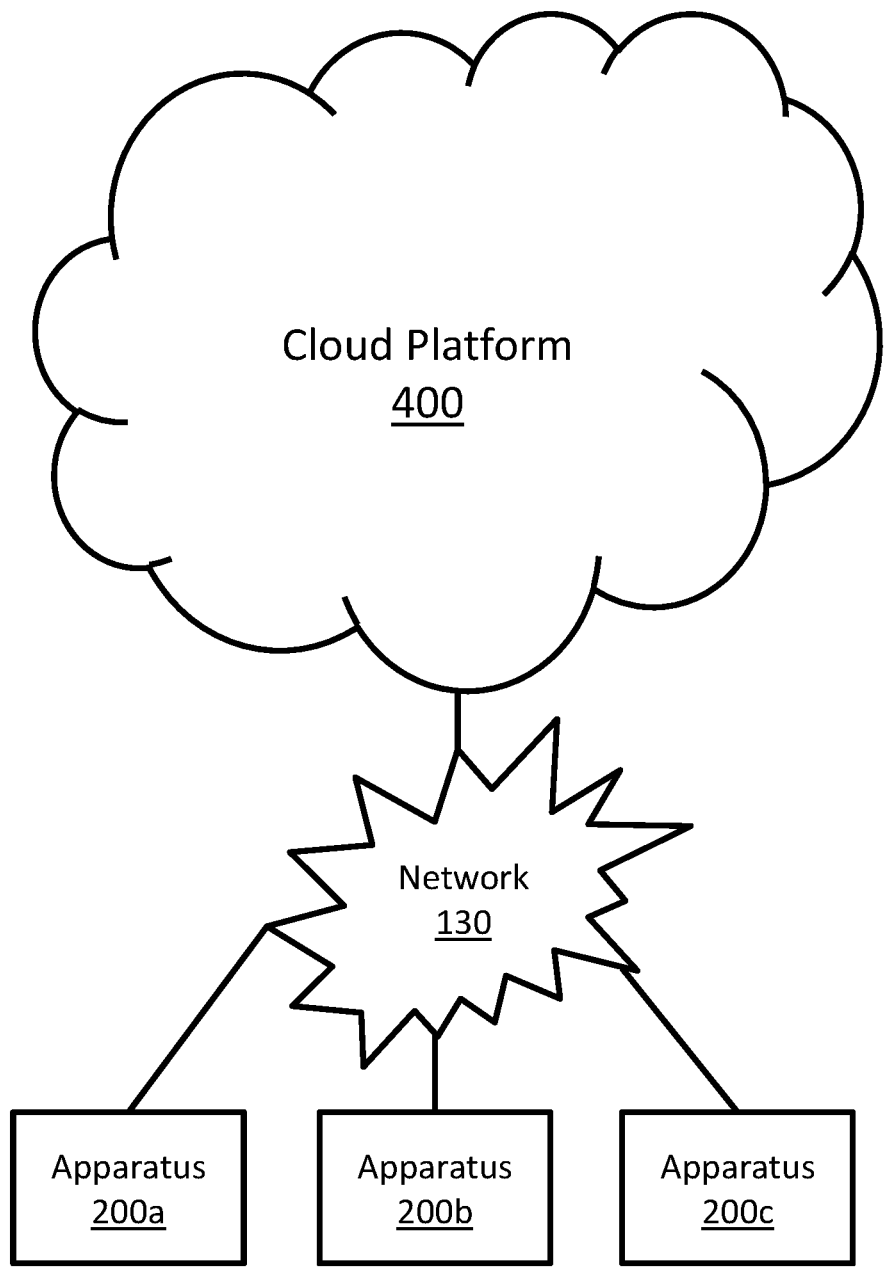

FIG. 1B is a block diagram illustrating a possible implementation of a communicating system. In this example, apparatuses 200a, 200b and 200c may communicate with cloud platform 400 and/or with each other through communication network 130. Possible implementations of apparatuses 200a, 200b and 200c may include apparatus 200 as described in FIGS. 2A and 2B. Some possible implementations of cloud platform 400 are described in FIGS. 4A, 4B and 5.

FIGS. 1A and 1B illustrate some possible implementations of a communication system. In some embodiments, other communication systems that enable communication between apparatus 200 and server 300 may be used. In some embodiments, other communication systems that enable communication between apparatus 200 and cloud platform 400 may be used. In some embodiments, other communication systems that enable communication among a plurality of apparatuses 200 may be used.

Figure 2A:
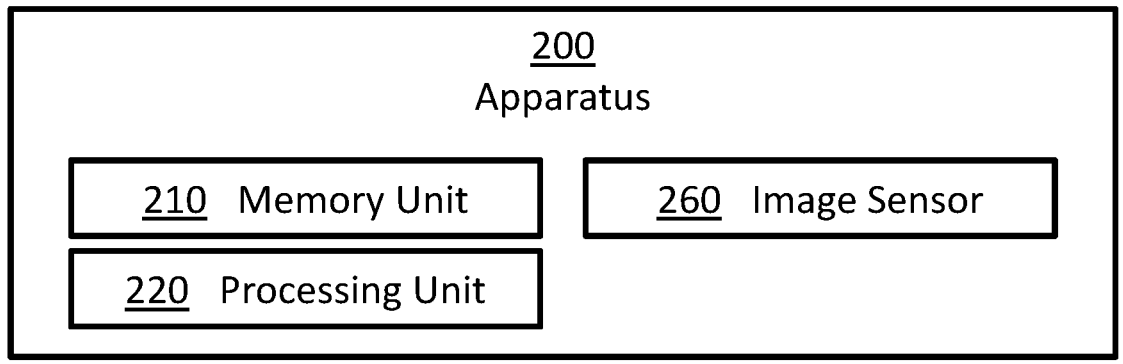
FIGS. 2A and 2B are block diagrams illustrating some possible implementations of an apparatus.

FIG. 2A is a block diagram illustrating a possible implementation of apparatus 200. In this example, apparatus 200 may comprise: one or more memory units 210, one or more processing units 220, and one or more image sensors 260. In some implementations, apparatus 200 may comprise additional components, while some components listed above may be excluded.

Figure 2B:
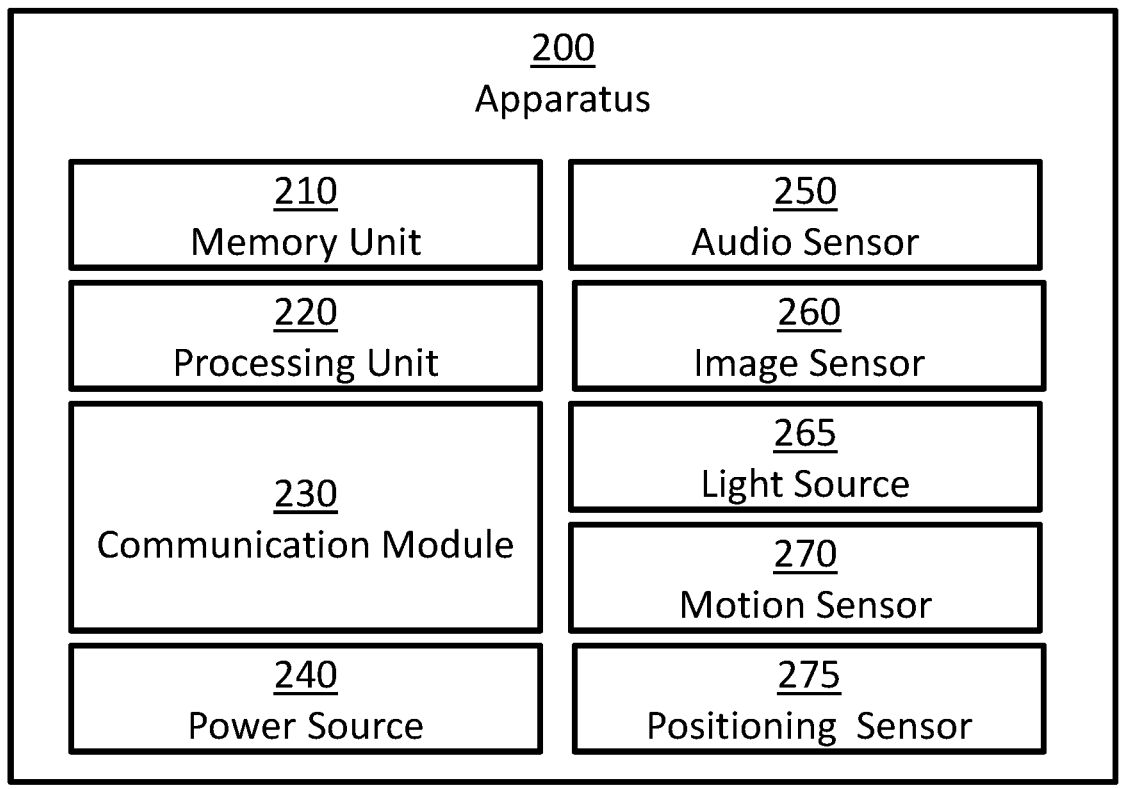

FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275.

In some embodiments, one or more power sources 240 may be configured to: power apparatus 200; power server 300; power cloud platform 400; and/or power computational node 500. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; and so forth.

In some embodiments, the one or more audio sensors 250 may be configured to capture audio by converting sounds to digital information. Some non-limiting examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices, such as server 300, cloud platform 400, computational node 500, and so forth. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; 3D images; sequence of 3D images; 3D videos; and so forth. In some examples, the captured visual information may be stored in memory units 210. In some additional examples, the captured visual information may be transmitted using communication modules 230, for example to other computerized devices, such as server 300, cloud platform 400, computational node 500, and so forth. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
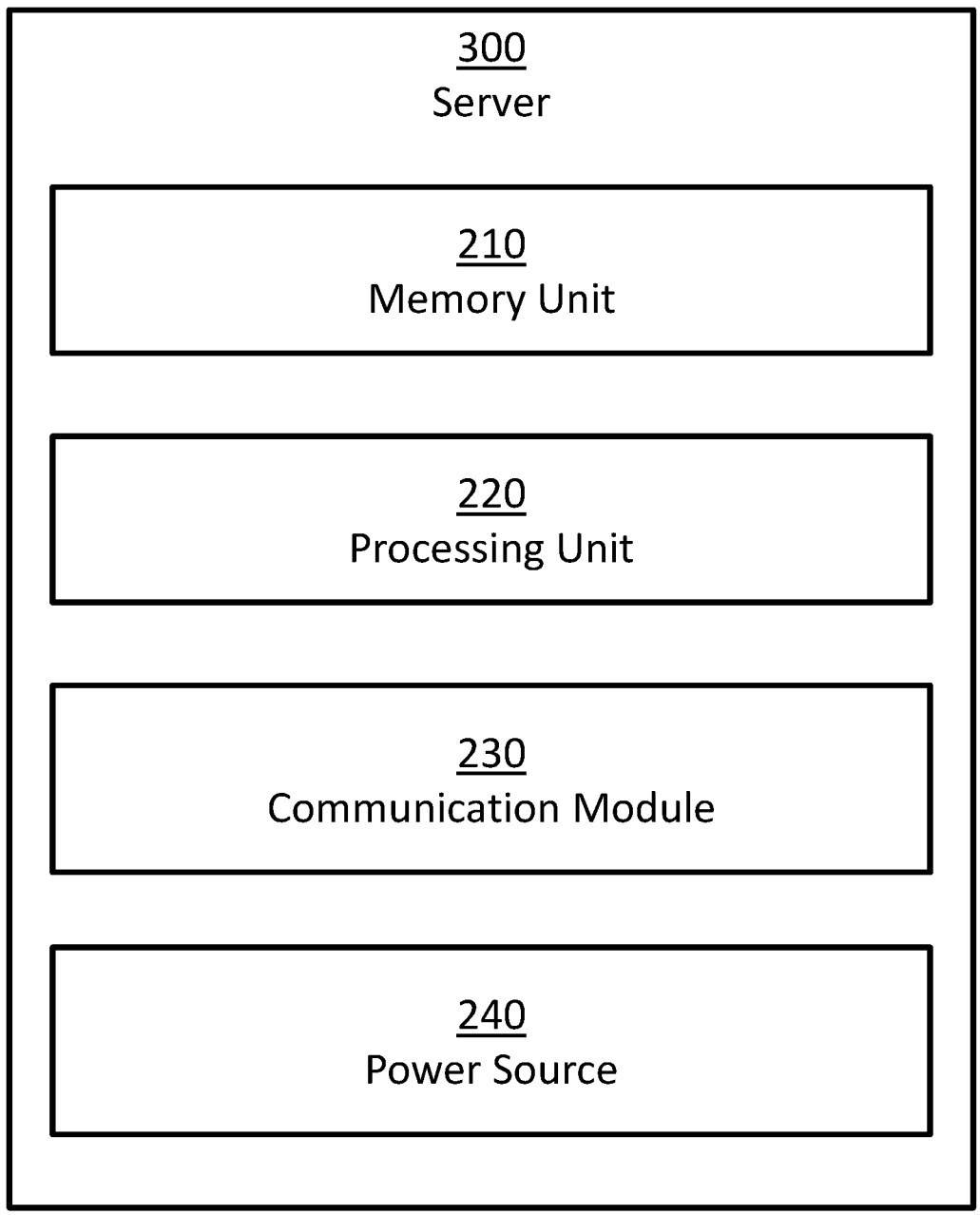
FIG. 3 is a block diagram illustrating a possible implementation of a server.

FIG. 3 is a block diagram illustrating a possible implementation of server 300. In this example, server 300 may comprise: one or more memory units 210, one or more processing units 220, one or more communication modules 230, and one or more power sources 240. In some implementations, server 300 may comprise additional components, while some components listed above may be excluded. For example, in some implementations server 300 may also comprise at least one of the following: one or more user input devices; one or more output devices; and so forth. In another example, in some implementations at least one of the following may be excluded from server 300: memory units 210, communication modules 230, and power sources 240.

Figure 4A:
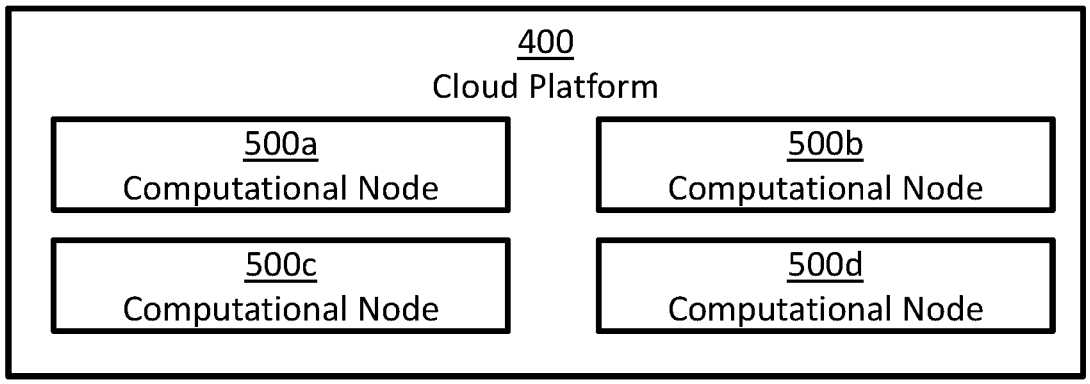
FIGS. 4A and 4B are block diagrams illustrating some possible implementations of a cloud platform.

FIG. 4A is a block diagram illustrating a possible implementation of cloud platform 400. In this example, cloud platform 400 may comprise computational node 500a, computational node 500b, computational node 500c and computational node 500d. In some examples, a possible implementation of computational nodes 500a, 500b, 500c and 500d may comprise server 300 as described in FIG. 3. In some examples, a possible implementation of computational nodes 500a, 500b, 500c and 500d may comprise computational node 500 as described in FIG. 5.

Figure 4B:
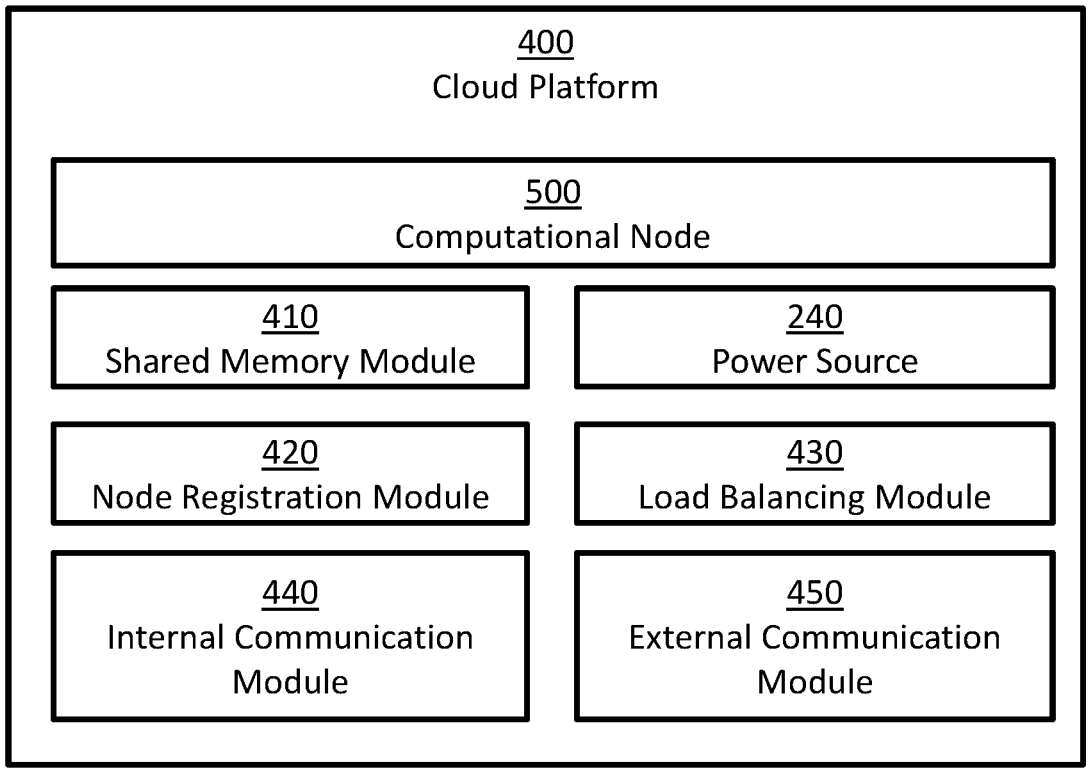

FIG. 4B is a block diagram illustrating a possible implementation of cloud platform 400. In this example, cloud platform 400 may comprise: one or more computational nodes 500, one or more shared memory modules 410, one or more power sources 240, one or more node registration modules 420, one or more load balancing modules 430, one or more internal communication modules 440, and one or more external communication modules 450. In some implementations, cloud platform 400 may comprise additional components, while some components listed above may be excluded. For example, in some implementations cloud platform 400 may also comprise at least one of the following: one or more user input devices; one or more output devices; and so forth. In another example, in some implementations at least one of the following may be excluded from cloud platform 400: shared memory modules 410, power sources 240, node registration modules 420, load balancing modules 430, internal communication modules 440, and external communication modules 450.

Figure 5:
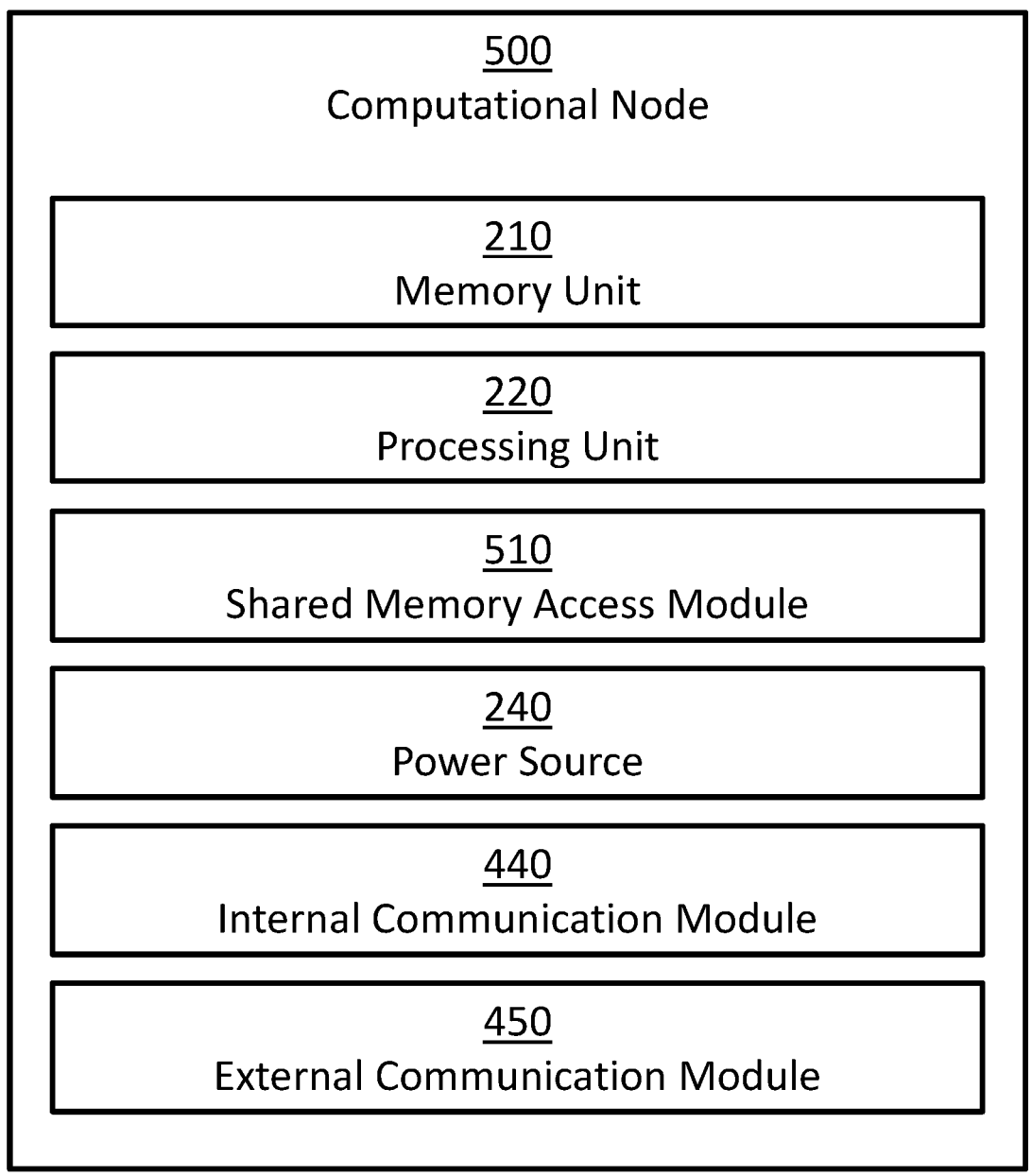
FIG. 5 is a block diagram illustrating a possible implementation of a computational node.

FIG. 5 is a block diagram illustrating a possible implementation of computational node 500. In this example, computational node 500 may comprise: one or more memory units 210, one or more processing units 220, one or more shared memory access modules 510, one or more power sources 240, one or more internal communication modules 440, and one or more external communication modules 450. In some implementations, computational node 500 may comprise additional components, while some components listed above may be excluded. For example, in some implementations computational node 500 may also comprise at least one of the following: one or more user input devices; one or more output devices; and so forth. In another example, in some implementations at least one of the following may be excluded from computational node 500: memory units 210, shared memory access modules 510, power sources 240, internal communication modules 440, and external communication modules 450.

In some embodiments, internal communication modules 440 and external communication modules 450 may be implemented as a combined communication module, such as communication modules 230. In some embodiments, one possible implementation of cloud platform 400 may comprise server 300. In some embodiments, one possible implementation of computational node 500 may comprise server 300. In some embodiments, one possible implementation of shared memory access modules 510 may comprise using internal communication modules 440 to send information to shared memory modules 410 and/or receive information from shared memory modules 410. In some embodiments, node registration modules 420 and load balancing modules 430 may be implemented as a combined module.

In some embodiments, the one or more shared memory modules 410 may be accessed by more than one computational node. Therefore, shared memory modules 410 may allow information sharing among two or more computational nodes 500. In some embodiments, the one or more shared memory access modules 510 may be configured to enable access of computational nodes 500 and/or the one or more processing units 220 of computational nodes 500 to shared memory modules 410. In some examples, computational nodes 500 and/or the one or more processing units 220 of computational nodes 500, may access shared memory modules 410, for example using shared memory access modules 510, in order to perform at least one of: executing software programs stored on shared memory modules 410, store information in shared memory modules 410, retrieve information from the shared memory modules 410.

In some embodiments, the one or more node registration modules 420 may be configured to track the availability of the computational nodes 500. In some examples, node registration modules 420 may be implemented as: a software program, such as a software program executed by one or more of the computational nodes 500; a hardware solution; a combined software and hardware solution; and so forth. In some implementations, node registration modules 420 may communicate with computational nodes 500, for example using internal communication modules 440. In some examples, computational nodes 500 may notify node registration modules 420 of their status, for example by sending messages: at computational node 500 startup; at computational node 500 shutdown; at constant intervals; at selected times; in response to queries received from node registration modules 420; and so forth. In some examples, node registration modules 420 may query about computational nodes 500 status, for example by sending messages: at node registration module 420 startup; at constant intervals; at selected times; and so forth.

In some embodiments, the one or more load balancing modules 430 may be configured to divide the work load among computational nodes 500. In some examples, load balancing modules 430 may be implemented as: a software program, such as a software program executed by one or more of the computational nodes 500; a hardware solution; a combined software and hardware solution; and so forth. In some implementations, load balancing modules 430 may interact with node registration modules 420 in order to obtain information regarding the availability of the computational nodes 500. In some implementations, load balancing modules 430 may communicate with computational nodes 500, for example using internal communication modules 440. In some examples, computational nodes 500 may notify load balancing modules 430 of their status, for example by sending messages: at computational node 500 startup; at computational node 500 shutdown; at constant intervals; at selected times; in response to queries received from load balancing modules 430; and so forth. In some examples, load balancing modules 430 may query about computational nodes 500 status, for example by sending messages: at load balancing module 430 startup; at constant intervals; at selected times; and so forth.

In some embodiments, the one or more internal communication modules 440 may be configured to receive information from one or more components of cloud platform 400, and/or to transmit information to one or more components of cloud platform 400. For example, control signals and/or synchronization signals may be sent and/or received through internal communication modules 440. In another example, input information for computer programs, output information of computer programs, and/or intermediate information of computer programs, may be sent and/or received through internal communication modules 440. In another example, information received though internal communication modules 440 may be stored in memory units 210, in shared memory units 410, and so forth. In an additional example, information retrieved from memory units 210 and/or shared memory units 410 may be transmitted using internal communication modules 440. In another example, input data may be transmitted and/or received using internal communication modules 440. Examples of such input data may include input data inputted by a user using user input devices.

In some embodiments, the one or more external communication modules 450 may be configured to receive and/or to transmit information. For example, control signals may be sent and/or received through external communication modules 450. In another example, information received though external communication modules 450 may be stored in memory units 210, in shared memory units 410, and so forth. In an additional example, information retrieved from memory units 210 and/or shared memory units 410 may be transmitted using external communication modules 450. In another example, input data may be transmitted and/or received using external communication modules 450. Examples of such input data may include: input data inputted by a user using user input devices; information captured from the environment of apparatus 200 using one or more sensors; and so forth. Examples of such sensors may include: audio sensors 250; image sensors 260; motion sensors 270; positioning sensors 275; chemical sensors; temperature sensors; barometers; and so forth.

In some embodiments, one or more instances of apparatus 200 may be mounted and/or configured to be mounted on a vehicle. The instances may be mounted and/or configured to be mounted on one or more sides of the vehicle (such as front, back, left, right, and so forth). The instances may be configured to use image sensors 260 to capture and/or analyze images of the environment of the vehicle, of the exterior of the vehicle, of the interior of the vehicle, and so forth. Multiple such vehicles may be equipped with such apparatuses, and information based on images captured using the apparatuses may be gathered from the multiple vehicles. Additionally or alternatively, information from other sensors may be collected and/or analyzed, such as audio sensors 250, motion sensors 270, positioning sensors 275, and so forth. Additionally or alternatively, one or more additional instances of apparatus 200 may be positioned and/or configured to be positioned in an environment of the vehicles (such as a street, a parking area, and so forth), and similar information from the additional instances may be gathered and/or analyzed. The information captured and/or collected may be analyzed at the vehicle and/or at the apparatuses in the environment of the vehicle, for example using apparatus 200. Additionally or alternatively, the information captured and/or collected may be transmitted to an external device (such as server 300, cloud platform 400, etc.), possibly after some preprocessing, and the external device may gather and/or analyze the information.

In some embodiments, a method, such as methods 700, 800, 900, 1000, 1100, 1200, 1300, 1400, 1500, 1600, 1700, 1800, 1900, 2000, 2100, 2200, and 2300 may comprise of one or more steps. In some examples, a method, as well as all individual steps therein, may be performed by various aspects of apparatus 200, server 300, cloud platform 400, computational node 500, and so forth. For example, the method may be performed by processing units 220 executing software instructions stored within memory units 210 and/or within shared memory modules 410. In some examples, a method, as well as all individual steps therein, may be performed by a dedicated hardware. In some examples, computer readable medium (such as a non-transitory computer readable medium) may store data and/or computer implementable instructions for carrying out a method. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another method, a trigger from an external device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear algorithms, non-linear algorithms, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by an process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing audio data (for example, by the methods, steps and modules described herein) may comprise analyzing the audio data to obtain a preprocessed audio data, and subsequently analyzing the audio data and/or the preprocessed audio data to obtain the desired outcome. One of ordinary skill in the art will recognize that the followings are examples, and that the audio data may be preprocessed using other kinds of preprocessing methods. In some examples, the audio data may be preprocessed by transforming the audio data using a transformation function to obtain a transformed audio data, and the preprocessed audio data may comprise the transformed audio data. For example, the transformation function may comprise a multiplication of a vectored time series representation of the audio data with a transformation matrix. For example, the transformation function may comprise convolutions, audio filters (such as low-pass filters, high-pass filters, band-pass filters, all-pass filters, etc.), nonlinear functions, and so forth. In some examples, the audio data may be preprocessed by smoothing the audio data, for example using Gaussian convolution, using a median filter, and so forth. In some examples, the audio data may be preprocessed to obtain a different representation of the audio data. For example, the preprocessed audio data may comprise: a representation of at least part of the audio data in a frequency domain; a Discrete Fourier Transform of at least part of the audio data; a Discrete Wavelet Transform of at least part of the audio data; a time/frequency representation of at least part of the audio data; a spectrogram of at least part of the audio data; a log spectrogram of at least part of the audio data; a Mel-Frequency Cepstrum of at least part of the audio data; a sonogram of at least part of the audio data; a periodogram of at least part of the audio data; a representation of at least part of the audio data in a lower dimension; a lossy representation of at least part of the audio data; a lossless representation of at least part of the audio data; a time order series of any of the above; any combination of the above; and so forth. In some examples, the audio data may be preprocessed to extract audio features from the audio data. Some non-limiting examples of such audio features may include: auto-correlation; number of zero crossings of the audio signal; number of zero crossings of the audio signal centroid; MP3 based features; rhythm patterns; rhythm histograms; spectral features, such as spectral centroid, spectral spread, spectral skewness, spectral kurtosis, spectral slope, spectral decrease, spectral roll-off, spectral variation, etc.; harmonic features, such as fundamental frequency, noisiness, inharmonicity, harmonic spectral deviation, harmonic spectral variation, tristimulus, etc.; statistical spectrum descriptors; wavelet features; higher level features; perceptual features, such as total loudness, specific loudness, relative specific loudness, sharpness, spread, etc.; energy features, such as total energy, harmonic part energy, noise part energy, etc.; temporal features; and so forth.

In some embodiments, analyzing audio data (for example, by the methods, steps and modules described herein) may comprise analyzing the audio data and/or the preprocessed audio data using one or more rules, functions, procedures, artificial neural networks, speech recognition algorithms, speaker recognition algorithms, speaker diarization algorithms, audio segmentation algorithms, noise cancelling algorithms, source separation algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing one or more images (for example, by the methods, steps and modules described herein) may comprise analyzing the one or more images to obtain a preprocessed image data, and subsequently analyzing the one or more images and/or the preprocessed image data to obtain the desired outcome. One of ordinary skill in the art will recognize that the followings are examples, and that the one or more images may be preprocessed using other kinds of preprocessing methods. In some examples, the one or more images may be preprocessed by transforming the one or more images using a transformation function to obtain a transformed image data, and the preprocessed image data may comprise the transformed image data. For example, the transformed image data may comprise one or more convolutions of the one or more images. For example, the transformation function may comprise one or more image filters, such as low-pass filters, high-pass filters, band-pass filters, all-pass filters, and so forth. In some examples, the transformation function may comprise a nonlinear function. In some examples, the one or more images may be preprocessed by smoothing at least parts of the one or more images, for example using Gaussian convolution, using a median filter, and so forth. In some examples, the one or more images may be preprocessed to obtain a different representation of the one or more images. For example, the preprocessed image data may comprise: a representation of at least part of the one or more images in a frequency domain; a Discrete Fourier Transform of at least part of the one or more images; a Discrete Wavelet Transform of at least part of the one or more images; a time/frequency representation of at least part of the one or more images; a representation of at least part of the one or more images in a lower dimension; a lossy representation of at least part of the one or more images; a lossless representation of at least part of the one or more images; a time ordered series of any of the above; any combination of the above; and so forth. In some examples, the one or more images may be preprocessed to extract edges, and the preprocessed image data may comprise information based on and/or related to the extracted edges. In some examples, the one or more images may be preprocessed to extract image features from the one or more images. Some non-limiting examples of such image features may comprise information based on and/or related to: edges; corners; blobs; ridges; Scale Invariant Feature Transform (SIFT) features; temporal features; and so forth.

In some embodiments, analyzing one or more images (for example, by the methods, steps and modules described herein) may comprise analyzing the one or more images and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing one or more images (for example, by the methods, steps and modules described herein) may comprise analyzing pixels, voxels, point cloud, range data, etc. included in the one or more images.

In some embodiments, one or more images captured using one or more image sensors from an environment of a first vehicle may be obtained, for example using step 710 as described below. Further, in some examples, the one or more images may be analyzed to detect a second vehicle, for example using step 720 as described below. Further, in some examples, the one or more images may be analyzed to determine that the second vehicle is connected to an item. Further, in some examples, the one or more images may be analyzed to determine a state of the item. Further, in some examples, in response to a first determined state of the item, the first vehicle may be caused to initiate an action responding to the second vehicle, and in response to a second determined state of the item, causing the first vehicle to initiate the action may be withheld and/or forgone.

In some embodiments, the one or more images obtained by step 710 may be analyzed to determine that the second vehicle detected by step 720 is connected to an item of a particular type. For example, step 730 may analyze the one or more images obtained by step 710 to determine that the second vehicle detected by step 720 is connected to a crane, step 830 may analyze the one or more images obtained by step 710 to determine that the second vehicle detected by step 720 is connected to a lift, step 930 may analyze the one or more images obtained by step 710 to determine that the second vehicle detected by step 720 is connected to an outrigger, step 1030 may analyze the one or more images obtained by step 710 to determine that the second vehicle detected by step 720 is connected to a pump, step 1130 may analyze the one or more images obtained by step 710 to determine that the second vehicle detected by step 720 is connected to a pipe, and so forth. For example, a machine learning model may be trained using training examples to determine whether vehicles are connected to items of particular types from images and/or videos, and the trained machine learning model may be used to analyze the one or more images obtained by step 710 and determine that the second vehicle detected by step 720 is connected to an item of a particular type. An example of such training example may include an image and/or a video depicting a vehicle, together with a label indicating whether the depicted vehicle is connected to an item of a particular type. In another example, an artificial neural network (such as a deep neural networks, convolutional neural networks, etc.) may be configured to determine whether vehicles are connected to items of particular types from images and/or videos, and the artificial neural network may be used to analyze the one or more images obtained by step 710 and determine that the second vehicle detected by step 720 is connected to an item of a particular type. In yet another example, image classification algorithms may be used to analyze the one or more images obtained by step 710 and determine that the second vehicle detected by step 720 is connected to an item of a particular type.

In some embodiments, the one or more images obtained by step 710 may be analyzed to determine a state of an item. For example, step 740 may analyze the one or more images obtained by step 710 to determine a state of the crane of step 730, step 840 may analyze the one or more images obtained by step 710 to determine a state of the lift of step 830, step 940 may analyze the one or more images obtained by step 710 to determine a state of the outrigger of step 930, step 1040 may analyze the one or more images obtained by step 710 to determine a state of the pump of step 1030, step 1140 may analyze the one or more images obtained by step 710 to determine a state of the pipe of step 1130, step 1330 may analyze the one or more images obtained by step 710 to determine a state of a door of the second vehicle detected by step 720, step 1430 may analyze the one or more images obtained by step 710 to determine a state of a user associated with the second vehicle detected by step 720, step 1730 may analyze the one or more images obtained by step 710 to determine a state of a hood of the second vehicle detected by step 720, step 1830 may analyze the one or more images obtained by step 710 to determine a state of a trunk lid of the second vehicle detected by step 720, and so forth. For example, a machine learning model may be trained using training examples to determine states of items from images and/or videos, and the trained machine learning model may be used to analyze the one or more images obtained by step 710 and determine the state of the item. An example of such training example may include an image and/or a video depicting an item connected to a vehicle, together with a label indicating the state of the depicted item. In another example, an artificial neural network (such as a deep neural networks, convolutional neural networks, etc.) may be configured to determine state of an item from images and/or videos, and the artificial neural network may be used to analyze the one or more images obtained by step 710 and determine the state of the item. In yet another example, image classification algorithms may be used to analyze the one or more images obtained by step 710 and determine the state of the item. Some other non-limiting examples of steps for determining a state of an item are described below.

In some embodiments, for example in response to a first determined state of the item (such as a crane, a lift, an outrigger, a pump, a pipe, a door of a vehicle, a user associated with a vehicle, a hood of a vehicle, a trunk lid of a vehicle, etc.), the first vehicle may be caused to initiate an action responding to the item and/or to the second vehicle (and in response to a second determined state of the item, causing the first vehicle to initiate the action may be withheld and/or forgone). Some non-limiting examples of such action may include signaling, stopping, changing a speed of the first vehicle, changing a motion direction of the first vehicle, passing the item, passing the second vehicle, forgoing passing the second vehicle, keeping a minimal distance of at least a selected length from the item (for example, the selected length may be less than 100 feet, may be at least 100 feet, may be at least 200 feet, etc.), keeping a minimal distance of at least a selected length from the second vehicle (for example, the selected length may be less than 100 feet, may be at least 100 feet, may be at least 200 feet, etc.), turning, performing a U-turn, driving in reverse, generating an audible warning, and so forth. For example, a signal may be transmitted to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle. In another example, information related to the second vehicle may be provided to such external device, and the information may be configured to cause the external device to cause the first vehicle to initiate the action responding to the second vehicle. In some examples, the action may be selected based on the determined state of the item. For example, in response to a first state of the item, a first action may be selected, and in response to a second state of the item, a second action may be selected (where the second action may differ from the first action, and the second state of the item may differ from the first state of the item). In some examples, in response to a first state of the item, a first action may be selected, and in response to a second state of the item, the first action may be withheld and/or forgone (for example, causing the first vehicle to initiate the first action may be withheld and/or forgone).

Figure 6:
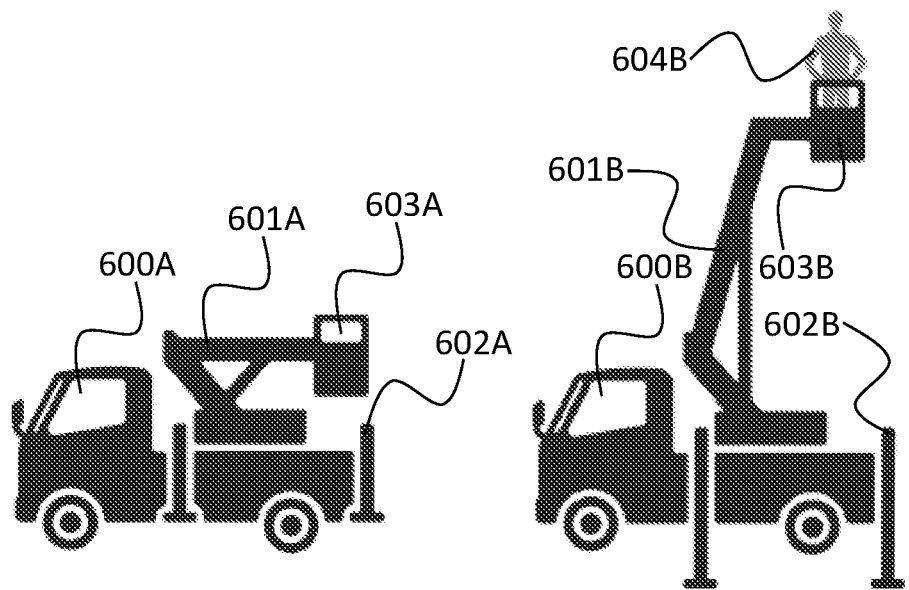
FIG. 6 is a schematic illustration of example images of trucks consistent with an embodiment of the present disclosure.

FIG. 6 is a schematic illustration of example images of trucks consistent with an embodiment of the present disclosure. In this example, truck 600A is connected to crane with boom 601A, outriggers 602A and bucket 603A. Further, truck 60013 is connected to crane with boom 60113, outriggers 60213, bucket 60313 and person 60413 in bucket 60313. While this example illustrates the cranes connected to buckets, and illustrates person 60413 in bucket 60313, in some examples the cranes may be connected to other devices, such as lifting hooks, electro magnets, pipes, and so forth, and in some examples the cranes may lift other types of (non-human) loads. In this example, analysis of the images of the trucks (for example, by methods 700 and/or 900 described below) may indicate that the crane of truck 600A is not in use, and that the crane of truck 60013 is in use. For example, the analysis of the images may determine that boom 601A is shorter than boom 60113 that was extended in the operation of the crane, may determine that boom 601A is in one position and/or orientation with respect to truck 600A and/or the ground while boom 60113 is in another position and/or orientation with respect to truck 60013 and/or the ground, as boom 60113 may have been reoriented and/or repositioned in the operation of the crane, may determine that outriggers 602A are not in use while outriggers 60213 are in use (for example, by determining that outriggers 602A is in one position and/or orientation with respect to truck 600A and/or the ground while outriggers 60213 is in another position and/or orientation with respect to truck 60013 and/or the ground, by determining that outriggers 602A do not touch the ground while outriggers 60213 touch the ground, etc.), may determine that bucket 603A is empty while bucket 60313 carries person 60413 (or another device connected to the crane, such as a lifting hook, carries another kind of load), and so forth. Further, in some examples, based on the one or more of the above determinations, it may be further determined that the crane of truck 600A is not in use while the crane of truck 60013 is in use.

In some embodiments, systems, methods and computer readable media for controlling vehicles in response to cranes are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle with a crane has stopped for a longer period of time may include the state of the crane. For example, identifying that the crane is in use may indicate that the vehicle with the crane has stopped for a longer period of time. The provided systems, methods and computer readable media for controlling vehicles may detect a vehicle connected to a crane, identify a state of the crane, and control a response of an autonomous vehicle to the detected vehicle based on the identified state of the crane.

Figure 7:
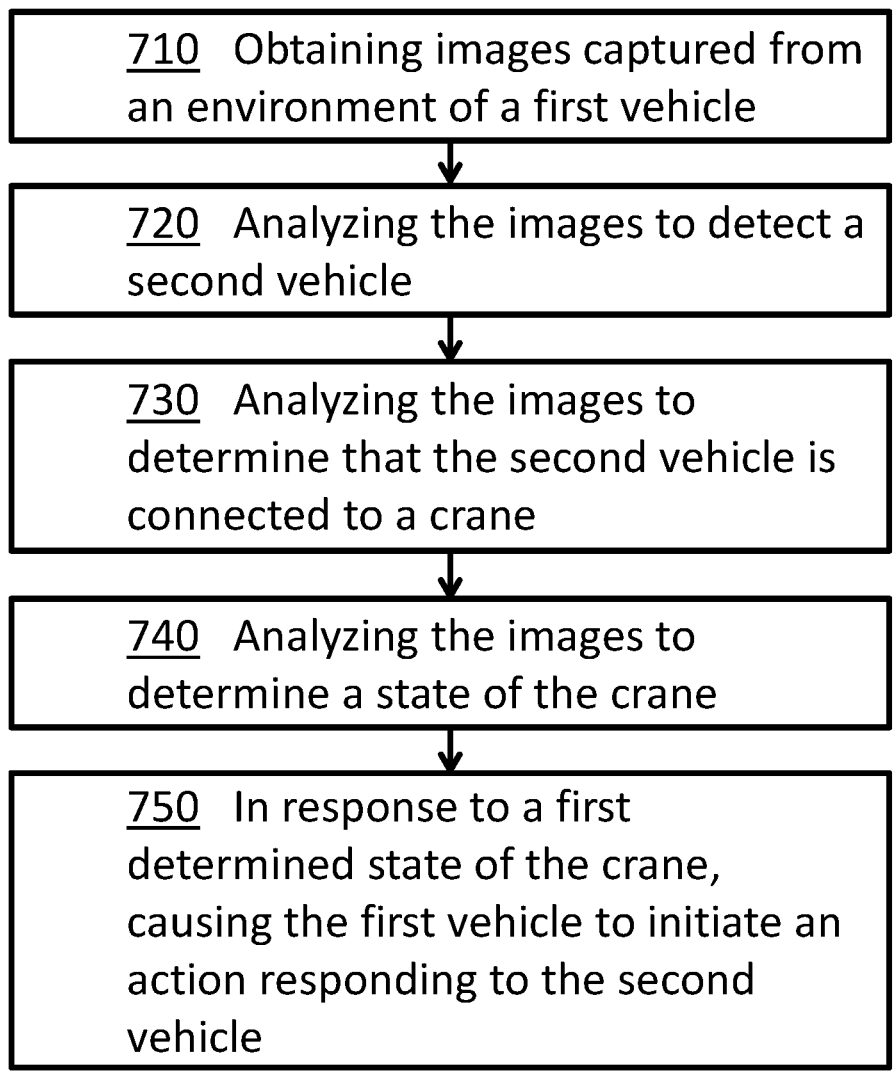
FIG. 7 illustrates an example of a method for controlling vehicles in response to cranes.

FIG. 7 illustrates an example of a method 700 for controlling vehicles in response to cranes. In this example, method 700 may comprise: obtaining images captured from an environment of a first vehicle (Step 710); analyzing the images to detect a second vehicle (Step 720); analyzing the images to determine that the second vehicle is connected to a crane (Step 730); analyzing the images to determine a state of the crane (Step 740); in response to a first determined state of the crane, causing the first vehicle to initiate an action responding to the second vehicle (Step 750), and in response to a second determined state of the crane, forgoing causing the first vehicle to initiate the action. In some implementations, method 700 may comprise one or more additional steps, while some of the steps listed above may be modified or excluded. In some implementations, one or more steps illustrated in FIG. 7 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained. Further, in some examples, the one or more images may be analyzed to detect a second vehicle. Further, in some examples, the one or more images may be analyzed to determine that the second vehicle is connected to a crane. Further, in some examples, the one or more images may be analyzed to determine a state of the crane. Further, in some examples, in response to a first determined state of the crane, the first vehicle may be caused to initiate an action responding to the second vehicle.

In some embodiments, step 710 may comprise obtaining one or more images captured using one or more image sensors from an environment of a first vehicle. For example, at least part of the one or more image sensors may be part of the first vehicle, may be attached to the first vehicle, may be part of or attached to another vehicle in the environment of the first vehicle, may be stationary cameras in the environment of the first vehicle (such as street cameras, security cameras, traffic monitoring cameras, etc.), may be attached to a drone in the environment of the first vehicle, and so forth. For example, step 710 may read at least part of the one or more images may be from memory (such as memory unit 210, shared memory module 410, remote storage 140, NAS 150, etc.), may be received through a communication network using a communication device (such as communication module 230, internal communication module 440, external communication module 450, etc.), may be received from an external device, may be captured using the one or more image sensors (such as image sensors 260), and so forth.

In some embodiments, audio data captured using one or more audio sensors from an environment of the first vehicle may be obtained. For example, at least part of the one or more audio sensors may be part of the first vehicle, may be attached to the first vehicle, may be part of or attached to another vehicle in the environment of the first vehicle, may be stationary audio sensors in the environment of the first vehicle (such as street microphones), may be attached to a drone in the environment of the first vehicle, and so forth. For example, at least part of the audio data may be read from memory (such as memory unit 210, shared memory module 410, remote storage 140, NAS 150, etc.), may be received through a communication network using a communication device (such as memory unit 210, shared memory module 410, remote storage 140, NAS 150, etc.), may be received from an external device, may be captured using the one or more audio sensors (such as audio sensors 250), and so forth.

In some embodiments, step 720 may comprise analyzing the one or more images obtained by step 710 to detect a second vehicle. Some non-limiting examples of such second vehicle may include a bus, a taxi, a passenger car, a truck, a garbage truck, a motorcycle, a bicycle, a two-wheeler vehicle, a motor vehicle, and so forth. For example, a machine learning model may be trained using training examples to detect vehicles in images and/or videos, and step 720 may use the trained machine learning model to analyze the one or more images obtained by step 710 and detect the second vehicle in the one or more images. An example of such training example may include an image and/or a video, together with a label indicating whether a vehicle appears in the image and/or in the video, and/or together with a label indicating a position of the vehicle in the image and/or in the video. In another example, an artificial neural network (such as a deep neural networks, convolutional neural networks, etc.) may be configured to detect vehicles in images and/or videos, and step 720 may use the artificial neural network to analyze the one or more images obtained by step 710 and detect the second vehicle in the one or more images. In yet another example, step 720 may use object detection algorithms to analyze the one or more images obtained by step 710 and detect the second vehicle in the one or more images.

In some embodiments, step 730 may comprise analyzing the one or more images obtained by step 710 to determine that the second vehicle detected by step 720 is connected to a crane. For example, a machine learning model may be trained using training examples to determine whether vehicles are connected to cranes from images and/or videos, and step 730 may use the trained machine learning model to analyze the one or more images obtained by step 710 and determine that the second vehicle detected by step 720 is connected to a crane. An example of such training example may include an image and/or a video depicting a vehicle, together with a label indicating whether the depicted vehicle is connected to a crane. In another example, an artificial neural network (such as a deep neural networks, convolutional neural networks, etc.) may be configured to determine whether vehicles are connected to cranes from images and/or videos, and step 730 may use the artificial neural network to analyze the one or more images obtained by step 710 and determine that the second vehicle detected by step 720 is connected to a crane. In yet another example, step 730 may use image classification algorithms to analyze the one or more images obtained by step 710 and determine that the second vehicle detected by step 720 is connected to a crane.

In some embodiments, step 740 may comprise analyzing the one or more images obtained by step 710 to determine a state of the crane of step 730. Some non-limiting examples of such state of the crane may include crane in use, crane not in use, crane holding object, crane not holding object, crane tied, and so forth. For example, a machine learning model may be trained using training examples to determine states of cranes from images and/or videos, and step 740 may use the trained machine learning model to analyze the one or more images obtained by step 710 and determine the state of the crane of step 730. An example of such training example may include an image and/or a video depicting a crane connected to a vehicle, together with a label indicating the state of the depicted crane. In another example, an artificial neural network (such as a deep neural networks, convolutional neural networks, etc.) may be configured to determine states of cranes from images and/or videos, and step 740 may use the artificial neural network to analyze the one or more images obtained by step 710 and determine the state of the crane of step 730. In yet another example, step 740 may use image classification algorithms to analyze the one or more images obtained by step 710 and determine the state of the crane of step 730. Some other non-limiting examples of steps that may be used by step 740 for determining the state of the crane of step 730 are described below.

In some examples, an orientation of at least part of the crane (in relation to at least part of the second vehicle, in relation to the ground, in relation to the horizon, in relation to an object in the environment, in relation to the at least part of the first vehicle, in relation to the image sensor, etc.) may be determined, and the determined state of the crane may be based on the determined orientation of the at least part of the crane. For example, a machine learning model may be trained using training examples to determine orientation of parts of cranes by analyzing images and/or videos, and the trained machine learning model may be used to determine the orientation of the at least part of the crane from the one or more images. In another example, an artificial neural network (such as a deep neural networks, convolutional neural networks, etc.) may be configured to determine orientation of parts of cranes by analyzing images and/or videos, and the configured artificial neural network may be used to determine the orientation of the at least part of the crane from the one or more images. In yet another example, information about the orientation of the at least part of the crane may be received from the second vehicle (for example, using a point to point communication protocol, through a communication network using a communication device, through a centralized server, and so forth).

In some examples, a distance of at least part of the crane (from at least part of the second vehicle, from the ground, from an object in the environment, from at least part of the first vehicle, from the image sensor, etc.) may be determined, and the determined state of the crane may be based on the determined distance of the at least part of the crane. For example, a machine learning model may be trained using training examples to determine distance of parts of cranes by analyzing images and/or videos, and the trained machine learning model may be used to determine the distance of the at least part of the crane from the one or more images. In another example, an artificial neural network (such as a deep neural networks, convolutional neural networks, etc.) may be configured to determine distance of parts of cranes by analyzing images and/or videos, and the configured artificial neural network may be used to determine the distance of the at least part of the crane from the one or more images. In yet another example, information about the distance of the at least part of the crane may be received from the second vehicle (for example, using a point to point communication protocol, through a communication network using a communication device, through a centralized server, and so forth).

In some examples, a motion of at least part of the crane (in relation to at least part of the second vehicle, in relation to the ground, in relation to the horizon, in relation to an object in the environment, in relation to the at least part of the first vehicle, in relation to the image sensor, etc.) may be determined, and the determined state of the crane may be based on the determined motion of the at least part of the crane. For example, a machine learning model may be trained using training examples to determine motion of parts of cranes by analyzing images and/or videos, and the trained machine learning model may be used to determine the motion of the at least part of the crane from the one or more images. In another example, an artificial neural network (such as a deep neural networks, convolutional neural networks, etc.) may be configured to determine motion of parts of cranes by analyzing images and/or videos, and the configured artificial neural network may be used to determine the motion of the at least part of the crane from the one or more images. In yet another example, information about the motion of the at least part of the crane may be received from the second vehicle (for example, using a point to point communication protocol, through a communication network using a communication device, through a centralized server, and so forth).

In some examples, a length of at least part of the crane may be determined, and the determined state of the crane may be based on the determined length of the at least part of the crane. For example, a machine learning model may be trained using training examples to determine lengths of parts of cranes by analyzing images and/or videos, and the trained machine learning model may be used to determine the length of the at least part of the crane from the one or more images. In another example, an artificial neural network (such as a deep neural networks, convolutional neural networks, etc.) may be configured to determine lengths of parts of cranes by analyzing images and/or videos, and the configured artificial neural network may be used to determine the length of the at least part of the crane from the one or more images. In yet another example, information about the length of the at least part of the crane may be received from the second vehicle (for example, using a point to point communication protocol, through a communication network using a communication device, through a centralized server, and so forth).

In some embodiments, step 750 may comprise, for example in response to a first state of the crane determined by step 740, causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, passing the crane, keeping a minimal distance of at least a selected length from the second vehicle (for example, the selected length may be less than 100 feet, may be at least 100 feet, may be at least 200 feet, etc.), keeping a minimal distance of at least a selected length from the crane (for example, the selected length may be less than 100 feet, may be at least 100 feet, may be at least 200 feet, etc.), turning, performing a U-turn, driving in reverse, generating an audible warning, and so forth. For example, step 750 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 750 may provide information related to the second vehicle detected by step 720 (such as position, motion, acceleration, type, dimensions, etc.) to such external device, and the information may be configured to cause the external device to cause the first vehicle to initiate the action responding to the second vehicle detected by step 720. In one example, in response to a second state of the crane determined by step 740, step 750 may cause the first vehicle to initiate a second action, the second action may differ from the action.

In some examples, step 750 may select the action based on the state of the crane determined by step 740. For example, in response to a first state of the crane determined by step 740, step 750 may select a first action, and in response to a second state of the crane determined by step 740, step 750 may select a second action (where the second action may differ from the first action, and the second state of the crane may differ from the first state of the crane). In some examples, in response to a first state of the crane determined by step 740, step 750 may select a first action, and in response to a second state of the crane determined by step 740, step 750 may withhold and/or forgo the first action (for example, step 750 may withhold and/or forgo causing the first vehicle to initiate the first action).

In some examples, a motion of the second vehicle may be determined. In some examples, the motion of the second vehicle may be received from the second vehicle (for example, using a point to point communication protocol, through a communication network using a communication device, through a centralized server, and so forth). In some examples, radar images and/or LiDAR images and/or depth images of the second vehicle may be analyzed to determine the motion of the second vehicle. In some examples, the one or more images may be analyzed to determine the motion of the second vehicle. For example a machine learning model may be trained using training examples to determine motion of objects by analyzing images and/or videos, and the trained machine learning model may be used to determine the motion of the second vehicle from the one or more images. In another example, an artificial neural network (such as a deep neural networks, convolutional neural networks, etc.) may be configured to determine motion of objects by analyzing images and/or videos, and the artificial neural network may be used to determine the motion of the second vehicle from the one or more images.

In some examples, in response to the determined motion of the second vehicle and the first determined state of the crane, the first vehicle may be caused to initiate the action (for example as described above). For example, in response to a first determined motion of the second vehicle and a first determined state of the crane, the first vehicle may be caused to initiate a first action; in response to a second determined motion of the second vehicle and the first determined state of the crane, the first vehicle may be caused to initiate a second action; and in response to the first determined motion of the second vehicle and a second determined state of the crane, the first vehicle may be caused to initiate a third action. In another example, in response to a first determined motion of the second vehicle and a first determined state of the crane, the first vehicle may be caused to initiate a first action; in response to a second determined motion of the second vehicle and the first determined state of the crane and/or in response to the first determined motion of the second vehicle and a second determined state of the crane, causing the first vehicle to initiate the first action may be withheld and/or forwent.

In some examples, it may be determining that the second vehicle is signaling. Further, in some examples, a type of the signaling of the second vehicle may be determined. Some non-limiting examples of such type of signaling may include signaling using light, signaling using sound, signaling left, signaling right, signaling break, signaling hazard warning, signaling reversing, signaling warning, and so forth. For example, audio data captured using one or more audio sensors from an environment of the first vehicle may be analyzed (for example using signal processing algorithms, using a trained machine learning model, using an artificial neural network, etc.) to determine that the second vehicle is signaling using it's horn and/or to determine a pattern or a type of honking. In another example, the one or more images may be analyzed (for example, using a trained machine learning model, using an artificial neural network, etc.) to determine that the second vehicle is signaling and/or to determine a type of signaling. In yet another example, indication that the second vehicle is signaling and/or information about the type of signaling may be received from the second vehicle (for example, using a point to point communication protocol, through a communication network using a communication device, through a centralized server, and so forth).

In some examples, in response to the determination that the second vehicle is signaling and/or the determined type of the signaling and/or the first determined state of the crane, the first vehicle may be caused to initiate the action (for example as described above). For example, in response to a first determined type of the signaling and a first determined state of the crane, the first vehicle may be caused to initiate a first action; in response to a second determined type of the signaling and the first determined state of the crane, the first vehicle may be caused to initiate a second action; and in response to the first determined type of the signaling and a second determined state of the crane, the first vehicle may be caused to initiate a third action. In another example, in response to a first determined type of the signaling and a first determined state of the crane, the first vehicle may be caused to initiate a first action; in response to a second determined type of the signaling and the first determined state of the crane and/or in response to the first determined type of the signaling and a second determined state of the crane, causing the first vehicle to initiate the first action may be withheld and/or forwent. In an additional example, in response to the determination that the second vehicle is signaling and a first determined state of the crane, the first vehicle may be caused to initiate a first action; and in response to the determination that the second vehicle is not signaling and the first determined state of the crane, the first vehicle may be caused to initiate a second action. In yet another example, in response to the determination that the second vehicle is signaling and a first determined state of the crane, the first vehicle may be caused to initiate a first action; and in response to the determination that the second vehicle is not signaling and the first determined state of the crane, causing the first vehicle to initiate the first action may be withheld and/or forwent.

In some examples, a position of the second vehicle may be determined. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle. Further, in some examples, it may be determining that the second vehicle is in a planned path of the first vehicle. For example, the one or more images may be analyzed (for example using signal processing algorithms, using a trained machine learning model, using an artificial neural network, etc.) to determine a position of the second vehicle and/or to determine whether the second vehicle is in a lane of the first vehicle and/or to determine whether the second vehicle is in a planned path of the first vehicle. In yet another example, information related to the position and/or to the lane of the second vehicle is signaling and/or information about the type of signaling may be received from the second vehicle (for example, using a point to point communication protocol, through a communication network using a communication device, through a centralized server, and so forth).

In some examples, in response to the determined position of the second vehicle and the first determined state of the crane, the first vehicle may be caused to initiate the action (for example as described above). For example, in response to a first determined position of the second vehicle and a first determined state of the crane, the first vehicle may be caused to initiate a first action; in response to a second determined position of the second vehicle and the first determined state of the crane, the first vehicle may be caused to initiate a second action; and in response to the first determined position of the second vehicle and a second determined state of the crane, the first vehicle may be caused to initiate a third action. In another example, in response to a first determined position of the second vehicle and a first determined state of the crane, the first vehicle may be caused to initiate a first action; in response to a second determined position of the second vehicle and the first determined state of the crane and/or in response to the first determined position of the second vehicle and a second determined state of the crane, causing the first vehicle to initiate the first action may be withheld and/or forwent. In an additional example, in response to the determination that the second vehicle is in a lane and/or a planned path of the first vehicle and a first determined state of the crane, the first vehicle may be caused to initiate a first action; and in response to the determination that the second vehicle is not in a lane and/or is not in a planned path of the first vehicle and the first determined state of the crane, the first vehicle may be caused to initiate a second action. In yet another example, in response to the determination that the second vehicle is in a lane and/or a planned path of the first vehicle and a first determined state of the crane, the first vehicle may be caused to initiate a first action; and in response to the determination that the second vehicle is not in a lane and/or is not in a planned path of the first vehicle and the first determined state of the crane, causing the first vehicle to initiate the first action may be withheld and/or forwent.

In some embodiments, systems, methods and computer readable media for controlling vehicles in response to lifts are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle with a lift has stopped for a longer period of time may include the state of the lift. For example, identifying that the lift is in use may indicate that the vehicle with the lift has stopped for a longer period of time. The provided systems, methods and computer readable media for controlling vehicles may detect a vehicle connected to a lift, identify a state of the lift, and control a response of an autonomous vehicle to the detected vehicle based on the identified state of the lift.

FIG. 8 illustrates an example of a method 800 for controlling vehicles in response to lifts. In this example, method 800 may comprise: obtaining images captured from an environment of a first vehicle (Step 710); analyzing the images to detect a second vehicle (Step 720); analyzing the images to determine that the second vehicle is connected to a lift (Step 830); analyzing the images to determine a state of the lift (Step 840); in response to a first determined state of the lift, causing the first vehicle to initiate an action responding to the second vehicle (Step 850), and in response to a second determined state of the lift, forgoing causing the first vehicle to initiate the action. In some implementations, method 800 may comprise one or more additional steps, while some of the steps listed above may be modified or excluded. In some implementations, one or more steps illustrated in FIG. 8 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine that the second vehicle is connected to a lift. Further, in some examples, the one or more images may be analyzed to determine a state of the lift. Further, in some examples, in response to a first determined state of the lift, the first vehicle may be caused to initiate an action responding to the second vehicle.

In some embodiments, step 830 may analyze the one or more images obtained by step 710 to determine that the second vehicle detected by step 720 is connected to a lift. For example, a machine learning model may be trained using training examples to determine whether vehicles are connected to lifts from images and/or videos, and step 830 may use the trained machine learning model to analyze the one or more images obtained by step 710 and determine that the second vehicle detected by step 720 is connected to a lift. An example of such training example may include an image and/or a video depicting a vehicle, together with a label indicating whether the depicted vehicle is connected to a lift. In another example, an artificial neural network (such as a deep neural networks, convolutional neural networks, etc.) may be configured to determine whether vehicles are connected to lifts from images and/or videos, and step 830 may use the artificial neural network to analyze the one or more images obtained by step 710 and determine that the second vehicle detected by step 720 is connected to a lift. In yet another example, step 830 may use image classification algorithms to analyze the one or more images obtained by step 710 and determine that the second vehicle detected by step 720 is connected to a lift.

In some embodiments, step 840 may comprise analyzing the one or more images obtained by step 710 to determine a state of the lift of step 830. Some non-limiting examples of such state of the lift may include lift in use, lift not in use, lift holding object, lift not holding object, and so forth. For example, a machine learning model may be trained using training examples to determine states of lifts from images and/or videos, and step 840 may use the trained machine learning model to analyze the one or more images obtained by step 710 and determine the state of the lift of step 830. An example of such training example may include an image and/or a video depicting a lift connected to a vehicle, together with a label indicating the state of the depicted lift. In another example, an artificial neural network (such as a deep neural networks, convolutional neural networks, etc.) may be configured to determine states of lifts from images and/or videos, and step 840 may the artificial neural network to analyze the one or more images obtained by step 710 and determine the state of the lift of step 830. In yet another example, step 840 may use image classification algorithms to analyze the one or more images obtained by step 710 and determine the state of the lift of step 830. Some other non-limiting examples of steps that may be used by step 840 for determining the state of the lift of step 830 are described below.

In some examples, an orientation of at least part of the lift (in relation to at least part of the second vehicle, in relation to the ground, in relation to the horizon, in relation to an object in the environment, in relation to the at least part of the first vehicle, in relation to the image sensor, etc.) may be determined, and the determined state of the lift may be based on the determined orientation of the at least part of the lift. For example, a machine learning model may be trained using training examples to determine orientation of parts of lifts by analyzing images and/or videos, and the trained machine learning model may be used to determine the orientation of the at least part of the lift from the one or more images. In another example, an artificial neural network (such as a deep neural networks, convolutional neural networks, etc.) may be configured to determine orientation of parts of lifts by analyzing images and/or videos, and the configured artificial neural network may be used to determine the orientation of the at least part of the lift from the one or more images. In yet another example, information about the orientation of the at least part of the lift may be received from the second vehicle (for example, using a point to point communication protocol, through a communication network using a communication device, through a centralized server, and so forth).

In some examples, a distance of at least part of the lift (from at least part of the second vehicle, from the ground, from an object in the environment, from at least part of the first vehicle, from the image sensor, etc.) may be determined, and the determined state of the lift may be based on the determined distance of the at least part of the lift. For example, a machine learning model may be trained using training examples to determine distance of parts of lifts by analyzing images and/or videos, and the trained machine learning model may be used to determine the distance of the at least part of the lift from the one or more images. In another example, an artificial neural network (such as a deep neural networks, convolutional neural networks, etc.) may be configured to determine distance of parts of lifts by analyzing images and/or videos, and the configured artificial neural network may be used to determine the distance of the at least part of the lift from the one or more images. In yet another example, information about the distance of the at least part of the lift may be received from the second vehicle (for example, using a point to point communication protocol, through a communication network using a communication device, through a centralized server, and so forth).

In some examples, a motion of at least part of the lift (in relation to at least part of the second vehicle, in relation to the ground, in relation to the horizon, in relation to an object in the environment, in relation to the at least part of the first vehicle, in relation to the image sensor, etc.) may be determined, and the determined state of the lift may be based on the determined motion of the at least part of the lift. For example, a machine learning model may be trained using training examples to determine motion of parts of lifts by analyzing images and/or videos, and the trained machine learning model may be used to determine the motion of the at least part of the lift from the one or more images. In another example, an artificial neural network (such as a deep neural networks, convolutional neural networks, etc.) may be configured to determine motion of parts of lifts by analyzing images and/or videos, and the configured artificial neural network may be used to determine the motion of the at least part of the lift from the one or more images. In yet another example, information about the motion of the at least part of the lift may be received from the second vehicle (for example, using a point to point communication protocol, through a communication network using a communication device, through a centralized server, and so forth).

In some embodiments, step 850 may comprise, for example in response to a first state of the lift determined by step 840, causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, passing the lift, keeping a minimal distance of at least a selected length from the second vehicle (for example, the selected length may be less than 100 feet, may be at least 100 feet, may be at least 200 feet, etc.), keeping a minimal distance of at least a selected length from the lift (for example, the selected length may be less than 100 feet, may be at least 100 feet, may be at least 200 feet, etc.), turning, performing a U-turn, driving in reverse, generating an audible warning, and so forth. For example, step 850 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 850 may provide information related to the second vehicle detected by step 720 (such as position, motion, acceleration, type, dimensions, etc.) to such external device, and the information may be configured to cause the external device to cause the first vehicle to initiate the action responding to the second vehicle detected by step 720. In one example, in response to a second state of the lift determined by step 840, step 850 may cause the first vehicle to initiate a second action, the second action may differ from the action.

In some examples, step 850 may select the action based on the state of the lift determined by step 840. For example, in response to a first state of the lift determined by step 840, step 850 may select a first action, and in response to a second state of the lift determined by step 840, step 850 may select a second action (where the second action may differ from the first action, and the second state of the lift may differ from the first state of the lift). In some examples, in response to a first state of the lift determined by step 840, step 850 may select a first action, and in response to a second state of the lift determined by step 840, step 850 may withhold and/or forgo the first action (for example, step 850 may withhold and/or forgo causing the first vehicle to initiate the first action).

In some examples, a motion of the second vehicle may be determined, for example as described above. Further, in some examples, in response to the determined motion of the second vehicle and the first determined state of the lift, the first vehicle may be caused to initiate the action (for example as described above). For example, in response to a first determined motion of the second vehicle and a first determined state of the lift, the first vehicle may be caused to initiate a first action; in response to a second determined motion of the second vehicle and the first determined state of the lift, the first vehicle may be caused to initiate a second action; and in response to the first determined motion of the second vehicle and a second determined state of the lift, the first vehicle may be caused to initiate a third action. In another example, in response to a first determined motion of the second vehicle and a first determined state of the lift, the first vehicle may be caused to initiate a first action; in response to a second determined motion of the second vehicle and the first determined state of the lift and/or in response to the first determined motion of the second vehicle and a second determined state of the lift, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the first determined state of the lift, the first vehicle may be caused to initiate the action (for example as described above). For example, in response to a first determined type of the signaling and a first determined state of the lift, the first vehicle may be caused to initiate a first action; in response to a second determined type of the signaling and the first determined state of the lift, the first vehicle may be caused to initiate a second action; and in response to the first determined type of the signaling and a second determined state of the lift, the first vehicle may be caused to initiate a third action. In another example, in response to a first determined type of the signaling and a first determined state of the lift, the first vehicle may be caused to initiate a first action; in response to a second determined type of the signaling and the first determined state of the lift and/or in response to the first determined type of the signaling and a second determined state of the lift, causing the first vehicle to initiate the first action may be withheld and/or forwent. In an additional example, in response to the determination that the second vehicle is signaling and a first determined state of the lift, the first vehicle may be caused to initiate a first action; and in response to the determination that the second vehicle is not signaling and the first determined state of the lift, the first vehicle may be caused to initiate a second action. In yet another example, in response to the determination that the second vehicle is signaling and a first determined state of the lift, the first vehicle may be caused to initiate a first action; and in response to the determination that the second vehicle is not signaling and the first determined state of the lift, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and the first determined state of the lift, the first vehicle may be caused to initiate the action (for example as described above). For example, in response to a first determined position of the second vehicle and a first determined state of the lift, the first vehicle may be caused to initiate a first action; in response to a second determined position of the second vehicle and the first determined state of the lift, the first vehicle may be caused to initiate a second action; and in response to the first determined position of the second vehicle and a second determined state of the lift, the first vehicle may be caused to initiate a third action. In another example, in response to a first determined position of the second vehicle and a first determined state of the lift, the first vehicle may be caused to initiate a first action; in response to a second determined position of the second vehicle and the first determined state of the lift and/or in response to the first determined position of the second vehicle and a second determined state of the lift, causing the first vehicle to initiate the first action may be withheld and/or forwent. In an additional example, in response to the determination that the second vehicle is in a lane and/or a planned path of the first vehicle and a first determined state of the lift, the first vehicle may be caused to initiate a first action; and in response to the determination that the second vehicle is not in a lane and/or is not in a planned path of the first vehicle and the first determined state of the lift, the first vehicle may be caused to initiate a second action. In yet another example, in response to the determination that the second vehicle is in a lane and/or a planned path of the first vehicle and a first determined state of the lift, the first vehicle may be caused to initiate a first action; and in response to the determination that the second vehicle is not in a lane and/or is not in a planned path of the first vehicle and the first determined state of the lift, causing the first vehicle to initiate the first action may be withheld and/or forwent.

In some embodiments, systems, methods and computer readable media for controlling vehicles in response to outriggers are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle with an outrigger has stopped for a longer period of time may include the state of the outrigger. For example, identifying that the outrigger is in use may indicate that the vehicle with the outrigger has stopped for a longer period of time. The provided systems, methods and computer readable media for controlling vehicles determine whether the object is carried by a second vehicle may detect a vehicle connected to a outrigger, identify a state of the outrigger, and control a response of an autonomous vehicle to the detected vehicle based on the identified state of the outrigger.

Figure 9:
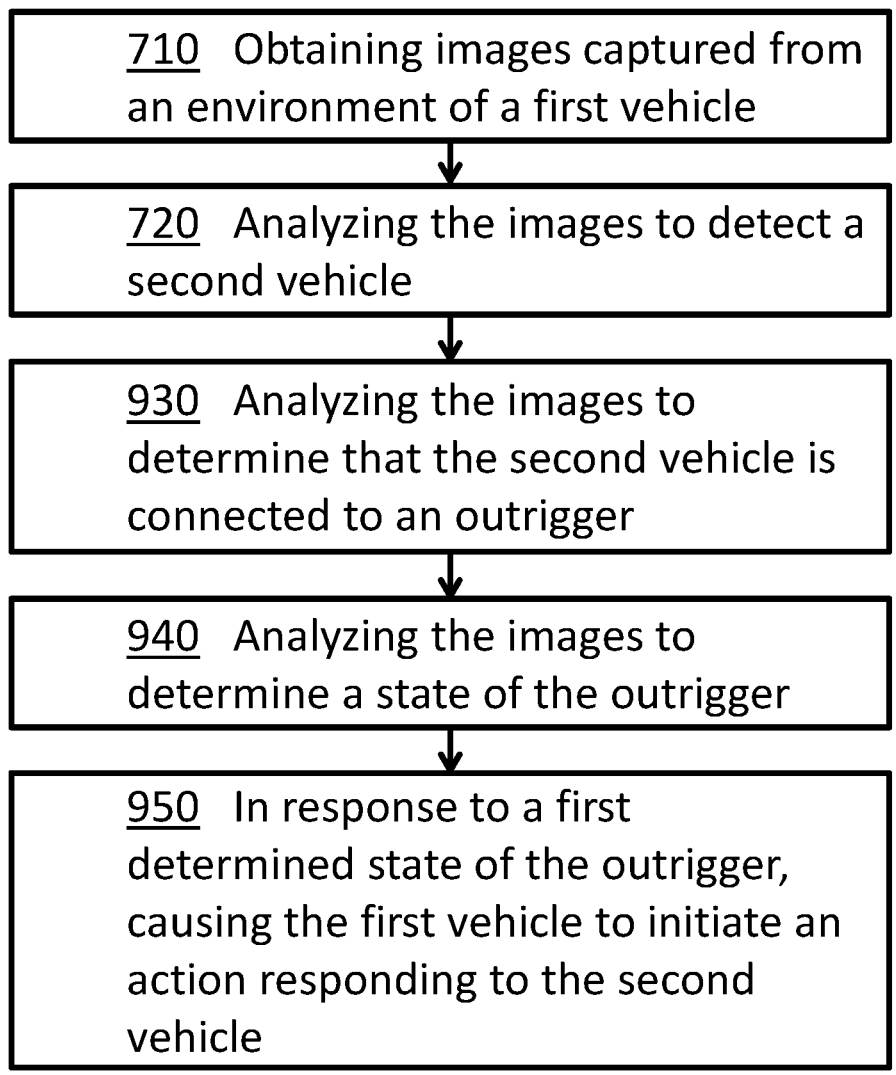
FIG. 9 illustrates an example of a method for controlling vehicles in response to outriggers.

FIG. 9 illustrates an example of a method 900 for controlling vehicles in response to outriggers. In this example, method 900 may comprise: obtaining images captured from an environment of a first vehicle (Step 710); analyzing the images to detect a second vehicle (Step 720); analyzing the images to determine that the second vehicle is connected to a outrigger (Step 930); analyzing the images to determine a state of the outrigger (Step 940); in response to a first determined state of the outrigger, causing the first vehicle to initiate an action responding to the second vehicle (Step 950), and in response to a second determined state of the outrigger, forgoing causing the first vehicle to initiate the action. In some implementations, method 900 may comprise one or more additional steps, while some of the steps listed above may be modified or excluded. In some implementations, one or more steps illustrated in FIG. 9 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine that the second vehicle is connected to an outrigger. Further, in some examples, the one or more images may be analyzed to determine a state of the outrigger. Further, in some examples, in response to a first determined state of the outrigger, the first vehicle may be caused to initiate an action responding to the second vehicle.

In some embodiments, step 930 may comprise analyzing the one or more images obtained by step 710 to determine that the second vehicle detected by step 720 is connected to an outrigger. For example, a machine learning model may be trained using training examples to determine whether vehicles are connected to outriggers from images and/or videos, and step 930 may use the trained machine learning model to analyze the one or more images obtained by step 710 and determine that the second vehicle detected by step 720 is connected to an outrigger. An example of such training example may include an image and/or a video depicting a vehicle, together with a label indicating whether the depicted vehicle is connected to an outrigger. In another example, an artificial neural network (such as a deep neural networks, convolutional neural networks, etc.) may be configured to determine whether vehicles are connected to outriggers from images and/or videos, and step 930 may use the artificial neural network to analyze the one or more images obtained by step 710 and determine that the second vehicle detected by step 720 is connected to an outrigger. In yet another example, step 930 may use image classification algorithms to analyze the one or more images obtained by step 710 and determine that the second vehicle detected by step 720 is connected to an outrigger.

In some embodiments, step 940 may comprise analyzing the one or more images obtained by step 710 to determine a state of the outrigger of step 930. Some non-limiting examples of such state of the outrigger may include outrigger in use, outrigger not in use, outrigger lifting at least part of the second vehicle, outrigger not lifting the second vehicle, outrigger is touching the ground, outrigger is not touching the ground, and so forth. For example, a machine learning model may be trained using training examples to determine states of outriggers from images and/or videos, and step 940 may use the trained machine learning model to analyze the one or more images obtained by step 710 and determine the state of the outrigger of step 930. An example of such training example may include an image and/or a video depicting an outrigger connected to a vehicle, together with a label indicating the state of the depicted outrigger. In another example, an artificial neural network (such as a deep neural networks, convolutional neural networks, etc.) may be configured to determine states of outriggers from images and/or videos, and step 940 may use the artificial neural network to analyze the one or more images obtained by step 710 and determine the state of the outrigger of step 930. In yet another example, step 940 may use image classification algorithms to analyze the one or more images obtained by step 710 and determine the state of the outrigger of step 930. Some other non-limiting examples of steps that may be used by step 940 for determining the state of the outrigger of step 930 are described below.

In some examples, an orientation of at least part of the outrigger (in relation to at least part of the second vehicle, in relation to the ground, in relation to the horizon, in relation to an object in the environment, in relation to the at least part of the first vehicle, in relation to the image sensor, etc.) may be determined, and the determined state of the outrigger may be based on the determined orientation of the at least part of the outrigger. For example, a machine learning model may be trained using training examples to determine orientation of parts of outriggers by analyzing images and/or videos, and the trained machine learning model may be used to determine the orientation of the at least part of the outrigger from the one or more images. In another example, an artificial neural network (such as a deep neural networks, convolutional neural networks, etc.) may be configured to determine orientation of parts of outriggers by analyzing images and/or videos, and the configured artificial neural network may be used to determine the orientation of the at least part of the outrigger from the one or more images. In yet another example, information about the orientation of the at least part of the outrigger may be received from the second vehicle (for example, using a point to point communication protocol, through a communication network using a communication device, through a centralized server, and so forth).

In some examples, a distance of at least part of the outrigger (from at least part of the second vehicle, from the ground, from an object in the environment, from at least part of the first vehicle, from the image sensor, etc.) may be determined, and the determined state of the outrigger may be based on the determined distance of the at least part of the outrigger. For example, a machine learning model may be trained using training examples to determine distance of parts of outriggers by analyzing images and/or videos, and the trained machine learning model may be used to determine the distance of the at least part of the outrigger from the one or more images. In another example, an artificial neural network (such as a deep neural networks, convolutional neural networks, etc.) may be configured to determine distance of parts of outriggers by analyzing images and/or videos, and the configured artificial neural network may be used to determine the distance of the at least part of the outrigger from the one or more images. In yet another example, information about the distance of the at least part of the outrigger may be received from the second vehicle (for example, using a point to point communication protocol, through a communication network using a communication device, through a centralized server, and so forth).

In some examples, a motion of at least part of the outrigger (in relation to at least part of the second vehicle, in relation to the ground, in relation to the horizon, in relation to an object in the environment, in relation to the at least part of the first vehicle, in relation to the image sensor, etc.) may be determined, and the determined state of the outrigger may be based on the determined motion of the at least part of the outrigger. For example, a machine learning model may be trained using training examples to determine motion of parts of outriggers by analyzing images and/or videos, and the trained machine learning model may be used to determine the motion of the at least part of the outrigger from the one or more images. In another example, an artificial neural network (such as a deep neural networks, convolutional neural networks, etc.) may be configured to determine motion of parts of outriggers by analyzing images and/or videos, and the configured artificial neural network may be used to determine the motion of the at least part of the outrigger from the one or more images. In yet another example, information about the motion of the at least part of the outrigger may be received from the second vehicle (for example, using a point to point communication protocol, through a communication network using a communication device, through a centralized server, and so forth).

In some embodiments, step 950 may comprise, for example in response to a first state of the outrigger determined by step 940, causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, passing the outrigger, keeping a minimal distance of at least a selected length from the second vehicle (for example, the selected length may be less than 100 feet, may be at least 100 feet, may be at least 200 feet, etc.), keeping a minimal distance of at least a selected length from the outrigger (for example, the selected length may be less than 100 feet, may be at least 100 feet, may be at least 200 feet, etc.), turning, performing a U-turn, driving in reverse, generating an audible warning, and so forth. For example, step 950 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 950 may provide information related to the second vehicle detected by step 720 (such as position, motion, acceleration, type, dimensions, etc.) to such external device, and the information may be configured to cause the external device to cause the first vehicle to initiate the action responding to the second vehicle detected by step 720. In one example, in response to a second state of the outrigger determined by step 940, step 950 may cause the first vehicle to initiate a second action, the second action may differ from the action.

In some examples, step 950 may select the action based on the state of the outrigger determined by step 940. For example, in response to a first state of the outrigger determined by step 940, step 950 may select a first action, and in response to a second state of the outrigger determined by step 940, step 950 may select a second action (where the second action may differ from the first action, and the second state of the outrigger may differ from the first state of the outrigger). In some examples, in response to a first state of the outrigger determined by step 940, step 950 may select a first action, and in response to a second state of the outrigger determined by step 940, step 950 may withhold and/or forgo the first action (for example, step 950 may withhold and/or forgo causing the first vehicle to initiate the action).

In some examples, a motion of the second vehicle may be determined, for example as described above. Further, in some examples, in response to the determined motion of the second vehicle and the first determined state of the outrigger, the first vehicle may be caused to initiate the action (for example as described above). For example, in response to a first determined motion of the second vehicle and a first determined state of the outrigger, the first vehicle may be caused to initiate a first action; in response to a second determined motion of the second vehicle and the first determined state of the outrigger, the first vehicle may be caused to initiate a second action; and in response to the first determined motion of the second vehicle and a second determined state of the outrigger, the first vehicle may be caused to initiate a third action. In another example, in response to a first determined motion of the second vehicle and a first determined state of the outrigger, the first vehicle may be caused to initiate a first action; in response to a second determined motion of the second vehicle and the first determined state of the outrigger and/or in response to the first determined motion of the second vehicle and a second determined state of the outrigger, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the first determined state of the outrigger, the first vehicle may be caused to initiate the action (for example as described above). For example, in response to a first determined type of the signaling and a first determined state of the outrigger, the first vehicle may be caused to initiate a first action; in response to a second determined type of the signaling and the first determined state of the outrigger, the first vehicle may be caused to initiate a second action; and in response to the first determined type of the signaling and a second determined state of the outrigger, the first vehicle may be caused to initiate a third action. In another example, in response to a first determined type of the signaling and a first determined state of the outrigger, the first vehicle may be caused to initiate a first action; in response to a second determined type of the signaling and the first determined state of the outrigger and/or in response to the first determined type of the signaling and a second determined state of the outrigger, causing the first vehicle to initiate the first action may be withheld and/or forwent. In an additional example, in response to the determination that the second vehicle is signaling and a first determined state of the outrigger, the first vehicle may be caused to initiate a first action; and in response to the determination that the second vehicle is not signaling and the first determined state of the outrigger, the first vehicle may be caused to initiate a second action. In yet another example, in response to the determination that the second vehicle is signaling and a first determined state of the outrigger, the first vehicle may be caused to initiate a first action; and in response to the determination that the second vehicle is not signaling and the first determined state of the outrigger, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and the first determined state of the outrigger, the first vehicle may be caused to initiate the action (for example as described above). For example, in response to a first determined position of the second vehicle and a first determined state of the outrigger, the first vehicle may be caused to initiate a first action; in response to a second determined position of the second vehicle and the first determined state of the outrigger, the first vehicle may be caused to initiate a second action; and in response to the first determined position of the second vehicle and a second determined state of the outrigger, the first vehicle may be caused to initiate a third action. In another example, in response to a first determined position of the second vehicle and a first determined state of the outrigger, the first vehicle may be caused to initiate a first action; in response to a second determined position of the second vehicle and the first determined state of the outrigger and/or in response to the first determined position of the second vehicle and a second determined state of the outrigger, causing the first vehicle to initiate the first action may be withheld and/or forwent. In an additional example, in response to the determination that the second vehicle is in a lane and/or a planned path of the first vehicle and a first determined state of the outrigger, the first vehicle may be caused to initiate a first action; and in response to the determination that the second vehicle is not in a lane and/or is not in a planned path of the first vehicle and the first determined state of the outrigger, the first vehicle may be caused to initiate a second action. In yet another example, in response to the determination that the second vehicle is in a lane and/or a planned path of the first vehicle and a first determined state of the outrigger, the first vehicle may be caused to initiate a first action; and in response to the determination that the second vehicle is not in a lane and/or is not in a planned path of the first vehicle and the first determined state of the outrigger, causing the first vehicle to initiate the first action may be withheld and/or forwent.

In some embodiments, systems, methods and computer readable media for controlling vehicles in response to pumps are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle with a pump has stopped for a longer period of time may include the state of the pump. For example, identifying that the pump is in use may indicate that the vehicle with the pump has stopped for a longer period of time. The provided systems, methods and computer readable media for controlling vehicles may detect a vehicle connected to a pump, identify a state of the pump, and control a response of an autonomous vehicle to the detected vehicle based on the identified state of the pump.

FIG. 10 illustrates an example of a method for controlling vehicles in response to pumps. In this example, method 1000 may comprise: obtaining images captured from an environment of a first vehicle (Step 710); analyzing the images to detect a second vehicle (Step 720); analyzing the images to determine that the second vehicle is connected to a pump (Step 1030); analyzing the images to determine a state of the pump (Step 1040); in response to a first determined state of the pump, causing the first vehicle to initiate an action responding to the second vehicle (Step 1050), and in response to a second determined state of the pump, forgoing causing the first vehicle to initiate the action. In some implementations, method 1000 may comprise one or more additional steps, while some of the steps listed above may be modified or excluded. In some implementations, one or more steps illustrated in FIG. 10 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine that the second vehicle is connected to a pump. Further, in some examples, the one or more images may be analyzed to determine a state of the pump. Further, in some examples, in response to a first determined state of the pump, the first vehicle may be caused to initiate an action responding to the second vehicle.

In some embodiments, step 1030 may analyze the one or more images obtained by step 710 to determine that the second vehicle detected by step 720 is connected to a pump.

For example, a machine learning model may be trained using training examples to determine whether vehicles are connected to pumps from images and/or videos, and step 1030 may use the trained machine learning model to analyze the one or more images obtained by step 710 and determine that the second vehicle detected by step 720 is connected to a pump. An example of such training example may include an image and/or a video depicting a vehicle, together with a label indicating whether the depicted vehicle is connected to a pump. In another example, an artificial neural network (such as a deep neural networks, convolutional neural networks, etc.) may be configured to determine whether vehicles are connected to pumps from images and/or videos, and step 1030 may use the artificial neural network to analyze the one or more images obtained by step 710 and determine that the second vehicle detected by step 720 is connected to a pump. In yet another example, step 1030 may use image classification algorithms to analyze the one or more images obtained by step 710 and determine that the second vehicle detected by step 720 is connected to a pump.

In some embodiments, step 1040 may comprise analyzing the one or more images obtained by step 710 to determine a state of the pump of Step 1030. Some non-limiting examples of such state of the pump may include pump in use, pump not in use, pump connected to ground, pump not connected to ground, pump connected to an accumulation of liquids external to the second vehicle, pump not connected to an accumulation of liquids external to the second vehicle, and so forth. For example, a machine learning model may be trained using training examples to determine states of pumps from images and/or videos, and step 1040 may use the trained machine learning model to analyze the one or more images obtained by step 710 and determine the state of the pump of Step 1030. An example of such training example may include an image and/or a video depicting a pump connected to a vehicle, together with a label indicating the state of the depicted pump. In another example, an artificial neural network (such as a deep neural networks, convolutional neural networks, etc.) may be configured to determine states of pumps from images and/or videos, and step 1040 may use the artificial neural network to analyze the one or more images obtained by step 710 and determine the state of the pump of Step 1030. In yet another example, step 1040 may use image classification algorithms to analyze the one or more images obtained by step 710 and determine the state of the pump of step 1030. Some other non-limiting examples of steps that may be used by step 1040 for determining the state of the pump of step 1030 are described below.

In some examples, an orientation of at least part of a pipe (in relation to at least part of the second vehicle, in relation to the ground, in relation to the horizon, in relation to an object in the environment, in relation to the at least part of the first vehicle, in relation to the image sensor, in relation to at least part of the pump, etc.) may be determined (wherein the pipe may be connected to the pump), and the determined state of the pump may be based on the determined orientation of the at least part of the pipe. For example, a machine learning model may be trained using training examples to determine orientation of parts of pipes connected to pumps by analyzing images and/or videos, and the trained machine learning model may be used to determine the orientation of the at least part of the pipe from the one or more images. In another example, an artificial neural network (such as a deep neural networks, convolutional neural networks, etc.) may be configured to determine orientation of parts of pipes connected to pumps by analyzing images and/or videos, and the configured artificial neural network may be used to determine the orientation of the at least part of the pipe from the one or more images. In yet another example, information about the orientation of the at least part of the pipe may be received from the second vehicle (for example, using a point to point communication protocol, through a communication network using a communication device, through a centralized server, and so forth).

In some examples, a distance of at least part of a pipe (from at least part of the second vehicle, from the ground, from an object in the environment, from at least part of the first vehicle, from the image sensor, from the pump, etc.) may be determined (wherein the pipe may be connected to the pump), and the determined state of the pump may be based on the determined distance of the at least part of the pipe. For example, a machine learning model may be trained using training examples to determine distance of parts of pipes connected to pumps by analyzing images and/or videos, and the trained machine learning model may be used to determine the distance of the at least part of pipe from the one or more images. In another example, an artificial neural network (such as a deep neural networks, convolutional neural networks, etc.) may be configured to determine distance of parts of pipes connected to pumps by analyzing images and/or videos, and the configured artificial neural network may be used to determine the distance of the at least part of the pipe from the one or more images. In yet another example, information about the distance of the at least part of the pipe may be received from the second vehicle (for example, using a point to point communication protocol, through a communication network using a communication device, through a centralized server, and so forth).

In some examples, a motion of at least part of a pipe (in relation to at least part of the second vehicle, in relation to the ground, in relation to the horizon, in relation to an object in the environment, in relation to the at least part of the first vehicle, in relation to the image sensor, in relation to at least part of the pipe, etc.) may be determined (wherein the pipe may be connected to the pump), and the determined state of the pump may be based on the determined motion of the at least part of the pipe. For example, a machine learning model may be trained using training examples to determine motion of parts of pipes connected to pumps by analyzing images and/or videos, and the trained machine learning model may be used to determine the motion of the at least part of the pipe from the one or more images. In another example, an artificial neural network (such as a deep neural networks, convolutional neural networks, etc.) may be configured to determine motion of parts of pipes connected to pumps by analyzing images and/or videos, and the configured artificial neural network may be used to determine the motion of the at least part of the pipe from the one or more images. In yet another example, information about the motion of the at least part of the pipe may be received from the second vehicle (for example, using a point to point communication protocol, through a communication network using a communication device, through a centralized server, and so forth).

In some embodiments, the one or more images obtained by step 710 may be analyzed to detect a pipe connected to the pump, for example as described below. Further, in some examples, the one or more images obtained by step 710 may be analyzed to determine a property of the pipe, for example as described below. Further, in some examples, step 1050 may determine the state of the pump based on the determined property of the pipe. For example, step 1050 may use a function that determines a state of the pipe according to the determined property of the pipe. In another example, step 1050 may use a lookup table that correlates states of the pipe to properties of the pipe and/or ranges of values of properties of the pipe. In yet another example, in response to a first determined property of the pipe, step 1050 may determine a first state of the pump, and in response to a second determined property of the pipe, step 1050 may determine a second state of the pump, the second state of the pump may differ from the first state of the pipe.

In some examples, the one or more images obtained by step 710 may be analyzed to detect a pipe connected to the pump. For example, a machine learning model may be trained using training examples to detect pipes connected to pumps in images and/or videos, and the trained machine learning model may be used to analyze the one or more images obtained by step 710 and detect the pipe connected to the pump in the one or more images. An example of such training example may include an image and/or a video, together with a label indicating whether a pipe connected to the pump appears in the image and/or in the video. In another example, an artificial neural network (such as a deep neural networks, convolutional neural networks, etc.) may be configured detect pipes connected to pumps in images and/or videos, and the configured artificial neural network may be used to analyze the one or more images obtained by step 710 and detect the pipe connected to the pump in the one or more images.

In some examples, the one or more images may be analyzed to determine a property of the pipe. For example, a machine learning model may be trained using training examples to determine properties of pipes by analyzing images and/or videos, and the trained machine learning model may be used to analyze the one or more images obtained by step 710 and determine the property of the pipe. An example of such training example may include an image and/or a video of a pipe, together with a label indicating properties of the pipe. In another example, an artificial neural network (such as a deep neural networks, convolutional neural networks, etc.) may be configured to determine properties of pipes by analyzing images and/or videos, and the configured artificial neural network may be used to analyze the one or more images obtained by step 710 and determine the property of the pipe. In yet another example, the property of the pipe may include and/or be based on a state of the pipe, and step 1140 may be used to determine the state of the pipe.

In some embodiments, step 1050 may comprise, for example in response to a first determined state of the pump determined by step 1040, causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, passing the pump, keeping a minimal distance of at least a selected length from the second vehicle (for example, the selected length may be less than 100 feet, may be at least 100 feet, may be at least 200 feet, etc.), keeping a minimal distance of at least a selected length from the pump (for example, the selected length may be less than 100 feet, may be at least 100 feet, may be at least 200 feet, etc.), turning, performing a U-turn, driving in reverse, generating an audible warning, and so forth. For example, step 1050 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 1050 may provide information related to the second vehicle detected by step 720 (such as position, motion, acceleration, type, dimensions, etc.) to such external device, and the information may be configured to cause the external device to cause the first vehicle to initiate the action responding to the second vehicle detected by step 720. In one example, in response to a second state of the pump determined by step 1040, step 1050 may cause the first vehicle to initiate a second action, the second action may differ from the action.

In some examples, step 1050 may select the action based on the state of the pump determined by step 1040. For example, in response to a first state of the pump determined by step 1040, step 1050 may select a first action, and in response to a second state of the pump determined by step 1040, step 1050 may select a second action (where the second action may differ from the first action, and the second state of the pump may differ from the first state of the pump). In some examples, in response to a first state of the pump determined by step 1040, step 1050 may select a first action, and in response to a second state of the pump determined by step 1040, step 1050 may withhold and/or forgo the first action (for example, step 1050 may withhold and/or forgo causing the first vehicle to initiate the action).

In some examples, a motion of the second vehicle may be determined, for example as described above. Further, in some examples, in response to the determined motion of the second vehicle and the first determined state of the pump, the first vehicle may be caused to initiate the action (for example as described above). For example, in response to a first determined motion of the second vehicle and a first determined state of the pump, the first vehicle may be caused to initiate a first action; in response to a second determined motion of the second vehicle and the first determined state of the pump, the first vehicle may be caused to initiate a second action; and in response to the first determined motion of the second vehicle and a second determined state of the pump, the first vehicle may be caused to initiate a third action. In another example, in response to a first determined motion of the second vehicle and a first determined state of the pump, the first vehicle may be caused to initiate a first action; in response to a second determined motion of the second vehicle and the first determined state of the pump and/or in response to the first determined motion of the second vehicle and a second determined state of the pump, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the first determined state of the pump, the first vehicle may be caused to initiate the action (for example as described above). For example, in response to a first determined type of the signaling and a first determined state of the pump, the first vehicle may be caused to initiate a first action; in response to a second determined type of the signaling and the first determined state of the pump, the first vehicle may be caused to initiate a second action; and in response to the first determined type of the signaling and a second determined state of the pump, the first vehicle may be caused to initiate a third action. In another example, in response to a first determined type of the signaling and a first determined state of the pump, the first vehicle may be caused to initiate a first action; in response to a second determined type of the signaling and the first determined state of the pump and/or in response to the first determined type of the signaling and a second determined state of the pump, causing the first vehicle to initiate the first action may be withheld and/or forwent. In an additional example, in response to the determination that the second vehicle is signaling and a first determined state of the pump, the first vehicle may be caused to initiate a first action; and in response to the determination that the second vehicle is not signaling and the first determined state of the pump, the first vehicle may be caused to initiate a second action. In yet another example, in response to the determination that the second vehicle is signaling and a first determined state of the pump, the first vehicle may be caused to initiate a first action; and in response to the determination that the second vehicle is not signaling and the first determined state of the pump, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and the first determined state of the pump, the first vehicle may be caused to initiate the action (for example as described above). For example, in response to a first determined position of the second vehicle and a first determined state of the pump, the first vehicle may be caused to initiate a first action; in response to a second determined position of the second vehicle and the first determined state of the pump, the first vehicle may be caused to initiate a second action; and in response to the first determined position of the second vehicle and a second determined state of the pump, the first vehicle may be caused to initiate a third action. In another example, in response to a first determined position of the second vehicle and a first determined state of the pump, the first vehicle may be caused to initiate a first action; in response to a second determined position of the second vehicle and the first determined state of the pump and/or in response to the first determined position of the second vehicle and a second determined state of the pump, causing the first vehicle to initiate the first action may be withheld and/or forwent. In an additional example, in response to the determination that the second vehicle is in a lane and/or a planned path of the first vehicle and a first determined state of the pump, the first vehicle may be caused to initiate a first action; and in response to the determination that the second vehicle is not in a lane and/or is not in a planned path of the first vehicle and the first determined state of the pump, the first vehicle may be caused to initiate a second action. In yet another example, in response to the determination that the second vehicle is in a lane and/or a planned path of the first vehicle and a first determined state of the pump, the first vehicle may be caused to initiate a first action; and in response to the determination that the second vehicle is not in a lane and/or is not in a planned path of the first vehicle and the first determined state of the pump, causing the first vehicle to initiate the first action may be withheld and/or forwent.

In some embodiments, systems, methods and computer readable media for controlling vehicles in response to pipes are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle with a pipe has stopped for a longer period of time may include the state of the pipe. For example, identifying that the pipe is in use may indicate that the vehicle with the pipe has stopped for a longer period of time. The provided systems, methods and computer readable media for controlling vehicles may detect a vehicle connected to a pipe, identify a state of the pipe, and control a response of an autonomous vehicle to the detected vehicle based on the identified state of the pipe.

Figure 11:
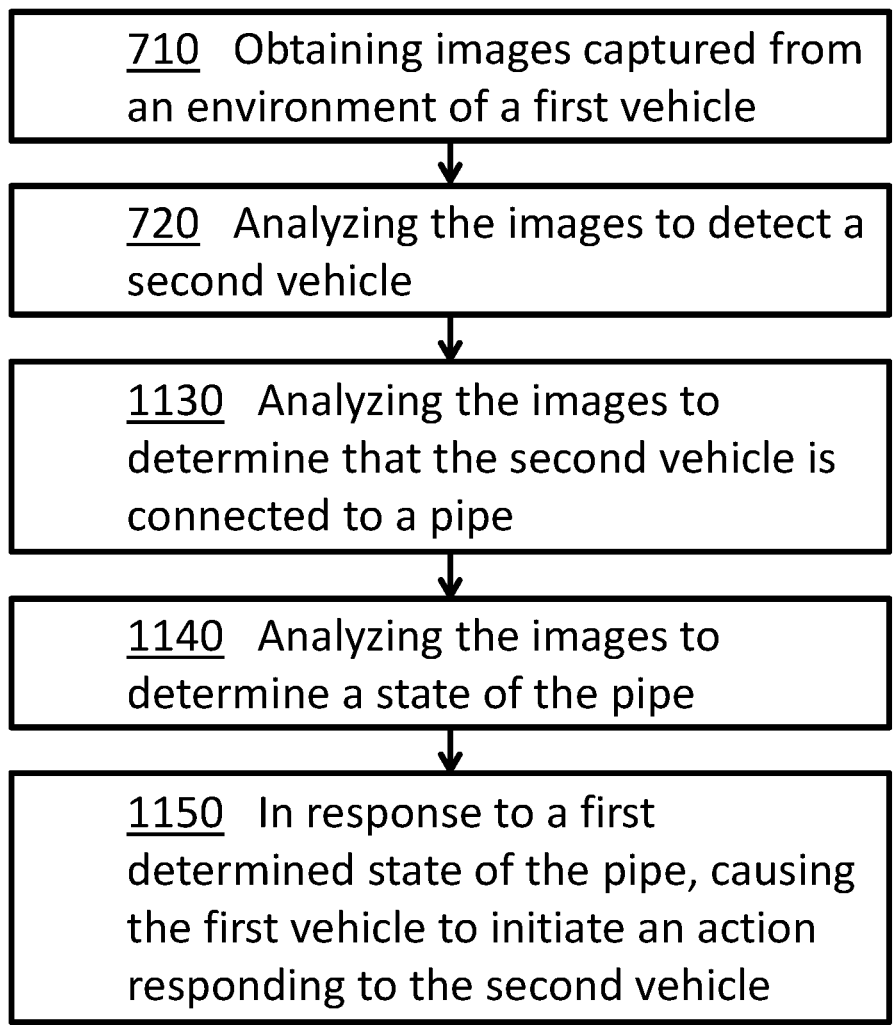
FIG. 11 illustrates an example of a method for controlling vehicles in response to pipes.

FIG. 11 illustrates an example of a method 1100 for controlling vehicles in response to pipes. In this example, method 1100 may comprise: obtaining images captured from an environment of a first vehicle (Step 710); analyzing the images to detect a second vehicle (Step 720); analyzing the images to determine that the second vehicle is connected to a pipe (Step 1130); analyzing the images to determine a state of the pipe (Step 1140); in response to a first determined state of the pipe, causing the first vehicle to initiate an action responding to the second vehicle (Step 1150), and in response to a second determined state of the pipe, forgoing causing the first vehicle to initiate the action. In some implementations, method 1100 may comprise one or more additional steps, while some of the steps listed above may be modified or excluded. In some implementations, one or more steps illustrated in FIG. 11 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine that the second vehicle is connected to a pipe. Further, in some examples, the one or more images may be analyzed to determine a state of the pipe. Further, in some examples, in response to a first determined state of the pipe, the first vehicle may be caused to initiate an action responding to the second vehicle.

In some embodiments, step 1130 may analyze the one or more images obtained by step 710 to determine that the second vehicle detected by step 720 is connected to a pipe. For example, a machine learning model may be trained using training examples to determine whether vehicles are connected to pipes from images and/or videos, and step 1130 may use the trained machine learning model to analyze the one or more images obtained by step 710 and determine that the second vehicle detected by step 720 is connected to a pipe. An example of such training example may include an image and/or a video depicting a vehicle, together with a label indicating whether the depicted vehicle is connected to a pipe. In another example, an artificial neural network (such as a deep neural networks, convolutional neural networks, etc.) may be configured to determine whether vehicles are connected to pipes from images and/or videos, and step 1130 may use the artificial neural network to analyze the one or more images obtained by step 710 and determine that the second vehicle detected by step 720 is connected to a pipe. In yet another example, step 1130 may use image classification algorithms to analyze the one or more images obtained by step 710 and determine that the second vehicle detected by step 720 is connected to a pipe.

In some embodiments, step 1140 may comprise analyzing the one or more images obtained by step 710 to determine a state of the pipe of step 1130. Some non-limiting examples of such state of the pipe may include pipe in use, pipe not in use, pipe touching the ground, pipe not touching the ground, pipe connected to an accumulation of liquids external to the second vehicle, pipe not connected to an accumulation of liquids external to the second vehicle, and so forth. For example, a machine learning model may be trained using training examples to determine states of pipes from images and/or videos, and step 1140 may use the trained machine learning model to analyze the one or more images obtained by step 710 and determine the state of the pipe of step 1130. An example of such training example may include an image and/or a video depicting a pipe connected to a vehicle, together with a label indicating the state of the depicted pipe. In another example, an artificial neural network (such as a deep neural networks, convolutional neural networks, etc.) may be configured to determine states of pipes from images and/or videos, and step 1140 may use the artificial neural network to analyze the one or more images obtained by step 710 and determine the state of the pipe of step 1130. In yet another example, step 1140 may use image classification algorithms to analyze the one or more images obtained by step 710 and determine the state of the pipe of step 1130. Some other non-limiting examples of steps that may be used by step 1140 for determining the state of the pipe of step 1130 are described below.

In some examples, an orientation of at least part of the pipe (in relation to at least part of the second vehicle, in relation to the ground, in relation to the horizon, in relation to an object in the environment, in relation to the at least part of the first vehicle, in relation to the image sensor, etc.) may be determined, and the determined state of the pipe may be based on the determined orientation of the at least part of the pipe. For example, a machine learning model may be trained using training examples to determine orientation of parts of pipes by analyzing images and/or videos, and the trained machine learning model may be used to determine the orientation of the at least part of the pipe from the one or more images. In another example, an artificial neural network (such as a deep neural networks, convolutional neural networks, etc.) may be configured to determine orientation of parts of pipes by analyzing images and/or videos, and the configured artificial neural network may be used to determine the orientation of the at least part of the pipe from the one or more images. In yet another example, information about the orientation of the at least part of the pipe may be received from the second vehicle (for example, using a point to point communication protocol, through a communication network using a communication device, through a centralized server, and so forth).

In some examples, a distance of at least part of the pipe (from at least part of the second vehicle, from the ground, from an object in the environment, from at least part of the first vehicle, from the image sensor, etc.) may be determined, and the determined state of the pipe may be based on the determined distance of the at least part of the pipe. For example, a machine learning model may be trained using training examples to determine distance of parts of pipes by analyzing images and/or videos, and the trained machine learning model may be used to determine the distance of the at least part of the pipe from the one or more images. In another example, an artificial neural network (such as a deep neural networks, convolutional neural networks, etc.) may be configured to determine distance of parts of pipes by analyzing images and/or videos, and the configured artificial neural network may be used to determine the distance of the at least part of the pipe from the one or more images. In yet another example, information about the distance of the at least part of the pipe may be received from the second vehicle (for example, using a point to point communication protocol, through a communication network using a communication device, through a centralized server, and so forth).

In some examples, a motion of at least part of the pipe (in relation to at least part of the second vehicle, in relation to the ground, in relation to the horizon, in relation to an object in the environment, in relation to the at least part of the first vehicle, in relation to the image sensor, etc.) may be determined, and the determined state of the pipe may be based on the determined motion of the at least part of the pipe. For example, a machine learning model may be trained using training examples to determine motion of parts of pipes by analyzing images and/or videos, and the trained machine learning model may be used to determine the motion of the at least part of the pipe from the one or more images. In another example, an artificial neural network (such as a deep neural networks, convolutional neural networks, etc.) may be configured to determine motion of parts of pipes by analyzing images and/or videos, and the configured artificial neural network may be used to determine the motion of the at least part of the pipe from the one or more images. In yet another example, information about the motion of the at least part of the pipe may be received from the second vehicle (for example, using a point to point communication protocol, through a communication network using a communication device, through a centralized server, and so forth).

In some embodiments, step 1150 may comprise, for example in response to a first state of the pipe determined by step 1140, causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, passing the pipe, keeping a minimal distance of at least a selected length from the second vehicle (for example, the selected length may be less than 100 feet, may be at least 100 feet, may be at least 200 feet, etc.), keeping a minimal distance of at least a selected length from the pipe (for example, the selected length may be less than 100 feet, may be at least 100 feet, may be at least 200 feet, etc.), turning, performing a U-turn, driving in reverse, generating an audible warning, and so forth. For example, step 1150 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 1150 may provide information related to the second vehicle detected by step 720 to such external device (such as position, motion, acceleration, type, dimensions, etc.), and the information may be configured cause the external device to cause the first vehicle to initiate the action responding to the second vehicle detected by step 720.

In some examples, step 1150 may select the action based on the state of the pipe determined by step 1140. For example, in response to a first state of the pipe determined by step 1140, step 1150 may select a first action, and in response to a second state of the pipe determined by step 1140, step 1150 may select a second action (where the second action may differ from the first action, and the second state of the pipe may differ from the first state of the pipe). In some examples, in response to a first state of the pipe determined by step 1140, step 1150 may select a first action, and in response to a second state of the pipe determined by step 1140, step 1150 may withhold and/or forgo the first action (for example, step 1150 may withhold and/or forgo causing the first vehicle to initiate the action).

In some examples, a motion of the second vehicle may be determined, for example as described above. Further, in some examples, in response to the determined motion of the second vehicle and the first determined state of the pipe, the first vehicle may be caused to initiate the action (for example as described above). For example, in response to a first determined motion of the second vehicle and a first determined state of the pipe, the first vehicle may be caused to initiate a first action; in response to a second determined motion of the second vehicle and the first determined state of the pipe, the first vehicle may be caused to initiate a second action; and in response to the first determined motion of the second vehicle and a second determined state of the pipe, the first vehicle may be caused to initiate a third action. In another example, in response to a first determined motion of the second vehicle and a first determined state of the pipe, the first vehicle may be caused to initiate a first action; in response to a second determined motion of the second vehicle and the first determined state of the pipe and/or in response to the first determined motion of the second vehicle and a second determined state of the pipe, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the first determined state of the pipe, the first vehicle may be caused to initiate the action (for example as described above). For example, in response to a first determined type of the signaling and a first determined state of the pipe, the first vehicle may be caused to initiate a first action; in response to a second determined type of the signaling and the first determined state of the pipe, the first vehicle may be caused to initiate a second action; and in response to the first determined type of the signaling and a second determined state of the pipe, the first vehicle may be caused to initiate a third action. In another example, in response to a first determined type of the signaling and a first determined state of the pipe, the first vehicle may be caused to initiate a first action; in response to a second determined type of the signaling and the first determined state of the pipe and/or in response to the first determined type of the signaling and a second determined state of the pipe, causing the first vehicle to initiate the first action may be withheld and/or forwent. In an additional example, in response to the determination that the second vehicle is signaling and a first determined state of the pipe, the first vehicle may be caused to initiate a first action; and in response to the determination that the second vehicle is not signaling and the first determined state of the pipe, the first vehicle may be caused to initiate a second action. In yet another example, in response to the determination that the second vehicle is signaling and a first determined state of the pipe, the first vehicle may be caused to initiate a first action; and in response to the determination that the second vehicle is not signaling and the first determined state of the pipe, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and the first determined state of the pipe, the first vehicle may be caused to initiate the action (for example as described above). For example, in response to a first determined position of the second vehicle and a first determined state of the pipe, the first vehicle may be caused to initiate a first action; in response to a second determined position of the second vehicle and the first determined state of the pipe, the first vehicle may be caused to initiate a second action; and in response to the first determined position of the second vehicle and a second determined state of the pipe, the first vehicle may be caused to initiate a third action. In another example, in response to a first determined position of the second vehicle and a first determined state of the pipe, the first vehicle may be caused to initiate a first action; in response to a second determined position of the second vehicle and the first determined state of the pipe and/or in response to the first determined position of the second vehicle and a second determined state of the pipe, causing the first vehicle to initiate the first action may be withheld and/or forwent. In an additional example, in response to the determination that the second vehicle is in a lane and/or a planned path of the first vehicle and a first determined state of the pipe, the first vehicle may be caused to initiate a first action; and in response to the determination that the second vehicle is not in a lane and/or is not in a planned path of the first vehicle and the first determined state of the pipe, the first vehicle may be caused to initiate a second action. In yet another example, in response to the determination that the second vehicle is in a lane and/or a planned path of the first vehicle and a first determined state of the pipe, the first vehicle may be caused to initiate a first action; and in response to the determination that the second vehicle is not in a lane and/or is not in a planned path of the first vehicle and the first determined state of the pipe, causing the first vehicle to initiate the first action may be withheld and/or forwent.

In some embodiments, systems, methods and computer readable media for controlling vehicles in response to objects are provided. One challenge of autonomous driving is to determine when an object has stopped for a short period of time and therefore the autonomous vehicle needs to wait for the object to move (such as a person or a an animal standing on the road, an object being carried by a vehicle, and so forth), and when the object has stopped for a longer period of time and therefore the autonomous vehicle needs to pass the object (such as a dead animal on the road, a rock on the road, and so forth). In some cases, identifying that the object is in being carried by a vehicle may indicate that the object has stopped for a shorter period of time. The provided systems, methods and computer readable media for controlling vehicles may detect an object, determine whether the object is carried by a vehicle, and control a response of an autonomous vehicle to the detected object based on the determination.

FIG. 12 illustrates an example of a method 1200 for controlling vehicles in response to objects. In this example, method 1200 may comprise: obtaining images captured from an environment of a first vehicle (Step 710); analyzing the images to detect an object (Step 1220); analyzing the images to determine whether the object is carried by a second vehicle (Step 1230); in response to a determination that the object is not carried by a second vehicle, causing the first vehicle to initiate an action responding to the object (Step 1240); and in response to a determination that the object is carried by a second vehicle, forgoing causing the first vehicle to initiate the action (Step 1250). Some non-limiting examples of such object may include a third vehicle, a road roller, a tractor, heavy equipment, a scrap, a dead animal, and so forth. In some implementations, method 1200 may comprise one or more additional steps, while some of the steps listed above may be modified or excluded. In some implementations, one or more steps illustrated in FIG. 12 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect an object. Further, in some examples, it may be determined whether the object is carried by a second vehicle (for example, the object may be towed by the second vehicle, the object is loaded onto the second vehicle, and so forth). Further, in some examples, for example in response to the determination that the object is not carried by a second vehicle, the first vehicle may be caused to initiate an action responding to the object. Further, in some examples, for example in response to the determination that the object is carried by a second vehicle, causing the first vehicle to initiate the action may be withheld and/or forwent. Some non-limiting examples of such action may include signaling, stopping, changing a speed of the first vehicle, changing a motion direction of the first vehicle, passing the object, forgoing passing the object, keeping a minimal distance of at least a selected length from the object (for example, the selected length may be less than 100 feet, may be at least 100 feet, may be at least 200 feet, etc.), turning, performing a U-turn, driving in reverse, generating an audible warning, and so forth. Some non-limiting examples of such object may include a third vehicle, a road roller, a tractor, heavy equipment, a scrap, a dead animal, and so forth.

In some embodiments, step 1220 may comprise analyzing the one or more images obtained by step 710 to detect an object (for example, to detect an object of particular types, an object of particular dimensions, an object of any type, and so forth). Some non-limiting examples of such object may include a third vehicle, a road roller, a tractor, heavy equipment, a scrap, an animal, a dead animal, and so forth. For example, a machine learning model may be trained using training examples to detect objects (of particular types, of particular dimensions, of any type, etc.) in images and/or videos, and step 1220 may use the trained machine learning model to analyze the one or more images obtained by step 710 and detect the object in the one or more images. An example of such training example may include an image and/or a video, together with a label indicating whether an object (of particular types, of particular dimensions, of any type, etc.) appears in the image and/or in the video, and/or a position of a depiction of the object in the image and/or in the video. In another example, an artificial neural network (such as a deep neural networks, convolutional neural networks, etc.) may be configured detect objects (of particular types, of particular dimensions, of any type, etc.) in images and/or videos, and step 1220 may use the configured artificial neural network to analyze the one or more images obtained by step 710 and detect the object in the one or more images. In yet another example, step 1220 may use object detection algorithms configured to detect objects (of particular types, of particular dimensions, of any type, etc.) in images and/or videos to detect the object in the one or more images.

In some embodiments, step 1230 may comprise analyzing the one or more images obtained by step 710 to determine whether the object detected by step 1220 is carried by a second vehicle. For example, a machine learning model may be trained using training examples to determine whether objects are carried by vehicles by analyzing images and/or videos, and step 1230 may use the trained machine learning model to analyze the one or more images obtained by step 710 and determine whether the object detected by step 1220 is carried by a second vehicle. An example of such training example may include an image and/or a video depicting a particular object (possibly with an indication of the particular object), together with a label indicating whether the particular object is carried by a vehicle. In another example, an artificial neural network (such as a deep neural networks, convolutional neural networks, etc.) may be configured to determine whether objects are carried by vehicles by analyzing images and/or videos, and step 1230 may use the configured artificial neural network to analyze the one or more images obtained by step 710 and determine whether the object detected by step 1220 is carried by a second vehicle. In yet another example, step 1230 may use object detection algorithms to attempt to detect a vehicle in the one or more images obtained by step 710, may determine that the object detected by step 1220 is carried by a second vehicle in response to a detection of a vehicle under the object detected by step 1220, and may determine that the object detected by step 1220 is not carried by a second vehicle in response to no detection of a vehicle under the object detected by step 1220. In an additional example, step 1230 may use motion detection algorithms to attempt to determine in the one or more images obtained by step 710 a motion of a vehicle and a motion of the object detected by step 1220, may determine that the object detected by step 1220 is carried by a second vehicle in response to the two determined motions being correlated over time (i.e., the vehicle and the object moving in the same speed and direction), and may determine that the object detected by step 1220 is not carried by a second vehicle in response to the two determined motions being uncorrelated over time (i.e., the vehicle and the object not moving in the same speed and direction).

In some examples, step 1230 may comprise analyzing the one or more images obtained by step 710 to determine whether the object detected by step 1220 is towed by a second vehicle, and step 1230 may determine whether the object detected by step 1220 is carried by a second vehicle based on the determination of whether the object detected by step 1220 is towed by a second vehicle. For example, in response to a determination that the object detected by step 1220 is being towed by a second vehicle, step 1230 may determine that the object detected by step 1220 is carried by a second vehicle. In one example, in response a determination that the object detected by step 1220 is not being towed by a second vehicle, step 1230 may determine that the object detected by step 1220 is not carried by a second vehicle. In another example, in response a determination that the object detected by step 1220 is not being towed by a second vehicle, step 1230 may conduct additional steps to determine whether the object detected by step 1220 is carried by a second vehicle. In one example, a machine learning model may be trained using training examples to determine whether objects are towed by vehicles by analyzing images and/or videos, and step 1230 may use the trained machine learning model to analyze the one or more images obtained by step 710 and determine whether the object detected by step 1220 is towed by a second vehicle. An example of such training example may include an image and/or a video depicting a particular object (possibly with an indication of the particular object), together with a label indicating whether the particular object is towed by a vehicle. In another example, an artificial neural network (such as a deep neural networks, convolutional neural networks, etc.) may be configured to determine whether objects are towed by vehicles by analyzing images and/or videos, and step 1230 may use the configured artificial neural network to analyze the one or more images obtained by step 710 and determine whether the object detected by step 1220 is towed by a second vehicle.

In some examples, step 1230 may comprise analyzing the one or more images obtained by step 710 to determine whether the object detected by step 1220 is loaded onto a second vehicle, and step 1230 may determine whether the object detected by step 1220 is carried by a second vehicle based on the determination of whether the object detected by step 1220 is loaded onto a second vehicle. For example, in response to a determination that the object detected by step 1220 is being loaded onto a second vehicle, step 1230 may determine that the object detected by step 1220 is carried by a second vehicle. In one example, in response a determination that the object detected by step 1220 is not being loaded onto a second vehicle, step 1230 may determine that the object detected by step 1220 is not carried by a second vehicle. In another example, in response a determination that the object detected by step 1220 is not being loaded onto a second vehicle, step 1230 may conduct additional steps to determine whether the object detected by step 1220 is carried by a second vehicle. In one example, a machine learning model may be trained using training examples to determine whether objects are loaded onto vehicles by analyzing images and/or videos, and step 1230 may use the trained machine learning model to analyze the one or more images obtained by step 710 and determine whether the object detected by step 1220 is loaded onto a second vehicle. An example of such training example may include an image and/or a video depicting a particular object (possibly with an indication of the particular object), together with a label indicating whether the particular object is loaded onto a vehicle. In another example, an artificial neural network (such as a deep neural networks, convolutional neural networks, etc.) may be configured to determine whether objects are loaded onto vehicles by analyzing images and/or videos, and step 1230 may use the configured artificial neural network to analyze the one or more images obtained by step 710 and determine whether the object detected by step 1220 is loaded onto a second vehicle.

Additionally or alternatively, indication that the second vehicle is carrying the object and/or information about the object carried by the second vehicle may be received from the second vehicle (for example, using a point to point communication protocol, through a communication network using a communication device, through a centralized server, and so forth), and step 1230 may determine that the object is carried by the second vehicle based on the received indication and/or on the received information.

In some embodiments, step 1240 may comprise, for example in response to a determination by step 1230 that the object is not carried by a second vehicle, causing the first vehicle to initiate an action responding to the object. Some non-limiting examples of such action may include signaling, stopping, changing a speed of the first vehicle, changing a motion direction of the first vehicle, passing the object, forgoing passing the object, keeping a minimal distance of at least a selected length from the object (for example, the selected length may be less than 100 feet, may be at least 100 feet, may be at least 200 feet, etc.), turning, performing a U-turn, driving in reverse, generating an audible warning, and so forth. Further, in some examples, in response to the determination that the object is carried by a second vehicle, step 1240 (and step 1250) may withhold and/or forgo causing the first vehicle to initiate the action. In one example, step 1240 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the object. In another example, step 1240 may provide information related to the object (such as position, type, dimensions, etc.) to such external device, and the information may be configured to cause the external device to cause the first vehicle to initiate the action responding to the object.

Additionally or alternatively, in response to a determination by step 1230 that the object is carried by a second vehicle, step 1250 may cause the first vehicle to initiate a different action responding to the object, for example by transmitting a signal and/or by providing information as described above in relation to step 1240.

In some examples, step 1220 may analyze the one or more images obtained by step 710 to detect an animal (for example as described above), and step 1230 may analyze the one or more images obtained by step 710 to determine whether the animal detected by step 1220 is carried by a second vehicle (for example as described above). Further, in one example, in response to a determination by step 1230 that the animal detected by step 1220 is not carried by a second vehicle, step 1240 may cause the first vehicle to initiate an action responding to the animal detected by step 1220 (for example as described above), and in response to a determination by step 1230 that the object is carried by a second vehicle, step 1250 may withhold and/or forgo causing the first vehicle to initiate the action.

In some examples, step 1220 may analyze the one or more images obtained by step 710 to detect a dead animal (for example as described above), and step 1230 may analyze the one or more images obtained by step 710 to determine whether the dead animal detected by step 1220 is carried by a second vehicle (for example as described above). Further, in one example, in response to a determination by step 1230 that the dead animal detected by step 1220 is not carried by a second vehicle, step 1240 may cause the first vehicle to initiate an action responding to the dead animal detected by step 1220 (for example as described above), and in response to a determination by step 1230 that the object is carried by a second vehicle, step 1250 may withhold and/or forgo causing the first vehicle to initiate the action.

In some examples, step 1220 may analyze the one or more images obtained by step 710 to detect a scrap (for example as described above), and step 1230 may analyze the one or more images obtained by step 710 to determine whether the scrap detected by step 1220 is carried by a second vehicle (for example as described above). Further, in one example, in response to a determination by step 1230 that the scrap detected by step 1220 is not carried by a second vehicle, step 1240 may cause the first vehicle to initiate an action responding to the scrap detected by step 1220 (for example as described above), and in response to a determination by step 1230 that the object is carried by a second vehicle, step 1250 may withhold and/or forgo causing the first vehicle to initiate the action.

In some examples, step 1220 may analyze the one or more images obtained by step 710 to detect a heavy equipment (for example as described above), and step 1230 may analyze the one or more images obtained by step 710 to determine whether the heavy equipment detected by step 1220 is carried by a second vehicle (for example as described above). Further, in one example, in response to a determination by step 1230 that the heavy equipment detected by step 1220 is not carried by a second vehicle, step 1240 may cause the first vehicle to initiate an action responding to the heavy equipment detected by step 1220 (for example as described above), and in response to a determination by step 1230 that the object is carried by a second vehicle, step 1250 may withhold and/or forgo causing the first vehicle to initiate the action.

In some examples, step 1220 may analyze the one or more images obtained by step 710 to detect a tractor (for example as described above), and step 1230 may analyze the one or more images obtained by step 710 to determine whether the tractor detected by step 1220 is carried by a second vehicle (for example as described above). Further, in one example, in response to a determination by step 1230 that the tractor detected by step 1220 is not carried by a second vehicle, step 1240 may cause the first vehicle to initiate an action responding to the tractor detected by step 1220 (for example as described above), and in response to a determination by step 1230 that the object is carried by a second vehicle, step 1250 may withhold and/or forgo causing the first vehicle to initiate the action.

In some examples, step 1220 may analyze the one or more images obtained by step 710 to detect a road roller (for example as described above), and step 1230 may analyze the one or more images obtained by step 710 to determine whether the road roller detected by step 1220 is carried by a second vehicle (for example as described above). Further, in one example, in response to a determination by step 1230 that the road roller detected by step 1220 is not carried by a second vehicle, step 1240 may cause the first vehicle to initiate an action responding to the road roller detected by step 1220 (for example as described above), and in response to a determination by step 1230 that the object is carried by a second vehicle, step 1250 may withhold and/or forgo causing the first vehicle to initiate the action.

In some examples, step 1220 may analyze the one or more images obtained by step 710 to detect a third vehicle (for example as described above), and step 1230 may analyze the one or more images obtained by step 710 to determine whether the third vehicle detected by step 1220 is carried by a second vehicle (for example as described above). Further, in one example, in response to a determination by step 1230 that the third vehicle detected by step 1220 is not carried by a second vehicle, step 1240 may cause the first vehicle to initiate an action responding to the third vehicle detected by step 1220 (for example as described above), and in response to a determination by step 1230 that the object is carried by a second vehicle, step 1250 may withhold and/or forgo causing the first vehicle to initiate the action.

In some embodiments, systems, methods and computer readable media for controlling vehicles based on doors of other vehicles are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle with a door has stopped for a longer period of time may include the state of the door. For example, identifying that the door is open may indicate that the vehicle with the door has stopped for a longer period of time. The provided systems, methods and computer readable media for controlling vehicles may detect a vehicle connected to a door, identify a state of the door, and control a response of an autonomous vehicle to the detected vehicle based on the identified state of the door.

FIG. 13 illustrates an example of a method 1300 for controlling vehicles based on doors of other vehicles. In this example, method 1300 may comprise: obtaining images captured from an environment of a first vehicle (Step 710); analyzing the images to detect a second vehicle (Step 720); analyzing the images to determine a state of a door of the second vehicle (Step 1330); in response to a first determined state of the door, causing the first vehicle to initiate an action responding to the second vehicle (Step 1340), and in response to a second determined state of the door, forgoing causing the first vehicle to initiate the action. In some implementations, method 1300 may comprise one or more additional steps, while some of the steps listed above may be modified or excluded. In some implementations, one or more steps illustrated in FIG. 13 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine a state of a door of the second vehicle. Further, in some examples, in response to a first determined state of the door of the second vehicle, the first vehicle may be caused to initiate an action responding to the second vehicle.

In some embodiments, step 1330 may comprise analyzing the one or more images obtained by step 710 to determine a state of the door of the second vehicle detected by step 720. Some non-limiting examples of such state of the door of the second vehicle may include door of the second vehicle in open, door of the second vehicle not in close, door of the second vehicle completely open, door of the second vehicle substantially closed, door of the second vehicle in opening, door of the second vehicle not in closing, and so forth. For example, a machine learning model may be trained using training examples to determine states of doors from images and/or videos, and step 1330 may use the trained machine learning model to analyze the one or more images obtained by step 710 and determine the state of the door of the second vehicle detected by step 720. An example of such training example may include an image and/or a video depicting a vehicle, together with a label indicating the state of a door of the depicted vehicle. In another example, an artificial neural network (such as a deep neural networks, convolutional neural networks, etc.) may be configured to determine states of doors from images and/or videos, and step 1330 may use the artificial neural network to analyze the one or more images obtained by step 710 and determine the state of the door of the second vehicle detected by step 720. In yet another example, step 1330 may use image classification algorithms to analyze the one or more images obtained by step 710 and determine the state of the door of the second vehicle detected by step 720. Some other non-limiting examples of steps that may be used by step 1330 for determining the state of the door of the second vehicle are described below.

In some examples, an orientation of at least part of the door of the second vehicle (in relation to at least one other part of the second vehicle, in relation to the ground, in relation to the horizon, in relation to an object in the environment, in relation to the at least part of the first vehicle, in relation to the image sensor, etc.) may be determined, and the determined state of the door of the second vehicle may be based on the determined orientation of the at least part of the door of the second vehicle. For example, a machine learning model may be trained using training examples to determine orientation of parts of doors by analyzing images and/or videos, and the trained machine learning model may be used to determine the orientation of the at least part of the door of the second vehicle from the one or more images. In another example, an artificial neural network (such as a deep neural networks, convolutional neural networks, etc.) may be configured to determine orientation of parts of doors by analyzing images and/or videos, and the configured artificial neural network may be used to determine the orientation of the at least part of the door of the second vehicle from the one or more images. In yet another example, information about the orientation of the at least part of the door of the second vehicle may be received from the second vehicle (for example, using a point to point communication protocol, through a communication network using a communication device, through a centralized server, and so forth).

In some examples, a distance of at least part of the door of the second vehicle (from at least part of the second vehicle, from the ground, from an object in the environment, from at least part of the first vehicle, from the image sensor, etc.) may be determined, and the determined state of the door of the second vehicle may be based on the determined distance of the at least part of the door of the second vehicle. For example, a machine learning model may be trained using training examples to determine distance of parts of doors by analyzing images and/or videos, and the trained machine learning model may be used to determine the distance of the at least part of the door of the second vehicle from the one or more images. In another example, an artificial neural network (such as a deep neural networks, convolutional neural networks, etc.) may be configured to determine distance of parts of doors by analyzing images and/or videos, and the configured artificial neural network may be used to determine the distance of the at least part of the door of the second vehicle from the one or more images. In yet another example, information about the distance of the at least part of the door of the second vehicle may be received from the second vehicle (for example, using a point to point communication protocol, through a communication network using a communication device, through a centralized server, and so forth).

In some examples, a motion of at least part of the door of the second vehicle (in relation to at least one other part of the second vehicle, in relation to the ground, in relation to the horizon, in relation to an object in the environment, in relation to the at least part of the first vehicle, in relation to the image sensor, etc.) may be determined, and the determined state of the door of the second vehicle may be based on the determined motion of the at least part of the door of the second vehicle. For example, a machine learning model may be trained using training examples to determine motion of parts of doors by analyzing images and/or videos, and the trained machine learning model may be used to determine the motion of the at least part of the door of the second vehicle from the one or more images. In another example, an artificial neural network (such as a deep neural networks, convolutional neural networks, etc.) may be configured to determine motion of parts of doors by analyzing images and/or videos, and the configured artificial neural network may be used to determine the motion of the at least part of the door of the second vehicle from the one or more images. In yet another example, information about the motion of the at least part of the door of the second vehicle may be received from the second vehicle (for example, using a point to point communication protocol, through a communication network using a communication device, through a centralized server, and so forth).

In some embodiments, step 1340 may comprise, for example in response to a first state of the door of the second vehicle detected by step 720 (e.g., as determined by step 1330), causing the first vehicle to initiate an action responding to the second vehicle. Some non-limiting examples of such action may include signaling, stopping, changing a speed of the first vehicle, changing a motion direction of the first vehicle, passing the second vehicle, forgoing passing the second vehicle, passing the door, keeping a minimal distance of at least a selected length from the second vehicle (for example, the selected length may be less than 10 feet, may be at least 10 feet, may be at least 20 feet, etc.), keeping a minimal distance of at least a selected length from the door (for example, the selected length may be less than 10 feet, may be at least 10 feet, may be at least 20 feet, etc.), turning, performing a U-turn, driving in reverse, generating an audible warning, and so forth. For example, step 1340 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 1340 may provide information related to the second vehicle detected by step 720 (such as position, motion, acceleration, type, dimensions, etc.) to such external device, and the information may be configured to cause the external device to cause the first vehicle to initiate the action responding to the second vehicle detected by step 720. In one example, in response to a second state of the door of the second vehicle detected by step 720 (e.g., as determined by step 1330), step 1340 may cause the first vehicle to initiate a second action, the second action may differ from the action.

In some examples, step 1340 may select the action based on the state of the door of the second vehicle detected by step 720 (e.g., as determined by step 1330). For example, in response to a first state of the door of the second vehicle detected by step 720 (e.g., as determined by step 1330), step 1340 may select a first action, and in response to a second state of the door of the second vehicle detected by step 720 (e.g., as determined by step 1330), step 1340 may select a second action (where the second action may differ from the first action, and the second state of the door of the second vehicle may differ from the first state of the door of the second vehicle). In some examples, in response to a first state of the door of the second vehicle detected by step 720 (e.g., as determined by step 1330), step 1340 may select a first action, and in response to a second state of the door of the second vehicle detected by step 720 (e.g., as determined by step 1330), step 1340 may withhold and/or forgo the first action (for example, step 1340 may withhold and/or forgo causing the first vehicle to initiate the action).

In some examples, a motion of the second vehicle may be determined, for example as described above. Further, in some examples, in response to the determined motion of the second vehicle and the first determined state of the door of the second vehicle, the first vehicle may be caused to initiate the action (for example as described above). For example, in response to a first determined motion of the second vehicle and a first determined state of the door of the second vehicle, the first vehicle may be caused to initiate a first action; in response to a second determined motion of the second vehicle and the first determined state of the door of the second vehicle, the first vehicle may be caused to initiate a second action; and in response to the first determined motion of the second vehicle and a second determined state of the door of the second vehicle, the first vehicle may be caused to initiate a third action. In another example, in response to a first determined motion of the second vehicle and a first determined state of the door of the second vehicle, the first vehicle may be caused to initiate a first action; in response to a second determined motion of the second vehicle and the first determined state of the door of the second vehicle and/or in response to the first determined motion of the second vehicle and a second determined state of the door of the second vehicle, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the first determined state of the door of the second vehicle, the first vehicle may be caused to initiate the action (for example as described above). For example, in response to a first determined type of the signaling and a first determined state of the door of the second vehicle, the first vehicle may be caused to initiate a first action; in response to a second determined type of the signaling and the first determined state of the door of the second vehicle, the first vehicle may be caused to initiate a second action; and in response to the first determined type of the signaling and a second determined state of the door of the second vehicle, the first vehicle may be caused to initiate a third action. In another example, in response to a first determined type of the signaling and a first determined state of the door of the second vehicle, the first vehicle may be caused to initiate a first action; in response to a second determined type of the signaling and the first determined state of the door of the second vehicle and/or in response to the first determined type of the signaling and a second determined state of the door of the second vehicle, causing the first vehicle to initiate the first action may be withheld and/or forwent. In an additional example, in response to the determination that the second vehicle is signaling and a first determined state of the door of the second vehicle, the first vehicle may be caused to initiate a first action; and in response to the determination that the second vehicle is not signaling and the first determined state of the door of the second vehicle, the first vehicle may be caused to initiate a second action. In yet another example, in response to the determination that the second vehicle is signaling and a first determined state of the door of the second vehicle, the first vehicle may be caused to initiate a first action; and in response to the determination that the second vehicle is not signaling and the first determined state of the door of the second vehicle, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and the first determined state of the door of the second vehicle, the first vehicle may be caused to initiate the action (for example as described above). For example, in response to a first determined position of the second vehicle and a first determined state of the door of the second vehicle, the first vehicle may be caused to initiate a first action; in response to a second determined position of the second vehicle and the first determined state of the door of the second vehicle, the first vehicle may be caused to initiate a second action; and in response to the first determined position of the second vehicle and a second determined state of the door of the second vehicle, the first vehicle may be caused to initiate a third action. In another example, in response to a first determined position of the second vehicle and a first determined state of the door of the second vehicle, the first vehicle may be caused to initiate a first action; in response to a second determined position of the second vehicle and the first determined state of the door of the second vehicle and/or in response to the first determined position of the second vehicle and a second determined state of the door of the second vehicle, causing the first vehicle to initiate the first action may be withheld and/or forwent. In an additional example, in response to the determination that the second vehicle is in a lane and/or a planned path of the first vehicle and a first determined state of the door of the second vehicle, the first vehicle may be caused to initiate a first action; and in response to the determination that the second vehicle is not in a lane and/or is not in a planned path of the first vehicle and the first determined state of the door of the second vehicle, the first vehicle may be caused to initiate a second action. In yet another example, in response to the determination that the second vehicle is in a lane and/or a planned path of the first vehicle and a first determined state of the door of the second vehicle, the first vehicle may be caused to initiate a first action; and in response to the determination that the second vehicle is not in a lane and/or is not in a planned path of the first vehicle and the first determined state of the door of the second vehicle, causing the first vehicle to initiate the first action may be withheld and/or forwent.

In some embodiments, systems, methods and computer readable media for controlling vehicles based on users of other vehicles are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle has stopped for a longer period of time may include the state of the user. For example, identifying that the user is embarking and/or disembarking the vehicle may indicate that the vehicle has stopped for a longer period of time. The provided systems, methods and computer readable media for controlling vehicles may detect a vehicle, identify a state of a user of the vehicle, and control a response of an autonomous vehicle to the detected vehicle based on the identified state of the user.

FIG. 14 illustrates an example of a method 1400 for controlling vehicles based on users of other vehicles. In this example, method 1400 may comprise: obtaining images captured from an environment of a first vehicle (Step 710); analyzing the images to detect a second vehicle (Step 720); analyzing the images to determine a state of a user associated with the second vehicle (Step 1430); in response to a first determined state of the user, causing the first vehicle to initiate an action responding to the second vehicle (Step 1440), and in response to a second determined state of the user, forgoing causing the first vehicle to initiate the action. Some non-limiting examples of such user of the second vehicle may include a driver of the second vehicle, a passenger of the second vehicle, and so forth. In one example, the second vehicle detected by step 720 may be a garbage truck, and the user may be a waste collector. In some implementations, method 1400 may comprise one or more additional steps, while some of the steps listed above may be modified or excluded. In some implementations, one or more steps illustrated in FIG. 14 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine a state of a user of the second vehicle. Further, in some examples, in response to a first determined state of the user of the second vehicle, the first vehicle may be caused to initiate an action responding to the second vehicle.

In some embodiments, step 1430 may comprise analyzing the one or more images obtained by step 710 to determine a state of a user of the second vehicle detected by step 720. Some non-limiting examples of such state of the user of the second vehicle may include embarking the second vehicle, disembarking the second vehicle, driving the second vehicle, sitting in the second vehicle, being in the second vehicle, and so forth. For example, a machine learning model may be trained using training examples to determine states of users of vehicles from images and/or videos, and step 1430 may use the trained machine learning model to analyze the one or more images obtained by step 710 and determine the state of the user of the second vehicle. An example of such training example may include an image and/or a video depicting a user of a vehicle, together with a label indicating the state of the depicted user. In another example, an artificial neural network (such as a deep neural networks, convolutional neural networks, etc.) may be configured to determine states of users of vehicles from images and/or videos, and step 1430 may use the artificial neural network to analyze the one or more images obtained by step 710 and determine the state of the user of the second vehicle. In yet another example, step 1430 may use image classification algorithms to analyze the one or more images obtained by step 710 and determine the state of the user of the second vehicle. Some other non-limiting examples of steps that may be used by step 1430 for determining the state of the user of the second vehicle are described below.

In some examples, an orientation of at least part of the user of the second vehicle (in relation to at least one other part of the second vehicle, in relation to the ground, in relation to the horizon, in relation to an object in the environment, in relation to the at least part of the first vehicle, in relation to the image sensor, etc.) may be determined, and the determined state of the user of the second vehicle may be based on the determined orientation of the at least part of the user of the second vehicle. For example, a machine learning model may be trained using training examples to determine orientation of parts of users by analyzing images and/or videos, and the trained machine learning model may be used to determine the orientation of the at least part of the user of the second vehicle from the one or more images. In another example, an artificial neural network (such as a deep neural networks, convolutional neural networks, etc.) may be configured to determine orientation of parts of users by analyzing images and/or videos, and the configured artificial neural network may be used to determine the orientation of the at least part of the user of the second vehicle from the one or more images. In yet another example, information about the orientation of the at least part of the user of the second vehicle may be received from the second vehicle (for example, using a point to point communication protocol, through a communication network using a communication device, through a centralized server, and so forth).

In some examples, a distance of at least part of the user of the second vehicle (from at least part of the second vehicle, from the ground, from an object in the environment, from at least part of the first vehicle, from the image sensor, etc.) may be determined, and the determined state of the user of the second vehicle may be based on the determined distance of the at least part of the user of the second vehicle. For example, a machine learning model may be trained using training examples to determine distance of parts of users by analyzing images and/or videos, and the trained machine learning model may be used to determine the distance of the at least part of the user of the second vehicle from the one or more images. In another example, an artificial neural network (such as a deep neural networks, convolutional neural networks, etc.) may be configured to determine distance of parts of users by analyzing images and/or videos, and the configured artificial neural network may be used to determine the distance of the at least part of the user of the second vehicle from the one or more images. In yet another example, information about the distance of the at least part of the user of the second vehicle may be received from the second vehicle (for example, using a point to point communication protocol, through a communication network using a communication device, through a centralized server, and so forth).

In some examples, a motion of at least part of the user of the second vehicle (in relation to at least one other part of the second vehicle, in relation to the ground, in relation to the horizon, in relation to an object in the environment, in relation to the at least part of the first vehicle, in relation to the image sensor, etc.) may be determined, and the determined state of the user of the second vehicle may be based on the determined motion of the at least part of the user of the second vehicle. For example, a machine learning model may be trained using training examples to determine motion of parts of users by analyzing images and/or videos, and the trained machine learning model may be used to determine the motion of the at least part of the user of the second vehicle from the one or more images. In another example, an artificial neural network (such as a deep neural networks, convolutional neural networks, etc.) may be configured to determine motion of parts of users by analyzing images and/or videos, and the configured artificial neural network may be used to determine the motion of the at least part of the user of the second vehicle from the one or more images. In yet another example, information about the motion of the at least part of the user of the second vehicle may be received from the second vehicle (for example, using a point to point communication protocol, through a communication network using a communication device, through a centralized server, and so forth).

In some embodiments, step 1440 may comprise, for example in response to a first determined state of the user of the second vehicle detected by step 720 (e.g., as determined by step 1430), causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, passing the user, keeping a minimal distance of at least a selected length from the second vehicle (for example, the selected length may be less than 10 feet, may be at least 10 feet, may be at least 20 feet, etc.), keeping a minimal distance of at least a selected length from the user (for example, the selected length may be less than 10 feet, may be at least 10 feet, may be at least 20 feet, etc.), turning, performing a U-turn, driving in reverse, generating an audible warning, and so forth. For example, step 1440 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 1440 may provide information related to the second vehicle detected by step 720 (such as position, motion, acceleration, type, dimensions, etc.) to such external device, and the information may be configured to cause the external device to cause the first vehicle to initiate the action responding to the second vehicle detected by step 720. In one example, in response a second state of the user of the second vehicle detected by step 720 (e.g., as determined by step 1430), step 1440 may cause the first vehicle to initiate a second action, the second action may differ from the action.

In some examples, step 1440 may select the action based on the determined state of the user of the second vehicle detected by step 720 (e.g., as determined by step 1430). For example, in response to a first state of the user of the second vehicle detected by step 720 (e.g., as determined by step 1430), step 1440 may select a first action, and in response to a second state of the user of the second vehicle detected by step 720 (e.g., as determined by step 1430), step 1440 may select a second action (where the second action may differ from the first action, and the second state of the user of the second vehicle may differ from the first state of the user of the second vehicle). In some examples, in response to a first state of the user of the second vehicle detected by step 720 (e.g., as determined by step 1430), step 1440 may select a first action, and in response to a second state of the user of the second vehicle detected by step 720 (e.g., as determined by step 1430), step 1440 may withhold and/or forgo the first action (for example, step 1440 may withhold and/or forgo causing the first vehicle to initiate the action).

In some examples, a motion of the second vehicle may be determined, for example as described above. Further, in some examples, in response to the determined motion of the second vehicle and the first determined state of the user of the second vehicle, the first vehicle may be caused to initiate the action (for example as described above). For example, in response to a first determined motion of the second vehicle and a first determined state of the user of the second vehicle, the first vehicle may be caused to initiate a first action; in response to a second determined motion of the second vehicle and the first determined state of the user of the second vehicle, the first vehicle may be caused to initiate a second action; and in response to the first determined motion of the second vehicle and a second determined state of the user of the second vehicle, the first vehicle may be caused to initiate a third action. In another example, in response to a first determined motion of the second vehicle and a first determined state of the user of the second vehicle, the first vehicle may be caused to initiate a first action; in response to a second determined motion of the second vehicle and the first determined state of the user of the second vehicle and/or in response to the first determined motion of the second vehicle and a second determined state of the user of the second vehicle, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the first determined state of the user of the second vehicle, the first vehicle may be caused to initiate the action (for example as described above). For example, in response to a first determined type of the signaling and a first determined state of the user of the second vehicle, the first vehicle may be caused to initiate a first action; in response to a second determined type of the signaling and the first determined state of the user of the second vehicle, the first vehicle may be caused to initiate a second action; and in response to the first determined type of the signaling and a second determined state of the user of the second vehicle, the first vehicle may be caused to initiate a third action. In another example, in response to a first determined type of the signaling and a first determined state of the user of the second vehicle, the first vehicle may be caused to initiate a first action; in response to a second determined type of the signaling and the first determined state of the user of the second vehicle and/or in response to the first determined type of the signaling and a second determined state of the user of the second vehicle, causing the first vehicle to initiate the first action may be withheld and/or forwent. In an additional example, in response to the determination that the second vehicle is signaling and a first determined state of the user of the second vehicle, the first vehicle may be caused to initiate a first action; and in response to the determination that the second vehicle is not signaling and the first determined state of the user of the second vehicle, the first vehicle may be caused to initiate a second action. In yet another example, in response to the determination that the second vehicle is signaling and a first determined state of the user of the second vehicle, the first vehicle may be caused to initiate a first action; and in response to the determination that the second vehicle is not signaling and the first determined state of the user of the second vehicle, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and the first determined state of the user of the second vehicle, the first vehicle may be caused to initiate the action (for example as described above). For example, in response to a first determined position of the second vehicle and a first determined state of the user of the second vehicle, the first vehicle may be caused to initiate a first action; in response to a second determined position of the second vehicle and the first determined state of the user of the second vehicle, the first vehicle may be caused to initiate a second action; and in response to the first determined position of the second vehicle and a second determined state of the user of the second vehicle, the first vehicle may be caused to initiate a third action. In another example, in response to a first determined position of the second vehicle and a first determined state of the user of the second vehicle, the first vehicle may be caused to initiate a first action; in response to a second determined position of the second vehicle and the first determined state of the user of the second vehicle and/or in response to the first determined position of the second vehicle and a second determined state of the user of the second vehicle, causing the first vehicle to initiate the first action may be withheld and/or forwent. In an additional example, in response to the determination that the second vehicle is in a lane and/or a planned path of the first vehicle and a first determined state of the user of the second vehicle, the first vehicle may be caused to initiate a first action; and in response to the determination that the second vehicle is not in a lane and/or is not in a planned path of the first vehicle and the first determined state of the user of the second vehicle, the first vehicle may be caused to initiate a second action. In yet another example, in response to the determination that the second vehicle is in a lane and/or a planned path of the first vehicle and a first determined state of the user of the second vehicle, the first vehicle may be caused to initiate a first action; and in response to the determination that the second vehicle is not in a lane and/or is not in a planned path of the first vehicle and the first determined state of the user of the second vehicle, causing the first vehicle to initiate the first action may be withheld and/or forwent.

In some embodiments, the one or more images obtained by step 710 may be analyzed to detect a person in a vicinity of the second vehicle detected by step 720, for example as described below. Further, in some examples, the one or more images obtained by step 710 may be analyzed to determine that the person is speaking with the user, for example as described below. Further, in some examples, step 1440 may cause the first vehicle to initiate an action responding to the second vehicle detected by step 720, for example in response to the determination that the person is speaking with the user.

In some examples, the one or more images obtained by step 710 may be analyzed to detect a person in a vicinity of the second vehicle detected by step 720. For example, a machine learning model may be trained using training examples to detect persons in vicinity of vehicles by analyzing images and/or videos, and the trained machine learning model may be used to analyze the one or more images obtained by step 710 and detect persons in the vicinity of the second vehicle detected by step 720. An example of such training example may include an image and/or a video depicting a vehicle, together with a label indicating whether a person is present in the vicinity of the depicted vehicle. In another example, an artificial neural network (such as a deep neural networks, convolutional neural networks, etc.) may be configured to detect persons in vicinity of vehicles by analyzing images and/or videos, and the artificial neural network may be used to analyze the one or more images obtained by step 710 and detect persons in the vicinity of the second vehicle detected by step 720. In yet another example, person detection algorithms may be used to detect people in the one or more images obtained by step 710, the location of the second vehicle detected by step 720 may be compared with the locations of the detected people to determine whether any of the detected people are in the vicinity of the second vehicle detected by step 720.

In some examples, the one or more images obtained by step 710 may be analyzed to determine whether a person in the vicinity of the second vehicle detected by step 720 is speaking with a user of the second vehicle. For example, the one or more images obtained by step 710 may be analyzed to determine whether the person detected in the vicinity of the second vehicle detected by step 720 is speaking with a user of the second vehicle. For example, a machine learning model may be trained using training examples to determine whether persons are talking with users of vehicles by analyzing images and/or videos, and the trained machine learning model may be used to analyze the one or more images obtained by step 710 and determine whether a person in the vicinity of the second vehicle detected by step 720 is speaking with a user of the second vehicle. An example of such training example may include an image and/or a video depicting a vehicle and a person in the vicinity of the vehicle, together with a label indicating whether the depicting person is speaking with a user of the depicted vehicle. In another example, an artificial neural network (such as a deep neural networks, convolutional neural networks, etc.) may be configured to determine whether persons are talking with users of vehicles by analyzing images and/or videos, and the artificial neural network may be used to analyze the one or more images obtained by step 710 and determine whether a person in the vicinity of the second vehicle detected by step 720 is speaking with a user of the second vehicle.

In some examples, for example in response to the determination that the person is speaking with the user, step 1440 may cause the first vehicle to initiate an action responding to the second vehicle, for example as described above. For example, in response to the determination that the person is speaking with the user, step 1440 may cause the first vehicle to initiate a first action, and in response to the determination that the person is not speaking with the user, step 1440 may cause the first vehicle to initiate a second action. For example, in response to the determination that the person is speaking with the user, step 1440 may cause the first vehicle to initiate a first action, and in response to the determination that the person is not speaking with the user, step 1440 may withhold and/or forgo causing the first vehicle to initiate the first action may be withheld and/or forwent.

In some embodiments, systems, methods and computer readable media for controlling vehicles based on loading and/or unloading events of other vehicles are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, identifying cargo loading or unloading event corresponding to the vehicle may indicate that the vehicle has stopped for a longer period of time. The provided systems, methods and computer readable media for controlling vehicles detect a vehicle, identify a cargo loading or unloading event, and control a response of an autonomous vehicle to the detected vehicle based on the identified event.

FIG. 15 illustrates an example of a method 1500 for controlling vehicles based on loading and/or unloading events. In this example, method 1500 may comprise: obtaining images captured from an environment of a first vehicle (Step 710); analyzing the images to detect a second vehicle (Step 720); analyzing the images to determine at least one of a cargo loading event associated with the second vehicle and a cargo unloading event associated with the second vehicle (Step 1530); in response to the determined at least one of cargo loading event associated with the second vehicle and cargo unloading event associated with the second vehicle, causing the first vehicle to initiate an action responding to the second vehicle (Step 1540), and in response to no determined cargo loading event associated with the second vehicle and no determined cargo unloading event associated with the second vehicle, forgoing causing the first vehicle to initiate the action. In some implementations, method 1500 may comprise one or more additional steps, while some of the steps listed above may be modified or excluded. In some implementations, one or more steps illustrated in FIG. 15 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, at least one of a cargo loading event associated with the second vehicle and a cargo unloading event associated with the second vehicle may be determined. Further, in some examples, for example in response to the determined at least one of cargo loading event associated with the second vehicle and cargo unloading event associated with the second vehicle, the first vehicle may be caused to initiate an action responding to the second vehicle, for example as described above.

In some examples, step 1530 may comprise analyzing the one or more images obtained by step 710 to determine a cargo loading event associated with the second vehicle detected by step 720 and/or a cargo unloading event associated with the second vehicle detected by step 720. For example, a machine learning model may be trained using training examples to determine cargo loading events and/or cargo unloading events and/or properties of the events by analyzing images and/or videos, and step 1530 may use the trained machine learning model to analyze the one or more images obtained by step 710 and determine the cargo loading event associated with the second vehicle detected by step 720 and/or the cargo unloading event associated with the second vehicle detected by step 720 and/or properties of the event. An example of such training example may include an image and/or a video depicting a vehicle, together with a label indicating an occurrence of cargo loading event associated with the depicted vehicle and/or an occurrence of cargo unloading event associated with the depicted vehicle and/or properties of the event. In another example, an artificial neural network (such as a deep neural networks, convolutional neural networks, etc.) may be configured to determine cargo loading events and/or cargo unloading events and/or properties of the events by analyzing images and/or videos, and step 1530 may use the artificial neural network to analyze the one or more images obtained by step 710 and determine the cargo loading event associated with the second vehicle detected by step 720 and/or the cargo unloading event associated with the second detected by step 720 vehicle and/or properties of the event. In yet another example, step 1530 may use event detection algorithms and/or event recognition algorithms to analyze the one or more images obtained by step 710 and detect the cargo loading event associated with the second vehicle detected by step 720 and/or the cargo unloading event associated with the second vehicle detected by step 720 and/or properties of the event, for example by detecting cargo loading events and/or cargo unloading events in the vicinity of the second vehicle. Some non-limiting examples of such properties of cargo loading events and/or cargo unloading events may include side of the second vehicle associated with the event, a timing of the event, type of cargo, and so forth.

In some examples, step 1530 may comprise receiving an indication of the cargo loading event associated with the second vehicle detected by step 720 and/or of the cargo unloading event associated with the second vehicle detected by step 720 and/or information about the event (such as side of the second vehicle associated with the event, a timing of the event, type of cargo, and so forth), for example from the second vehicle detected by step 720 (for example, using a point to point communication protocol, through a communication network using a communication device, through a centralized server, and so forth), from an external device (such as an external device associated with the second vehicle detected by step 720). Further, in some examples, step 1530 may determine the cargo loading event associated with the second vehicle detected by step 720 and/or the cargo unloading event associated with the second vehicle detected by step 720 based on the received indication and/or based on the received information.

In some embodiments, step 1540 may comprise, for example in response to the determined cargo loading event associated with the second vehicle detected by step 720 (e.g., as determined by step 1530) and/or the determined cargo unloading event associated with the second vehicle detected by step 720 (e.g., as determined by step 1530), causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, passing the cargo, passing a person related to the event, keeping a minimal distance of at least a selected length from the second vehicle (for example, the selected length may be less than 10 feet, may be at least 10 feet, may be at least 20 feet, etc.), keeping a minimal distance of at least a selected length from the cargo (for example, the selected length may be less than 10 feet, may be at least 10 feet, may be at least 20 feet, etc.), keeping a minimal distance of at least a selected length from a person related to the event (for example, the selected length may be less than 10 feet, may be at least 10 feet, may be at least 20 feet, etc.), turning, performing a U-turn, driving in reverse, generating an audible warning, and so forth. For example, in response to the determined cargo loading event associated with the second vehicle detected by step 720 (e.g., as determined by step 1530), step 1540 may cause the first vehicle to initiate a first action, and in response to the determined cargo unloading event associated with the second vehicle detected by step 720 (e.g., as determined by step 1530), step 1540 may the first vehicle to initiate a second vehicle, where in one example the first action and the second action may be the same action, and in another example the first action may differ from the second action. In some examples, in response to the determined cargo loading event associated with the second vehicle detected by step 720 (e.g., as determined by step 1530) and/or the determined cargo unloading event associated with the second vehicle detected by step 720 (e.g., as determined by step 1530), step 1540 may cause the first vehicle to initiate a first action, and in response to a determination that no such event occurs, step 1540 may cause the first vehicle to initiate a second action, where the second action may differ from the first action. In some examples, in response to the determined cargo loading event associated with the second vehicle detected by step 720 (e.g., as determined by step 1530) and/or the determined cargo unloading event associated with the second vehicle detected by step 720 (e.g., as determined by step 1530), step 1540 may cause the first vehicle to initiate a first action, and in response to a determination that no such event occurs, step 1540 may withhold and/or forgo causing the first vehicle to initiate the first action.

In some embodiments, step 1540 may select the action based on the determined side of the second vehicle detected by step 720 associated with the event determined by step 1530. Some non-limiting examples of such sides of the second vehicle detected by step 720 may include left, right, back, front, and so forth. For example, in response to a first determined side, step 1540 may cause the first vehicle to initiate a first action, and in response to a second determined side, step 1540 may cause the first vehicle to initiate a second action, where the second action may differ from the first action. In another example, in response to a first determined side, step 1540 may cause the first vehicle to initiate a first action, and in response to a second determined side, step 1540 may withhold and/or forgo causing the first vehicle to initiate the first action.

In some embodiments, the one or more images obtained by step 710 may be analyzed to detect a person associated with the determined (e.g., by step 1530) cargo loading event associated with the second vehicle and/or with the determined (e.g., by step 1530) cargo unloading event associated with the second vehicle. Further, in some examples, the one or more images obtained by step 710 may be analyzed to determine a position of the detected person (for example, with respect to the first vehicle, with respect to the second vehicle detected by step 720, in the one or more images, an absolute position, and so forth). Further, in some examples, step 1540 may select the action based on the determined position of the detected person. For example, in response to a first determined position, step 1540 may select a first action, and in response to a second determined position, step 1540 may select a second action, the second action may differ from the first action. In another example, in response to a first determined position, step 1540 may select a first action, and in response to a second determined position, step 1540 may withhold and/or forgo the first action.

In some embodiments, the one or more images obtained by step 710 may be analyzed to detect a person associated with the determined (e.g., by step 1530) cargo loading event associated with the second vehicle and/or with the determined (e.g., by step 1530) cargo unloading event associated with the second vehicle. Further, in some examples, the one or more images obtained by step 710 may be analyzed to determine an orientation of the detected person (for example, with respect to the first vehicle, with respect to the second vehicle detected by step 720, with respect to the ground, with respect to the image sensor used to capture the one or more images obtained by step 710, and so forth). Further, in some examples, step 1540 may select the action based on the determined orientation of the detected person. For example, in response to a first determined orientation, step 1540 may select a first action, and in response to a second determined orientation, step 1540 may select a second action, the second action may differ from the first action. In another example, in response to a first determined orientation, step 1540 may select a first action, and in response to a second determined orientation, step 1540 may withhold and/or forgo the first action.

In some examples, the one or more images obtained by step 710 may be analyzed to detect a person associated with the determined (e.g., by step 1530) cargo loading event associated with the second vehicle and/or with the determined (e.g., by step 1530) cargo unloading event associated with the second vehicle. Further, in some examples, the one or more images obtained by step 710 may be analyzed to determine a motion the detected person (for example, with respect to the first vehicle, with respect to the second vehicle detected by step 720, with respect to the ground, with respect to the image sensor used to capture the one or more images obtained by step 710, and so forth). Further, in some examples, step 1540 may select the action based on the determined motion of the detected person. For example, in response to a first determined motion, step 1540 may select a first action, and in response to a second determined motion, step 1540 may select a second action, the second action may differ from the first action. In another example, in response to a first determined motion, step 1540 may select a first action, and in response to a second determined motion, step 1540 may withhold and/or forgo the first action.

In some examples, the one or more images obtained by step 710 may be analyzed to detect a person associated with the determined cargo loading event associated with the second vehicle and/or with the determined cargo unloading event associated with the second vehicle. For example, a machine learning model may be trained using training examples to detect persons involved in cargo loading events and/or in cargo unloading events by analyzing images and/or videos, and the trained machine learning model may be used to analyze the one or more images obtained by step 710 and detect persons involved in the cargo loading event and/or cargo unloading event associated with the second vehicle detected by step 720. An example of such training example may include an image and/or a video depicting a cargo loading event and/or a cargo unloading event associated with a vehicle, together with a label indicating a person depicted in the image and/or in the video and involved in the depicted event. In another example, an artificial neural network (such as a deep neural networks, convolutional neural networks, etc.) may be configured to detect persons involved in cargo loading events and/or in cargo unloading events by analyzing images and/or videos, and the artificial neural network may be used to analyze the one or more images obtained by step 710 and detect persons involved in the cargo loading event and/or cargo unloading event associated with the second vehicle detected by step 720.

In some examples, the one or more images obtained by step 710 may be analyzed to determine a position of the detected person (for example, with respect to the first vehicle, with respect to the second vehicle detected by step 720, in the one or more images, an absolute position, and so forth). For example, the position of the person in the one or more images obtained by step 710 may be determined using person detection algorithms. In another example, the detection methods described above may be further trained and/or configured to determine a position of the detected person.

In some examples, the one or more images obtained by step 710 may be analyzed to determine an orientation of the detected person (for example, with respect to the first vehicle, with respect to the second vehicle detected by step 720, with respect to the ground, with respect to the image sensor used to capture the one or more images obtained by step 710, and so forth). For example, the detection methods described above may be further trained and/or configured to determine an orientation of the detected person.

In some examples, the one or more images obtained by step 710 may be analyzed to determine a motion of the detected person (for example, with respect to the first vehicle, with respect to the second vehicle detected by step 720, in the one or more images, an absolute motion, and so forth). For example, the motion of the person in the one or more images obtained by step 710 may be determined using person detection algorithms. In another example, the detection methods described above may be further trained and/or configured to determine a motion of the detected person.

In some examples, the action may be selected based on the determined motion of the detected person in relation to the second vehicle. For example, in response to a first determined motion, a first action may be selected, and in response to a second determined motion, a second action may be selected. In another example, in response to a first determined motion, a first action may be selected, and in response to a second determined motion, the first action may be withheld and/or forwent.

In some examples, a motion of the second vehicle may be determined, for example as described above. Further, in some examples, in response to the determined motion of the second vehicle and/or the determined cargo loading event associated with the second vehicle and/or the determined cargo unloading event associated with the second vehicle and/or based on the determined properties of the event, the first vehicle may be caused to initiate the action (for example as described above). For example, in response to a first determined motion of the second vehicle and a first determined event, the first vehicle may be caused to initiate a first action; in response to a second determined motion of the second vehicle and the first determined event, the first vehicle may be caused to initiate a second action; and in response to the first determined motion of the second vehicle and a second determined event (for example, a cargo loading event in contrast to a cargo unloading event, an event associated with a different side of the second vehicle, etc.), the first vehicle may be caused to initiate a third action. In another example, in response to a first determined motion of the second vehicle and a first determined event, the first vehicle may be caused to initiate a first action; in response to a second determined motion of the second vehicle and the first determined event and/or in response to the first determined motion of the second vehicle and a second determined event (for example, a cargo loading event in contrast to a cargo unloading event, an event associated with a different side of the second vehicle, etc.), causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the determined cargo loading event associated with the second vehicle and/or the determined cargo unloading event associated with the second vehicle and/or based on the determined properties of the event, the first vehicle may be caused to initiate the action (for example as described above). For example, in response to a first determined type of the signaling and a first determined event, the first vehicle may be caused to initiate a first action; in response to a second determined type of the signaling and the first determined event, the first vehicle may be caused to initiate a second action; and in response to the first determined type of the signaling and a second determined event (for example, a cargo loading event in contrast to a cargo unloading event, an event associated with a different side of the second vehicle, etc.), the first vehicle may be caused to initiate a third action. In another example, in response to a first determined type of the signaling and a first determined event, the first vehicle may be caused to initiate a first action; in response to a second determined type of the signaling and the first determined event and/or in response to the first determined type of the signaling and a second determined event (for example, a cargo loading event in contrast to a cargo unloading event, an event associated with a different side of the second vehicle, etc.), causing the first vehicle to initiate the first action may be withheld and/or forwent. In an additional example, in response to the determination that the second vehicle is signaling and a first determined event, the first vehicle may be caused to initiate a first action; and in response to the determination that the second vehicle is not signaling and the first determined event, the first vehicle may be caused to initiate a second action. In yet another example, in response to the determination that the second vehicle is signaling and a first determined event, the first vehicle may be caused to initiate a first action; and in response to the determination that the second vehicle is not signaling and the first determined event, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and/or the determined cargo loading event associated with the second vehicle and/or the determined cargo unloading event associated with the second vehicle and/or based on the determined properties of the event, the first vehicle may be caused to initiate the action (for example as described above). For example, in response to a first determined position of the second vehicle and a first determined event, the first vehicle may be caused to initiate a first action; in response to a second determined position of the second vehicle and the first determined event, the first vehicle may be caused to initiate a second action; and in response to the first determined position of the second vehicle and a second determined event (for example, a cargo loading event in contrast to a cargo unloading event, an event associated with a different side of the second vehicle, etc.), the first vehicle may be caused to initiate a third action. In another example, in response to a first determined position of the second vehicle and a first determined event, the first vehicle may be caused to initiate a first action; in response to a second determined position of the second vehicle and the first determined event and/or in response to the first determined position of the second vehicle and a second determined event (for example, a cargo loading event in contrast to a cargo unloading event, an event associated with a different side of the second vehicle, etc.), causing the first vehicle to initiate the first action may be withheld and/or forwent. In an additional example, in response to the determination that the second vehicle is in a lane and/or a planned path of the first vehicle and a first determined event, the first vehicle may be caused to initiate a first action; and in response to the determination that the second vehicle is not in a lane and/or is not in a planned path of the first vehicle and the first determined event, the first vehicle may be caused to initiate a second action. In yet another example, in response to the determination that the second vehicle is in a lane and/or a planned path of the first vehicle and a first determined event, the first vehicle may be caused to initiate a first action; and in response to the determination that the second vehicle is not in a lane and/or is not in a planned path of the first vehicle and the first determined event, causing the first vehicle to initiate the first action may be withheld and/or forwent.

In some embodiments, step 1530 may comprise determining a cargo loading event associated with the second vehicle detected by step 720. Further, in some examples, for example in response to the determined cargo loading event associated with the second vehicle, step 1540 may cause the first vehicle to initiate an action responding to the second vehicle, for example as described above. Some non-limiting examples of such action may include signaling, stopping, changing a speed of the first vehicle, changing a motion direction of the first vehicle, passing the second vehicle, forgoing passing the second vehicle, turning, performing a U-turn, driving in reverse, generating an audible warning, and so forth.

In some embodiments, step 1530 may comprise determining a cargo unloading event associated with the second vehicle detected by step 720. Further, in some examples, for example in response to the determined cargo unloading event associated with the second vehicle, step 1540 may cause the first vehicle to initiate an action responding to the second vehicle, for example as described above. Some non-limiting examples of such action may include signaling, stopping, changing a speed of the first vehicle, changing a motion direction of the first vehicle, passing the second vehicle, forgoing passing the second vehicle, turning, performing a U-turn, driving in reverse, generating an audible warning, and so forth.

In some embodiments, systems, methods and computer readable media for controlling vehicles in response to street cleaning vehicles are provided. One challenge of autonomous driving is to determine when a vehicle is moving slowly for a short period of time and therefore the autonomous vehicle needs to wait for the slow vehicle to resume normal speed, and when the vehicle is moving slowly for a longer period of time and the autonomous vehicle needs to pass the slow moving vehicle. In some cases, identifying that the vehicle is a street cleaning vehicle may indicate that the vehicle is moving slowly for a longer period of time. The provided systems, methods and computer readable media for controlling vehicles may detect a vehicle, identify whether the vehicle is a street cleaning vehicle, and control a response of an autonomous vehicle to the detected vehicle based on whether the vehicle is a street cleaning vehicle.

FIG. 16 illustrates an example of a method 1600 for controlling vehicles in response to street cleaning vehicles. In this example, method 1600 may comprise: obtaining images captured from an environment of a first vehicle (Step 710); analyzing the images to detect a second vehicle (Step 720); analyzing the images to determine that the second vehicle is a street cleaning vehicle (Step 1630); in response to the determination that the second vehicle is a street cleaning vehicle, causing the first vehicle to initiate an action responding to the second vehicle (Step 1640), and in response to a determination that the second vehicle is not a street cleaning vehicle, forgoing causing the first vehicle to initiate the action. In some implementations, method 1600 may comprise one or more additional steps, while some of the steps listed above may be modified or excluded. In some implementations, one or more steps illustrated in FIG. 16 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine whether the second vehicle is a street cleaning vehicle. Further, in examples, for example in response to the determination that the second vehicle is a street cleaning vehicle, the first vehicle may be caused to initiate an action responding to the second vehicle, for example as described above.

In some embodiments, step 1630 may comprise analyzing the one or more images obtained by step 710 to determine whether the second vehicle detected by step 720 is a street cleaning vehicle. For example, a machine learning model may be trained using training examples to determine whether vehicles are street cleaning vehicles by analyzing images and/or videos, and step 1630 may use the trained machine learning model to analyze the one or more images obtained by step 710 and determine whether the second vehicle detected by step 720 is a street cleaning vehicle. An example of such training example may include an image and/or a video depicting a vehicle, together with a label indicating whether the depicted vehicle is a street cleaning vehicle. In another example, an artificial neural network (such as a deep neural networks, convolutional neural networks, etc.) may be configured to determine whether vehicles are street cleaning vehicles by analyzing images and/or videos, and step 1630 may use the artificial neural network to analyze the one or more images obtained by step 710 and determine whether the second vehicle detected by step 720 is a street cleaning vehicle. In yet another example, step 1630 may use image classification algorithms to analyze the one or more images obtained by step 710 and determine whether the second vehicle detected by step 720 is a street cleaning vehicle.

In some embodiments, step 1640 may comprise, for example in response to a determination that the second vehicle detected by step 720 is a street cleaning vehicle (e.g., as determined by step 1630), causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, keeping a minimal distance of at least a selected length from the second vehicle (for example, the selected length may be less than 100 feet, may be at least 100 feet, may be at least 200 feet, etc.), turning, performing a U-turn, driving in reverse, generating an audible warning, and so forth. For example, step 1640 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 1640 may provide information related to the second vehicle detected by step 720 (such as position, motion, type, activity status, dimensions, etc.) to such external device, and the information may be configured to cause the external device to cause the first vehicle to initiate the action responding to the second vehicle detected by step 720. In one example, in response to a determination that the second vehicle detected by step 720 is not a street cleaning vehicle (e.g., as determined by step 1630), step 1640 may cause the first vehicle to initiate a second action, the second action may differ from the action. In one example, in response to a determination that the second vehicle detected by step 720 is a street cleaning vehicle (e.g., as determined by step 1630), step 1640 may cause the first vehicle to initiate a first action, and in response to a determination that the second vehicle detected by step 720 is not a street cleaning vehicle (e.g., as determined by step 1630), step 1640 may cause the first vehicle to initiate a second action, the second action may differ from the first action. In another example, in response to a determination that the second vehicle detected by step 720 is a street cleaning vehicle (e.g., as determined by step 1630), step 1640 may cause the first vehicle to initiate a first action, and in response to a determination that the second vehicle detected by step 720 is not a street cleaning vehicle (e.g., as determined by step 1630), step 1640 may withhold and/or forgo causing the first vehicle to initiate the first action.

In some embodiments, a state of the street cleaning vehicle may be determined. Some non-limiting examples of such state may include cleaning, not cleaning, and so forth. In some examples, the one or more images may be analyzed to determine a state of the street cleaning vehicle (such as 'cleaning', 'not cleaning', and so forth). For example, a machine learning model may be trained using training examples to determine states of street cleaning vehicles by analyzing images and/or videos, and the trained machine learning model may be used to analyze the one or more images obtained by step 710 and determine the state of the street cleaning vehicle. An example of such training example may include an image and/or a video depicting a street cleaning vehicle, together with a label indicating a state of the depicted street cleaning vehicle. In another example, an artificial neural network (such as a deep neural networks, convolutional neural networks, etc.) may be configured to determine states of street cleaning vehicles by analyzing images and/or videos, and the artificial neural network may be used to analyze the one or more images obtained by step 710 and determine the state of the street cleaning vehicle. In yet another example, image classification algorithms may be used to analyze the one or more images obtained by step 710 and determine the state of the street cleaning vehicle.

In some examples, audio data captured using one or more audio sensors from an environment of the first vehicle may be obtained and/or analyzed to determine a state of the street cleaning vehicle (such as 'cleaning', 'not cleaning', and so forth). For example, a machine learning model may be trained using training examples to determine states of street cleaning vehicles by analyzing audio input, and the trained machine learning model may be used to analyze the captured audio data and determine the state of the street cleaning vehicle. An example of such training example may include an audio recording of a street cleaning vehicle, together with a label indicating a state of the recorded street cleaning vehicle. In another example, an artificial neural network (such as a recurrent neural networks, long short-term memory neural networks, etc.) may be configured to determine states of street cleaning vehicles by analyzing audio input, and the artificial neural network may be used to analyze the audio data and determine the state of the street cleaning vehicle. In yet another example, signal processing algorithms may be used to analyze the audio data and determine whether the street cleaning vehicle is cleaning or not.

In some examples, in response to a first determined state of the street cleaning vehicle, step 1640 may cause the first vehicle to initiate a first action responding to the street cleaning vehicle, and in response to a second determined state of the street cleaning vehicle, step 1640 may withhold and/or forgo causing the first vehicle to initiate the first action. In some examples, in response to a first determined state of the street cleaning vehicle, step 1640 may cause the first vehicle to initiate a first action responding to the street cleaning vehicle, and in response to a second determined state of the street cleaning vehicle, step 1640 may cause the first vehicle to initiate a second action responding to the street cleaning vehicle, where the second action may differ from the first action.

In some examples, a motion of the second vehicle may be determined, for example as described above. Further, in some examples, in response to the determined motion of the second vehicle and/or the determination that the second vehicle is a street cleaning vehicle and/or based on the determined state of the street cleaning vehicle, the first vehicle may be caused to initiate the action (for example as described above). For example, in response to a first determined motion of the second vehicle and the determination that the second vehicle is a street cleaning vehicle, the first vehicle may be caused to initiate a first action; in response to a second determined motion of the second vehicle and the determination that the second vehicle is a street cleaning vehicle, the first vehicle may be caused to initiate a second action; and in response to the first determined motion of the second vehicle and the determination that the second vehicle is not a street cleaning vehicle, the first vehicle may be caused to initiate a third action. In another example, in response to a first determined motion of the second vehicle and the determination that the second vehicle is a street cleaning vehicle, the first vehicle may be caused to initiate a first action; and in response to a second determined motion of the second vehicle and the determination that the second vehicle is a street cleaning vehicle, causing the first vehicle to initiate the first action may be withheld and/or forwent. For example, in response to a first determined motion of the second vehicle and a first determined state of the street cleaning vehicle, the first vehicle may be caused to initiate a first action; in response to a second determined motion of the second vehicle and the first determined state of the street cleaning vehicle, the first vehicle may be caused to initiate a second action; and in response to the first determined motion of the second vehicle and a second determined state of the street cleaning vehicle, the first vehicle may be caused to initiate a third action. In another example, in response to a first determined motion of the second vehicle and a first determined state of the street cleaning vehicle, the first vehicle may be caused to initiate a first action; in response to a second determined motion of the second vehicle and the first determined state of the street cleaning vehicle and/or in response to the first determined motion of the second vehicle and a second determined state of the street cleaning vehicle, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the determination that the second vehicle is a street cleaning vehicle and/or based on the determined state of the street cleaning vehicle, the first vehicle may be caused to initiate the action (for example as described above). For example, in response to a first determined type of the signaling and the determination that the second vehicle is a street cleaning vehicle, the first vehicle may be caused to initiate a first action; in response to a second determined type of the signaling and the determination that the second vehicle is a street cleaning vehicle, the first vehicle may be caused to initiate a second action; and in response to the first determined type of the signaling and the determination that the second vehicle is not a street cleaning vehicle, the first vehicle may be caused to initiate a third action. In another example, in response to a first determined type of the signaling and the determination that the second vehicle is a street cleaning vehicle, the first vehicle may be caused to initiate a first action; in response to a second determined type of the signaling and the determination that the second vehicle is a street cleaning vehicle and/or in response to the first determined type of the signaling and the determination that the second vehicle is not a street cleaning vehicle, causing the first vehicle to initiate the first action may be withheld and/or forwent. For example, in response to a first determined type of the signaling and a first determined state of the street cleaning vehicle, the first vehicle may be caused to initiate a first action; in response to a second determined type of the signaling and the first determined state of the street cleaning vehicle, the first vehicle may be caused to initiate a second action; and in response to the first determined type of the signaling and a second determined state of the street cleaning vehicle, the first vehicle may be caused to initiate a third action. In another example, in response to a first determined type of the signaling and a first determined state of the street cleaning vehicle, the first vehicle may be caused to initiate a first action; in response to a second determined type of the signaling and the first determined state of the street cleaning vehicle and/or in response to the first determined type of the signaling and a second determined state of the street cleaning vehicle, causing the first vehicle to initiate the first action may be withheld and/or forwent. In an additional example, in response to the determination that the second vehicle is signaling and the determination that the second vehicle is a street cleaning vehicle, the first vehicle may be caused to initiate a first action; and in response to the determination that the second vehicle is not signaling and the determination that the second vehicle is a street cleaning vehicle, the first vehicle may be caused to initiate a second action. In yet another example, in response to the determination that the second vehicle is signaling and the determination that the second vehicle is a street cleaning vehicle, the first vehicle may be caused to initiate a first action; and in response to the determination that the second vehicle is not signaling and the determination that the second vehicle is a street cleaning vehicle, causing the first vehicle to initiate the first action may be withheld and/or forwent. In an additional example, in response to the determination that the second vehicle is signaling and a first determined state of the street cleaning vehicle, the first vehicle may be caused to initiate a first action; and in response to the determination that the second vehicle is not signaling and the first determined state of the street cleaning vehicle, the first vehicle may be caused to initiate a second action. In yet another example, in response to the determination that the second vehicle is signaling and a first determined state of the street cleaning vehicle, the first vehicle may be caused to initiate a first action; and in response to the determination that the second vehicle is not signaling and the first determined state of the street cleaning vehicle, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and/or the determination that the second vehicle is a street cleaning vehicle and/or based the first determined state of the street cleaning vehicle, the first vehicle may be caused to initiate the action (for example as described above). For example, in response to a first determined position of the second vehicle and the determination that the second vehicle is a street cleaning vehicle, the first vehicle may be caused to initiate a first action; in response to a second determined position of the second vehicle and the determination that the second vehicle is a street cleaning vehicle, the first vehicle may be caused to initiate a second action; and in response to the first determined position of the second vehicle and the determination that the second vehicle is not a street cleaning vehicle, the first vehicle may be caused to initiate a third action. In another example, in response to a first determined position of the second vehicle and the determination that the second vehicle is a street cleaning vehicle, the first vehicle may be caused to initiate a first action; in response to a second determined position of the second vehicle and the determination that the second vehicle is a street cleaning vehicle and/or in response to the first determined position of the second vehicle and the determination that the second vehicle is not a street cleaning vehicle, causing the first vehicle to initiate the first action may be withheld and/or forwent. In an additional example, in response to the determination that the second vehicle is in a lane and/or a planned path of the first vehicle and the determination that the second vehicle is a street cleaning vehicle, the first vehicle may be caused to initiate a first action; and in response to the determination that the second vehicle is not in a lane and/or is not in a planned path of the first vehicle and the determination that the second vehicle is a street cleaning vehicle, causing the first vehicle to initiate the first action may be withheld and/or forwent. For example, in response to a first determined position of the second vehicle and a first determined state of the street cleaning vehicle, the first vehicle may be caused to initiate a first action; in response to a second determined position of the second vehicle and the first determined state of the street cleaning vehicle, the first vehicle may be caused to initiate a second action; and in response to the first determined position of the second vehicle and a second determined state of the street cleaning vehicle, the first vehicle may be caused to initiate a third action. In another example, in response to a first determined position of the second vehicle and a first determined state of the street cleaning vehicle, the first vehicle may be caused to initiate a first action; in response to a second determined position of the second vehicle and the first determined state of the street cleaning vehicle and/or in response to the first determined position of the second vehicle and a second determined state of the street cleaning vehicle, causing the first vehicle to initiate the first action may be withheld and/or forwent. In an additional example, in response to the determination that the second vehicle is in a lane and/or a planned path of the first vehicle and a first determined state of the street cleaning vehicle, the first vehicle may be caused to initiate a first action; and in response to the determination that the second vehicle is not in a lane and/or is not in a planned path of the first vehicle and the first determined state of the street cleaning vehicle, the first vehicle may be caused to initiate a second action. In yet another example, in response to the determination that the second vehicle is in a lane and/or a planned path of the first vehicle and a first determined state of the street cleaning vehicle, the first vehicle may be caused to initiate a first action; and in response to the determination that the second vehicle is not in a lane and/or is not in a planned path of the first vehicle and the first determined state of the street cleaning vehicle, causing the first vehicle to initiate the first action may be withheld and/or forwent.

In some embodiments, systems, methods and computer readable media for controlling vehicles based on hoods of other vehicles are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle with a hood has stopped for a longer period of time may include the state of the hood. For example, identifying that the hood is open may indicate that the vehicle with the hood has stopped for a longer period of time. The provided systems, methods and computer readable media for controlling vehicles may detect a vehicle connected to a hood, identify a state of the hood, and control a response of an autonomous vehicle to the detected vehicle based on the identified state of the hood.

FIG. 17 illustrates an example of a method 1700 for controlling vehicles based on hoods of other vehicles. In this example, method 1700 may comprise: obtaining images captured from an environment of a first vehicle (Step 710); analyzing the images to detect a second vehicle (Step 720); analyzing the images to determine a state of a hood of the second vehicle (Step 1730); in response to a first determined state of the hood, causing the first vehicle to initiate an action responding to the second vehicle (Step 1740), and in response to a second determined state of the hood, forgoing causing the first vehicle to initiate the action. In some implementations, method 1700 may comprise one or more additional steps, while some of the steps listed above may be modified or excluded. In some implementations, one or more steps illustrated in FIG. 17 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine a state of a hood of the second vehicle. Further, in some examples, in response to a first determined state of the hood of the second vehicle, the first vehicle may be caused to initiate an action responding to the second vehicle.

In some embodiments, step 1730 may comprise analyzing the one or more images obtained by step 710 to determine a state of the hood of the second vehicle detected by step 720. Some non-limiting examples of such state of the hood of the second vehicle may include hood of the second vehicle in open, hood of the second vehicle not in close, hood of the second vehicle completely open, hood of the second vehicle substantially closed, hood of the second vehicle is opening, hood of the second vehicle is closing, and so forth. For example, a machine learning model may be trained using training examples to determine states of hoods of vehicles from images and/or videos, and step 1730 may use the trained machine learning model to analyze the one or more images obtained by step 710 and determine the state of the hood of the second vehicle detected by step 720. An example of such training example may include an image and/or a video depicting a hood of a vehicle, together with a label indicating the state of the depicted hood. In another example, an artificial neural network (such as a deep neural networks, convolutional neural networks, etc.) may be configured to determine states of hoods of vehicles from images and/or videos, and step 1730 may use the artificial neural network to analyze the one or more images obtained by step 710 and determine the state of the hood of the second vehicle detected by step 720. In yet another example, step 1730 may use image classification algorithms to analyze the one or more images obtained by step 710 and determine the state of the hood of the second vehicle detected by step 720. Some other non-limiting examples of steps that may be used by step 1730 for determining the state of the hood of the second vehicle are described below.

In some examples, an orientation of at least part of the hood of the second vehicle (in relation to at least one other part of the second vehicle, in relation to the ground, in relation to the horizon, in relation to an object in the environment, in relation to the at least part of the first vehicle, in relation to the image sensor, etc.) may be determined, and the determined state of the hood of the second vehicle may be based on the determined orientation of the at least part of the hood of the second vehicle. For example, a machine learning model may be trained using training examples to determine orientation of parts of hoods by analyzing images and/or videos, and the trained machine learning model may be used to determine the orientation of the at least part of the hood of the second vehicle from the one or more images. In another example, an artificial neural network (such as a deep neural networks, convolutional neural networks, etc.) may be configured to determine orientation of parts of hoods by analyzing images and/or videos, and the configured artificial neural network may be used to determine the orientation of the at least part of the hood of the second vehicle from the one or more images. In yet another example, information about the orientation of the at least part of the hood of the second vehicle may be received from the second vehicle (for example, using a point to point communication protocol, through a communication network using a communication device, through a centralized server, and so forth).

In some examples, a distance of at least part of the hood of the second vehicle (from at least part of the second vehicle, from the ground, from an object in the environment, from at least part of the first vehicle, from the image sensor, etc.) may be determined, and the determined state of the hood of the second vehicle may be based on the determined distance of the at least part of the hood of the second vehicle. For example, a machine learning model may be trained using training examples to determine distance of parts of hoods by analyzing images and/or videos, and the trained machine learning model may be used to determine the distance of the at least part of the hood of the second vehicle from the one or more images. In another example, an artificial neural network (such as a deep neural networks, convolutional neural networks, etc.) may be configured to determine distance of parts of hoods by analyzing images and/or videos, and the configured artificial neural network may be used to determine the distance of the at least part of the hood of the second vehicle from the one or more images. In yet another example, information about the distance of the at least part of the hood of the second vehicle may be received from the second vehicle (for example, using a point to point communication protocol, through a communication network using a communication device, through a centralized server, and so forth).

In some examples, a motion of at least part of the hood of the second vehicle (in relation to at least one other part of the second vehicle, in relation to the ground, in relation to the horizon, in relation to an object in the environment, in relation to the at least part of the first vehicle, in relation to the image sensor, etc.) may be determined, and the determined state of the hood of the second vehicle may be based on the determined motion of the at least part of the hood of the second vehicle. For example, a machine learning model may be trained using training examples to determine motion of parts of hoods by analyzing images and/or videos, and the trained machine learning model may be used to determine the motion of the at least part of the hood of the second vehicle from the one or more images. In another example, an artificial neural network (such as a deep neural networks, convolutional neural networks, etc.) may be configured to determine motion of parts of hoods by analyzing images and/or videos, and the configured artificial neural network may be used to determine the motion of the at least part of the hood of the second vehicle from the one or more images. In yet another example, information about the motion of the at least part of the hood of the second vehicle may be received from the second vehicle (for example, using a point to point communication protocol, through a communication network using a communication device, through a centralized server, and so forth).

In some embodiments, step 1740 may comprise, for example in response to a first determined state of the hood of the second vehicle detected by step 720 (e.g., as determined by step 1730), causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, keeping a minimal distance of at least a selected length from the second vehicle (for example, the selected length may be less than 100 feet, may be at least 100 feet, may be at least 200 feet, etc.), turning, performing a U-turn, driving in reverse, generating an audible warning, and so forth. For example, step 1740 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 1740 may provide information related to the second vehicle to such external device, and the information may be configured to cause the external device to cause the first vehicle to initiate the action responding to the second vehicle detected by step 720. In one example, in response to a second state of the hood of the second vehicle detected by step 720 (e.g., as determined by step 1730), step 1740 may cause the first vehicle to initiate a second action, the second action may differ from the action.

In some examples, step 1740 may select the action based on the determined state of the hood of the second vehicle detected by step 720 (e.g., as determined by step 1730). For example, in response to a first state of the hood of the second vehicle detected by step 720 (e.g., as determined by step 1730), step 1740 may select a first action, and in response to a second state of the hood of the second vehicle detected by step 720 (e.g., as determined by step 1730), step 1740 may select a second action (where the second action may differ from the first action, and the second state of the hood of the second vehicle may differ from the first state of the hood of the second vehicle). In some examples, in response to a first state of the hood of the second vehicle detected by step 720 (e.g., as determined by step 1730), step 1740 may select a first action, and in response to a second state of the hood of the second vehicle detected by step 720 (e.g., as determined by step 1730), step 1740 may withhold and/or forgo the first action (for example, step 1740 may withhold and/or forgo causing the first vehicle to initiate the action).

In some examples, a motion of the second vehicle may be determined, for example as described above. Further, in some examples, in response to the determined motion of the second vehicle and the first determined state of the hood of the second vehicle, the first vehicle may be caused to initiate the action (for example as described above). For example, in response to a first determined motion of the second vehicle and a first determined state of the hood of the second vehicle, the first vehicle may be caused to initiate a first action; in response to a second determined motion of the second vehicle and the first determined state of the hood of the second vehicle, the first vehicle may be caused to initiate a second action; and in response to the first determined motion of the second vehicle and a second determined state of the hood of the second vehicle, the first vehicle may be caused to initiate a third action. In another example, in response to a first determined motion of the second vehicle and a first determined state of the hood of the second vehicle, the first vehicle may be caused to initiate a first action; in response to a second determined motion of the second vehicle and the first determined state of the hood of the second vehicle and/or in response to the first determined motion of the second vehicle and a second determined state of the hood of the second vehicle, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the first determined state of the hood of the second vehicle, the first vehicle may be caused to initiate the action (for example as described above). For example, in response to a first determined type of the signaling and a first determined state of the hood of the second vehicle, the first vehicle may be caused to initiate a first action; in response to a second determined type of the signaling and the first determined state of the hood of the second vehicle, the first vehicle may be caused to initiate a second action; and in response to the first determined type of the signaling and a second determined state of the hood of the second vehicle, the first vehicle may be caused to initiate a third action. In another example, in response to a first determined type of the signaling and a first determined state of the hood of the second vehicle, the first vehicle may be caused to initiate a first action; in response to a second determined type of the signaling and the first determined state of the hood of the second vehicle and/or in response to the first determined type of the signaling and a second determined state of the hood of the second vehicle, causing the first vehicle to initiate the first action may be withheld and/or forwent. In an additional example, in response to the determination that the second vehicle is signaling and a first determined state of the hood of the second vehicle, the first vehicle may be caused to initiate a first action; and in response to the determination that the second vehicle is not signaling and the first determined state of the hood of the second vehicle, the first vehicle may be caused to initiate a second action. In yet another example, in response to the determination that the second vehicle is signaling and a first determined state of the hood of the second vehicle, the first vehicle may be caused to initiate a first action; and in response to the determination that the second vehicle is not signaling and the first determined state of the hood of the second vehicle, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and the first determined state of the hood of the second vehicle, the first vehicle may be caused to initiate the action (for example as described above). For example, in response to a first determined position of the second vehicle and a first determined state of the hood of the second vehicle, the first vehicle may be caused to initiate a first action; in response to a second determined position of the second vehicle and the first determined state of the hood of the second vehicle, the first vehicle may be caused to initiate a second action; and in response to the first determined position of the second vehicle and a second determined state of the hood of the second vehicle, the first vehicle may be caused to initiate a third action. In another example, in response to a first determined position of the second vehicle and a first determined state of the hood of the second vehicle, the first vehicle may be caused to initiate a first action; in response to a second determined position of the second vehicle and the first determined state of the hood of the second vehicle and/or in response to the first determined position of the second vehicle and a second determined state of the hood of the second vehicle, causing the first vehicle to initiate the first action may be withheld and/or forwent. In an additional example, in response to the determination that the second vehicle is in a lane and/or a planned path of the first vehicle and a first determined state of the hood of the second vehicle, the first vehicle may be caused to initiate a first action; and in response to the determination that the second vehicle is not in a lane and/or is not in a planned path of the first vehicle and the first determined state of the hood of the second vehicle, the first vehicle may be caused to initiate a second action. In yet another example, in response to the determination that the second vehicle is in a lane and/or a planned path of the first vehicle and a first determined state of the hood of the second vehicle, the first vehicle may be caused to initiate a first action; and in response to the determination that the second vehicle is not in a lane and/or is not in a planned path of the first vehicle and the first determined state of the hood of the second vehicle, causing the first vehicle to initiate the first action may be withheld and/or forwent.

In some embodiments, systems, methods and computer readable media for controlling vehicles based on trunk lids of other vehicles are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, one indication of whether a vehicle with a trunk lid has stopped for a longer period of time may include the state of the trunk lid. For example, identifying that the trunk lid is open may indicate that the vehicle with the trunk lid has stopped for a longer period of time. The provided systems, methods and computer readable media for controlling vehicles may detect a vehicle connected to a trunk lid, identify a state of the trunk lid, and control a response of an autonomous vehicle to the detected vehicle based on the identified state of the trunk lid.

FIG. 18 illustrates an example of a method 1800 for controlling vehicles based on trunk lids of other vehicles. In this example, method 1800 may comprise: obtaining images captured from an environment of a first vehicle (Step 710); analyzing the images to detect a second vehicle (Step 720); analyzing the images to determine a state of a trunk lid of the second vehicle (Step 1830); in response to a first determined state of the trunk lid, causing the first vehicle to initiate an action responding to the second vehicle (Step 1840), and in response to a second determined state of the trunk lid, forgoing causing the first vehicle to initiate the action. In some implementations, method 1800 may comprise one or more additional steps, while some of the steps listed above may be modified or excluded. In some implementations, one or more steps illustrated in FIG. 18 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine a state of a trunk lid of the second vehicle. Further, in some examples, in response to a first determined state of the trunk lid of the second vehicle, the first vehicle may be caused to initiate an action responding to the second vehicle.

In some embodiments, step 1830 may comprise analyzing the one or more images obtained by step 710 to determine a state of the trunk lid of the second vehicle detected by step 720. Some non-limiting examples of such state of the trunk lid of the second vehicle may include trunk lid of the second vehicle in open, trunk lid of the second vehicle not in close, trunk lid of the second vehicle completely open, trunk lid of the second vehicle substantially closed, trunk lid of the second vehicle is opening, trunk lid of the second vehicle is closing, and so forth. For example, a machine learning model may be trained using training examples to determine states of trunk lids of vehicles by analyzing images and/or videos, and step 1830 may use the trained machine learning model to analyze the one or more images obtained by step 710 and determine the state of the trunk lid of the second vehicle detected by step 720. An example of such training example may include an image and/or a video depicting a vehicle, together with a label indicating the state of a trunk lid of the depicted vehicle. In another example, an artificial neural network (such as a deep neural networks, convolutional neural networks, etc.) may be configured to determine states of trunk lids of vehicles by analyzing images and/or videos, and step 1830 may use the artificial neural network to analyze the one or more images obtained by step 710 and determine the state of the trunk lid of the second vehicle detected by step 720. In yet another example, step 1830 may use image classification algorithms to analyze the one or more images obtained by step 710 and determine the state of the trunk lid of the second vehicle. Some other non-limiting examples of steps that may be used by step 1830 for determining the state of the trunk lid of the second vehicle are described below.

In some examples, an orientation of at least part of the trunk lid of the second vehicle (in relation to at least one other part of the second vehicle, in relation to the ground, in relation to the horizon, in relation to an object in the environment, in relation to the at least part of the first vehicle, in relation to the image sensor, etc.) may be determined, and the determined state of the trunk lid of the second vehicle may be based on the determined orientation of the at least part of the trunk lid of the second vehicle. For example, a machine learning model may be trained using training examples to determine orientation of parts of trunk lids by analyzing images and/or videos, and the trained machine learning model may be used to determine the orientation of the at least part of the trunk lid of the second vehicle from the one or more images. In another example, an artificial neural network (such as a deep neural networks, convolutional neural networks, etc.) may be configured to determine orientation of parts of trunk lids by analyzing images and/or videos, and the configured artificial neural network may be used to determine the orientation of the at least part of the trunk lid of the second vehicle from the one or more images. In yet another example, information about the orientation of the at least part of the trunk lid of the second vehicle may be received from the second vehicle (for example, using a point to point communication protocol, through a communication network using a communication device, through a centralized server, and so forth).

In some examples, a distance of at least part of the trunk lid of the second vehicle (from at least part of the second vehicle, from the ground, from an object in the environment, from at least part of the first vehicle, from the image sensor, etc.) may be determined, and the determined state of the trunk lid of the second vehicle may be based on the determined distance of the at least part of the trunk lid of the second vehicle. For example, a machine learning model may be trained using training examples to determine distance of parts of trunk lids by analyzing images and/or videos, and the trained machine learning model may be used to determine the distance of the at least part of the trunk lid of the second vehicle from the one or more images. In another example, an artificial neural network (such as a deep neural networks, convolutional neural networks, etc.) may be configured to determine distance of parts of trunk lids by analyzing images and/or videos, and the configured artificial neural network may be used to determine the distance of the at least part of the trunk lid of the second vehicle from the one or more images. In yet another example, information about the distance of the at least part of the trunk lid of the second vehicle may be received from the second vehicle (for example, using a point to point communication protocol, through a communication network using a communication device, through a centralized server, and so forth).

In some examples, a motion of at least part of the trunk lid of the second vehicle (in relation to at least one other part of the second vehicle, in relation to the ground, in relation to the horizon, in relation to an object in the environment, in relation to the at least part of the first vehicle, in relation to the image sensor, etc.) may be determined, and the determined state of the trunk lid of the second vehicle may be based on the determined motion of the at least part of the trunk lid of the second vehicle. For example, a machine learning model may be trained using training examples to determine motion of parts of trunk lids by analyzing images and/or videos, and the trained machine learning model may be used to determine the motion of the at least part of the trunk lid of the second vehicle from the one or more images. In another example, an artificial neural network (such as a deep neural networks, convolutional neural networks, etc.) may be configured to determine motion of parts of trunk lids by analyzing images and/or videos, and the configured artificial neural network may be used to determine the motion of the at least part of the trunk lid of the second vehicle from the one or more images. In yet another example, information about the motion of the at least part of the trunk lid of the second vehicle may be received from the second vehicle (for example, using a point to point communication protocol, through a communication network using a communication device, through a centralized server, and so forth).

In some embodiments, step 1840 may comprise, for example in response to a first determined state of the trunk lid of the second vehicle detected by step 720 (e.g., as determined by step 1830), causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, keeping a minimal distance of at least a selected length from the second vehicle (for example, the selected length may be less than 100 feet, may be at least 100 feet, may be at least 200 feet, etc.), turning, performing a U-turn, driving in reverse, generating an audible warning, and so forth. For example, step 1840 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 1840 may provide information related to the second vehicle to such external device, and the information may be configured to cause the external device to cause the first vehicle to initiate the action responding to the second vehicle detected by step 720. In one example, in response to a second state of the trunk lid of the second vehicle detected by step 720 (e.g., as determined by step 1830), step 1840 may cause the first vehicle to initiate a second action, the second action may differ from the action.

In some examples, step 1840 may select the action based on the determined state of the trunk lid of the second vehicle detected by step 720 (e.g., as determined by step 1830). For example, in response to a first state of the trunk lid of the second vehicle detected by step 720 (e.g., as determined by step 1830), step 1840 may select a first action, and in response to a second state of the trunk lid of the second vehicle detected by step 720 (e.g., as determined by step 1830), step 1840 may select a second action (where the second action may differ from the first action, and the second state of the trunk lid of the second vehicle may differ from the first state of the trunk lid of the second vehicle). In some examples, in response to a first state of the trunk lid of the second vehicle detected by step 720 (e.g., as determined by step 1830), step 1840 may select a first action, and in response to a second state of the trunk lid of the second vehicle detected by step 720 (e.g., as determined by step 1830), step 1840 may withhold and/or forgo the first action (for example, step 1840 may withhold and/or forgo causing the first vehicle to initiate the action).

In some examples, a motion of the second vehicle may be determined, for example as described above. Further, in some examples, in response to the determined motion of the second vehicle and the first determined state of the trunk lid of the second vehicle, the first vehicle may be caused to initiate the action (for example as described above). For example, in response to a first determined motion of the second vehicle and a first determined state of the trunk lid of the second vehicle, the first vehicle may be caused to initiate a first action; in response to a second determined motion of the second vehicle and the first determined state of the trunk lid of the second vehicle, the first vehicle may be caused to initiate a second action; and in response to the first determined motion of the second vehicle and a second determined state of the trunk lid of the second vehicle, the first vehicle may be caused to initiate a third action. In another example, in response to a first determined motion of the second vehicle and a first determined state of the trunk lid of the second vehicle, the first vehicle may be caused to initiate a first action; in response to a second determined motion of the second vehicle and the first determined state of the trunk lid of the second vehicle and/or in response to the first determined motion of the second vehicle and a second determined state of the trunk lid of the second vehicle, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the first determined state of the trunk lid of the second vehicle, the first vehicle may be caused to initiate the action (for example as described above). For example, in response to a first determined type of the signaling and a first determined state of the trunk lid of the second vehicle, the first vehicle may be caused to initiate a first action; in response to a second determined type of the signaling and the first determined state of the trunk lid of the second vehicle, the first vehicle may be caused to initiate a second action; and in response to the first determined type of the signaling and a second determined state of the trunk lid of the second vehicle, the first vehicle may be caused to initiate a third action. In another example, in response to a first determined type of the signaling and a first determined state of the trunk lid of the second vehicle, the first vehicle may be caused to initiate a first action; in response to a second determined type of the signaling and the first determined state of the trunk lid of the second vehicle and/or in response to the first determined type of the signaling and a second determined state of the trunk lid of the second vehicle, causing the first vehicle to initiate the first action may be withheld and/or forwent. In an additional example, in response to the determination that the second vehicle is signaling and a first determined state of the trunk lid of the second vehicle, the first vehicle may be caused to initiate a first action; and in response to the determination that the second vehicle is not signaling and the first determined state of the trunk lid of the second vehicle, the first vehicle may be caused to initiate a second action. In yet another example, in response to the determination that the second vehicle is signaling and a first determined state of the trunk lid of the second vehicle, the first vehicle may be caused to initiate a first action; and in response to the determination that the second vehicle is not signaling and the first determined state of the trunk lid of the second vehicle, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and the first determined state of the trunk lid of the second vehicle, the first vehicle may be caused to initiate the action (for example as described above). For example, in response to a first determined position of the second vehicle and a first determined state of the trunk lid of the second vehicle, the first vehicle may be caused to initiate a first action; in response to a second determined position of the second vehicle and the first determined state of the trunk lid of the second vehicle, the first vehicle may be caused to initiate a second action; and in response to the first determined position of the second vehicle and a second determined state of the trunk lid of the second vehicle, the first vehicle may be caused to initiate a third action. In another example, in response to a first determined position of the second vehicle and a first determined state of the trunk lid of the second vehicle, the first vehicle may be caused to initiate a first action; in response to a second determined position of the second vehicle and the first determined state of the trunk lid of the second vehicle and/or in response to the first determined position of the second vehicle and a second determined state of the trunk lid of the second vehicle, causing the first vehicle to initiate the first action may be withheld and/or forwent. In an additional example, in response to the determination that the second vehicle is in a lane and/or a planned path of the first vehicle and a first determined state of the trunk lid of the second vehicle, the first vehicle may be caused to initiate a first action; and in response to the determination that the second vehicle is not in a lane and/or is not in a planned path of the first vehicle and the first determined state of the trunk lid of the second vehicle, the first vehicle may be caused to initiate a second action. In yet another example, in response to the determination that the second vehicle is in a lane and/or a planned path of the first vehicle and a first determined state of the trunk lid of the second vehicle, the first vehicle may be caused to initiate a first action; and in response to the determination that the second vehicle is not in a lane and/or is not in a planned path of the first vehicle and the first determined state of the trunk lid of the second vehicle, causing the first vehicle to initiate the first action may be withheld and/or forwent.

In some embodiments, systems, methods and computer readable media for controlling vehicles in response to smoke are provided. One challenge of autonomous driving is to determine when a standing vehicle has stopped for a short period of time and therefore the autonomous vehicle needs to wait for the standing vehicle to resume moving, and when the standing vehicle has stopped for a longer period of time and therefore the autonomous vehicle needs to pass the standing vehicle. In some cases, identifying that unusual emission of gases (such as smoke, steam, etc.) may indicate that the vehicle has stopped for a longer period of time. The provided systems, methods and computer readable media for controlling vehicles may detect a vehicle, identify whether the vehicle emits unusual smoke, and control a response of an autonomous vehicle to the detected vehicle based on whether the vehicle emits unusual smoke.

FIG. 19 illustrates an example of a method 1900 for controlling vehicles in response to smoke. In this example, method 1900 may comprise: obtaining images captured from an environment of a first vehicle (Step 710); analyzing the images to detect a second vehicle (Step 720); analyzing the images to determine that the second vehicle emits smoke not through an exhaust system (Step 1930); in response to the determination that the second vehicle emits smoke not through an exhaust system, causing the first vehicle to initiate an action responding to the second vehicle (Step 1940), and in response to a determination that the second vehicle does not emit smoke or emits smoke only through an exhaust system, forgoing causing the first vehicle to initiate the action. In some implementations, method 1900 may comprise one or more additional steps, while some of the steps listed above may be modified or excluded. In some implementations, one or more steps illustrated in FIG. 19 may be executed in a different order and/or one or more groups of steps may be executed simultaneously and/or a plurality of steps may be combined into single step and/or a single step may be broken down to a plurality of steps.

It is to be understood that any embodiment and/or example related to smoke in this disclosure may also be similarly implemented with relation to steam, to a combination of smoke and steam, other visible gases, and so forth.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine whether the second vehicle emits smoke not through an exhaust system. Further, in examples, for example in response to the determination that the second vehicle emits smoke not through an exhaust system, the first vehicle may be caused to initiate an action responding to the second vehicle, for example as described above.

In some embodiments, step 1930 may comprise analyzing the one or more images obtained by step 710 to determine whether the second vehicle detected by step 720 emits smoke not through an exhaust system. For example, a machine learning model may be trained using training examples to determine whether vehicles are emitting smoke not through exhaust systems by analyzing images and/or videos, and step 1930 may use the trained machine learning model to analyze the one or more images obtained by step 710 and determine whether the second vehicle detected by step 720 emits smoke not through an exhaust system. An example of such training example may include an image and/or a video depicting a vehicle, together with a label indicating whether the depicted vehicle emits smoke not through an exhaust system. In another example, an artificial neural network (such as a deep neural networks, convolutional neural networks, etc.) may be configured to determine whether vehicles are emitting smoke not through exhaust systems by analyzing images and/or videos, and step 1930 may use the artificial neural network to analyze the one or more images obtained by step 710 and determine whether the second vehicle detected by step 720 emits smoke not through an exhaust system. In yet another example, step 1930 may use image classification algorithms to analyze the one or more images obtained by step 710 and determine whether the second vehicle detected by step 720 emits smoke not through an exhaust system.

In some embodiments, step 1940 may comprise, for example in response to a determination by step 1930 that the second vehicle detected by step 720 emits smoke not through an exhaust system, causing the first vehicle to initiate an action responding to the second vehicle. Some non-limiting examples of such action may include signaling, stopping, changing a speed of the first vehicle, changing a motion direction of the first vehicle, passing the second vehicle, forgoing passing the second vehicle, keeping a minimal distance of at least a selected length from the second vehicle (for example, the selected length may be less than 100 feet, may be at least 100 feet, may be at least 200 feet, etc.), turning, performing a U-turn, driving in reverse, generating an audible warning, and so forth. For example, step 1940 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 1940 may provide information related to the second vehicle to such external device, and the information may be configured to cause the external device to cause the first vehicle to initiate the action responding to the second vehicle detected by step 720. In one example, in response to a determination by step 1930 that the second vehicle detected by step 720 emits smoke only through an exhaust system or does not emit smoke at all, step 1940 may cause the first vehicle to initiate a second action, the second action may differ from the action. In one example, in response to a determination by step 1930 that the second vehicle detected by step 720 emits smoke not through an exhaust system, step 1940 may cause the first vehicle to initiate a first action, and in response to a determination by step 1930 that the second vehicle detected by step 720 emits smoke only through an exhaust system or does not emit smoke at all, step 1940 may cause the first vehicle to initiate a second action, the second action may differ from the first action. In another example, in response to a determination by step 1930 that the second vehicle detected by step 720 emits smoke not through an exhaust system, step 1940 may cause the first vehicle to initiate a first action, and in response to a determination by step 1930 that the second vehicle detected by step 720 emits smoke only through an exhaust system or does not emit smoke at all, step 1940 may withhold and/or forgo causing the first vehicle to initiate the first action.

In some examples, step 1940 may select the action based on determined properties of the emission of the smoke and/or based on determined properties of the emitted smoke. Some non-limiting examples of such properties are described below. For example, in response to a first determined property, step 1940 may select a first action, and in response to a second determined property, step 1940 may select a second action, the second action may differ from the first action. In some examples, in response to a first determined property, step 1940 may select a first action, and in response to a second determined property, step 1940 may withhold and/or forgo the first action (for example, step 1940 may withhold and/or forgo causing the first vehicle to initiate the action).

In some embodiments, the one or more images obtained by step 710 may be analyzed to detect smoke, for example as described below. Further, in some examples, the one or more images obtained by step 710 may be analyzed to determine whether the detected smoke is associated with a first side of the second vehicle detected by step 720 (such as the front side of the second vehicle), a second side of the second vehicle detected by step 720 (such as the back side of the second vehicle), or not associated with the second vehicle detected by step 720 (for example as described below). Further, in some examples, in response to a determination that the smoke is associated with the first side of the second vehicle, step 1930 may determine that the second vehicle emits smoke not through an exhaust system; in response to a determination that the smoke is associated with the second side of the second vehicle, step 1930 may withhold and/or forgo determining that the second vehicle emits smoke not through an exhaust system; and in response to a determination that the smoke is not associated with the second vehicle detected by step 720, step 1930 may withhold and/or forgo determining that the second vehicle emits smoke not through an exhaust system.

In some examples, the one or more images obtained by step 710 may be analyzed to detect smoke. For example, a visual smoke detector may be used to detect smoke in the one or more images obtained by step 710. In another example, a machine learning model may be trained using training examples to detect smoke in images and/or videos, and the trained machine learning model may be used analyze the one or more images obtained by step 710 to detect smoke. An example of such training example may include an image and/or a video, together with a label indicating whether smoke is depicted in the image and/or in the video and/or a position of the detected smoke in the image and/or in the video. In yet another example, an artificial neural network (such as a deep neural networks, convolutional neural networks, etc.) may be configured to detect smoke in images and/or videos, and the artificial neural network may be used analyze the one or more images obtained by step 710 to detect smoke.

In some examples, the one or more images obtained by step 710 may be analyzed to determine whether the detected smoke is associated with a first side of the second vehicle detected by step 720, a second side of the second vehicle detected by step 720, or not associated with the second vehicle detected by step 720. For example, a position of the detected smoke may be compared with a position of the different sides of the second vehicle detected by step 720, when the detected smoke is substantially above a side and/or a part of the second vehicle, it may be determine that the detected smoke is associated with that side and/or with that part of the second vehicle, and when the detected smoke is not substantially above the second vehicle, it may be determined that the detected smoke is not associated with the second vehicle. In another example, a position of the detected smoke may be compared with a position of the different sides of the second vehicle detected by step 720, when the detected smoke is adjunct to a side and/or part of the second vehicle, it may be determine that the detected smoke is associated with that side and/or that part of the second vehicle, and when the detected smoke is not adjunct to the second vehicle, it may be determined that the detected smoke is not associated with the second vehicle. In yet another example, a machine learning model may be trained using training examples to associate smoke to parts of vehicles based on images and/or videos, and the trained machine learning model may be used to analyze the one or more images obtained by step 710 and associated the detected smoke to sides and/or parts of the second vehicle detected by step 720, or determine that the detected smoke is not associated with the second vehicle detected by step 720. An example of such training example may include an image depicting a vehicle and smoke, together with a label indicating that the depicted smoke is associated with a particular side and/or a particular part of the depicted vehicle, or together with a label indicating that the depicted smoke is not associated with the depicted vehicle. In an additional example, an artificial neural network (such as a deep neural networks, convolutional neural networks, etc.) may be configured to associate smoke to parts of vehicles based on images and/or videos, and the artificial neural network may be used to analyze the one or more images obtained by step 710 and associated the detected smoke to sides and/or parts of the second vehicle detected by step 720.

In some embodiments, the one or more images obtained by step 710 may be analyzed to determine a color of the smoke emitted not through the exhaust system. Some non-limiting examples of such color may include white, black, grey, blue, and so forth. For example, a machine learning model may be trained using training examples to determine colors of smoke by analyzing images and/or videos, and the trained machine learning model may be used to analyze the one or more images obtained by step 710 and determine the color of the smoke emitted not through the exhaust system. An example of such training example may include an image and/or a video depicting smoke, together with a label indicating the color of the depicted smoke. In another example, an artificial neural network (such as a deep neural networks, convolutional neural networks, etc.) may be configured to determine colors of smoke by analyzing images and/or videos, and the artificial neural network may be used to analyze the one or more images obtained by step 710 and determine the color of the smoke emitted not through the exhaust system. In yet another example, a color histogram of an area depicting smoke in the one or more images obtained by step 710 may be compared to a color histogram of other areas (such as nearby areas) of the one or more images obtained by step 710, and the difference between the two color histograms may be used to identify the color of the smoke emitted not through the exhaust system. In some examples, in response to a first determined color of the smoke (such as white, black, grey, blue, etc.), step 1940 may cause the first vehicle to initiate a first action responding to the second vehicle, and in response to a second determined color of the smoke (such as white, black, grey, blue, etc.), step 1940 may withhold and/or forgo causing the first vehicle to initiate the first action. In some examples, in response to a first determined color of the smoke (such as white, black, grey, blue, etc.), step 1940 may cause the first vehicle to initiate a first action responding to the second vehicle, and in response to a second determined color of the smoke (such as white, black, grey, blue, etc.), step 1940 may cause the first vehicle to initiate a second action responding to the second vehicle, where the second action may differ from the first action.

In some examples, a measurement of a temperature of at least part of the second vehicle (such as the engine, the front side, the entire second vehicle, etc.) may be obtained. For example, the temperature of the at least part of the second vehicle may be measured using an infrared thermometer. In another example, the measurement of the temperature of the at least part of the second vehicle may be received from the second vehicle (for example, using a point to point communication protocol, through a communication network using a communication device, through a centralized server, and so forth). In yet another example, the one or more images may comprise at least one infrared image, and the at least one infrared image may be analyzed to measure the temperature of the at least part of the second vehicle. For example, a machine learning model may be trained using training examples to determine temperatures of vehicles by analyzing infrared images and/or infrared videos, and the trained machine learning model may be used to analyze the at least one infrared image and determine the measurement of the temperature of the at least part of the second vehicle. An example of such training example may include an infrared image and/or an infrared video of a vehicle, together with a label indicating a temperature of the vehicle or of a particular part of the vehicle. In another example, an artificial neural network (such as a deep neural networks, convolutional neural networks, etc.) may be configured to determine temperature by analyzing infrared images and/or infrared videos, and the artificial neural network may be used to analyze the at least one infrared image and determine the measurement of the temperature of the at least part of the second vehicle.

In some examples, a type of the second vehicle may be obtained. For example, the type of the second vehicle may be received from the second vehicle (for example, using a point to point communication protocol, through a communication network using a communication device, through a centralized server, and so forth). In another example, a machine learning model may be trained using training examples to determine types of vehicles by analyzing images and/or videos, and the trained machine learning model may be used to analyze the one or more images and determine the type of the second vehicle. In yet another example, an artificial neural network (such as a deep neural networks, convolutional neural networks, etc.) may be configured to determine to determine types of vehicles by analyzing images and/or videos, and the artificial neural network may be used to analyze the one or more images and determine the type of the second vehicle. Further, ins some examples, the type of the second vehicle may be used to determine typical temperatures for the second vehicle, such as range of temperatures corresponding to a normal operation of the second vehicle, range of temperatures corresponding to an overheated engine, range of temperatures corresponding to an uncontrolled fire in the second vehicle, range of temperatures corresponding to range of temperatures corresponding to the second vehicle being in an off mode, and so forth. For example, a database connecting type of vehicles with ranges of temperatures may be used to determine typical temperatures for the second vehicle based on the type of the second vehicle. In another example, a function that determines typical temperatures for the second vehicle based on properties of vehicles may be used to determine typical temperatures for the second vehicle based on properties associated with the type of the second vehicle.

In some examples, in response to a first temperature of the at least part of the second vehicle (such as temperature corresponding to an overheated engine, temperature corresponding to a fire, temperature corresponding to a normal operation temperature of the second vehicle, etc.), step 1940 may cause the first vehicle to initiate a first action responding to the second vehicle, and in response to a second temperature of the at least part of the second vehicle (such as temperature corresponding to an overheated engine, temperature corresponding to a fire, temperature corresponding to a normal operation temperature of the second vehicle, etc.), step 1940 may withhold and/or forgo causing the first vehicle to initiate the first action. In some examples, in response to a first temperature of the at least part of the second vehicle (such as temperature corresponding to an overheated engine, temperature corresponding to a fire, temperature corresponding to a normal operation temperature of the second vehicle, etc.), step 1940 may cause the first vehicle to initiate a first action responding to the second vehicle, and in response to a second temperature of the at least part of the second vehicle (such as temperature corresponding to an overheated engine, temperature corresponding to a fire, temperature corresponding to a normal operation temperature of the second vehicle, etc.), step 1940 may cause the first vehicle to initiate a second action responding to the second vehicle, where the second action may differ from the first action. In some examples, in response to a first temperature of the at least part of the second vehicle (such as temperature corresponding to an overheated engine, temperature corresponding to a fire, temperature corresponding to a normal operation temperature of the second vehicle, etc.) and a determination by step 1930 that the second vehicle emits smoke not through an exhaust system, step 1940 may cause the first vehicle to initiate a first action responding to the second vehicle, and in response to a second temperature of the at least part of the second vehicle (such as temperature corresponding to an overheated engine, temperature corresponding to a fire, temperature corresponding to a normal operation temperature of the second vehicle, etc.), step 1940 may withhold and/or forgo causing the first vehicle to initiate the first action.

In some examples, a motion of the second vehicle may be determined, for example as described above. Further, in some examples, in response to the determined motion of the second vehicle and/or the determination that the second vehicle emits smoke not through an exhaust system, the first vehicle may be caused to initiate the action (for example as described above). For example, in response to a first determined motion of the second vehicle and the determination that the second vehicle emits smoke not through an exhaust system, the first vehicle may be caused to initiate a first action; and in response to a second determined motion of the second vehicle and the determination that the second vehicle emits smoke not through an exhaust system, the first vehicle may be caused to initiate a second action. In another example, in response to a first determined motion of the second vehicle and the determination that the second vehicle emits smoke not through an exhaust system, the first vehicle may be caused to initiate a first action; and in response to a second determined motion of the second vehicle and the determination that the second vehicle emits smoke not through an exhaust system, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the determination that the second vehicle emits smoke not through an exhaust system, the first vehicle may be caused to initiate the action (for example as described above). For example, in response to a first determined type of the signaling and the determination that the second vehicle emits smoke not through an exhaust system, the first vehicle may be caused to initiate a first action; and in response to a second determined type of the signaling and the determination that the second vehicle emits smoke not through an exhaust system, the first vehicle may be caused to initiate a second action. In another example, in response to a first determined type of the signaling and the determination that the second vehicle emits smoke not through an exhaust system, the first vehicle may be caused to initiate a first action; and in response to a second determined type of the signaling and the determination that the second vehicle emits smoke not through an exhaust system, causing the first vehicle to initiate the first action may be withheld and/or forwent. In an additional example, in response to the determination that the second vehicle is signaling and the determination that the second vehicle emits smoke not through an exhaust system, the first vehicle may be caused to initiate a first action; and in response to the determination that the second vehicle is not signaling and the determination that the second vehicle emits smoke not through an exhaust system, the first vehicle may be caused to initiate a second action. In yet another example, in response to the determination that the second vehicle is signaling and the determination that the second vehicle emits smoke not through an exhaust system, the first vehicle may be caused to initiate a first action; and in response to the determination that the second vehicle is not signaling and the determination that the second vehicle emits smoke not through an exhaust system, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and/or the determination that the second vehicle emits smoke not through an exhaust system, the first vehicle may be caused to initiate the action (for example as described above). For example, in response to a first determined position of the second vehicle and the determination that the second vehicle emits smoke not through an exhaust system, the first vehicle may be caused to initiate a first action; and in response to a second determined position of the second vehicle and the determination that the second vehicle emits smoke not through an exhaust system, the first vehicle may be caused to initiate a second action. In another example, in response to a first determined position of the second vehicle and the determination that the second vehicle emits smoke not through an exhaust system, the first vehicle may be caused to initiate a first action; and in response to a second determined position of the second vehicle and the determination that the second vehicle emits smoke not through an exhaust system, causing the first vehicle to initiate the first action may be withheld and/or forwent. In an additional example, in response to the determination that the second vehicle is in a lane and/or a planned path of the first vehicle and the determination that the second vehicle emits smoke not through an exhaust system, the first vehicle may be caused to initiate a first action; and in response to the determination that the second vehicle is not in a lane and/or is not in a planned path of the first vehicle and the determination that the second vehicle emits smoke not through an exhaust system, the first vehicle may be caused to initiate a second action. In yet another example, in response to the determination that the second vehicle is in a lane and/or a planned path of the first vehicle and the determination that the second vehicle emits smoke not through an exhaust system, the first vehicle may be caused to initiate a first action; and in response to the determination that the second vehicle is not in a lane and/or is not in a planned path of the first vehicle and the determination that the second vehicle emits smoke not through an exhaust system, causing the first vehicle to initiate the first action may be withheld and/or forwent.

In some embodiments, systems, methods and computer readable media for controlling vehicles in response to two-wheeler vehicles are provided. One challenge of autonomous driving is to determine when a standing vehicle has stopped for a short period of time and therefore the autonomous vehicle needs to wait for the standing vehicle to resume moving, and when the standing vehicle has stopped for a longer period of time (for example, parking) and therefore the autonomous vehicle needs to pass the standing vehicle. In some cases, identifying that a two-wheeler vehicle is in use may indicate that the two-wheeler vehicle has stopped for a longer period of time. The provided systems, methods and computer readable media for controlling vehicles may detect a two-wheeler vehicle, determine whether at least one rider rides the two-wheeler vehicle, and control a response of an autonomous vehicle to the detected vehicle based on the determination of whether the at least one rider rides the two-wheeler vehicle.

FIG. 20 illustrates an example of a method 2000 for controlling vehicles in response to two-wheeler vehicles. In this example, method 2000 may comprise: obtaining images captured from an environment of a first vehicle (Step 710); analyzing the images to detect a two-wheeler vehicle (Step 2020); analyzing the images to determine whether at least one rider rides the two-wheeler vehicle (Step 2030); in response to a determination that no rider rides the two-wheeler vehicle, causing the first vehicle to initiate an action responding to the two-wheeler vehicle (Step 2040), and in response to a determination that at least one rider rides the two-wheeler vehicle, forgoing causing the first vehicle to initiate the action. In some implementations, method 2000 may comprise one or more additional steps, while some of the steps listed above may be modified or excluded. In some implementations, one or more steps illustrated in FIG. 20 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a two-wheeler vehicle. Further, in some examples, the one or more images may be analyzed to determine whether at least one rider rides the two-wheeler vehicle. Further, in examples, for example in response to the determination that no rider rides the two-wheeler vehicle, the first vehicle may be caused to initiate an action responding to the two-wheeler vehicle, for example as described above. Some non-limiting examples of such action may include signaling, stopping, changing a speed of the first vehicle, changing a motion direction of the first vehicle, passing the two-wheeler vehicle, turning, performing a U-turn, driving in reverse, generating an audible warning, and so forth.

In some embodiments, step 2020 may comprise analyzing the one or more images obtained by step 710 to detect a two-wheeler vehicle (or to detect selected types of two-wheeler vehicles, such as single-track two-wheeler vehicle, a dandy horse, a bicycle, a motorcycle, a dicycle, and so forth). Some non-limiting examples of such two-wheeler vehicle may include a single-track two-wheeler vehicle, a dandy horse, a bicycle, a motorcycle, a dicycle, and so forth. For example, a machine learning model may be trained using training examples to detect two-wheeler vehicle (or to detect selected types of two-wheeler vehicles, such as single-track two-wheeler vehicle, a dandy horse, a bicycle, a motorcycle, a dicycle, and so forth) in images and/or videos, and step 2020 may use the trained machine learning model to analyze the one or more images obtained by step 710 and detect the two-wheeler vehicle in the one or more images. An example of such training example may include an image and/or a video, together with a label indicating whether a two-wheeler vehicle (or whether a two-wheeler vehicle of selected types of two-wheeler vehicles, such as single-track two-wheeler vehicle, a dandy horse, a bicycle, a motorcycle, a dicycle, and so forth) appears in the image and/or in the video, and/or together with a label indicating a position of the two-wheeler vehicle in the image and/or in the video. In another example, an artificial neural network (such as a deep neural networks, convolutional neural networks, etc.) may be configured to detect two-wheeler vehicle (or to detect selected types of two-wheeler vehicles, such as single-track two-wheeler vehicle, a dandy horse, a bicycle, a motorcycle, a dicycle, and so forth) in images and/or videos, and step 2020 may use the artificial neural network to analyze the one or more images obtained by step 710 and detect the two-wheeler vehicle in the one or more images. In yet another example, step 2020 may use object detection algorithms to analyze the one or more images obtained by step 710 and detect the two-wheeler vehicle in the one or more images.

In some examples, the one or more images obtained by step 710 may be analyzed to detect a second vehicle, for example using step 720, and step 2020 may analyze the one or more images obtained by step 710 to determine whether the detected second vehicle is a two-wheeler vehicle. For example, a machine learning model may be trained using training examples to determine whether vehicles are two-wheeler vehicles (or whether vehicles are two-wheeler vehicles of selected types, such as single-track two-wheeler vehicle, a dandy horse, a bicycle, a motorcycle, a dicycle, etc.) by analyzing images and/or videos, and step 2020 may use the trained machine learning model to analyze the one or more images obtained by step 710 and determine whether the second vehicle detected by step 720 is a two-wheeler vehicle (or whether the second vehicle detected by step 720 is a two-wheeler vehicle of selected types, such as single-track two-wheeler vehicle, a dandy horse, a bicycle, a motorcycle, a dicycle, and so forth). An example of such training example may include an image and/or a video depicting a vehicle, together with a label indicating whether the depicted vehicle is a two-wheeler vehicle (or whether the depicted vehicle is a two-wheeler vehicle of selected types, such as single-track two-wheeler vehicle, a dandy horse, a bicycle, a motorcycle, a dicycle, and so forth). In another example, an artificial neural network (such as a deep neural networks, convolutional neural networks, etc.) may be configured to determine whether vehicles are two-wheeler vehicles (or whether vehicles are two-wheeler vehicles of selected types, such as single-track two-wheeler vehicle, a dandy horse, a bicycle, a motorcycle, a dicycle, etc.) by analyzing images and/or videos, and step 2020 may use the artificial neural network to analyze the one or more images obtained by step 710 and determine whether the second vehicle detected by step 710 is a two-wheeler vehicle (or whether the second vehicle detected by step 720 is a two-wheeler vehicle of selected types, such as single-track two-wheeler vehicle, a dandy horse, a bicycle, a motorcycle, a dicycle, and so forth).

In some embodiments, step 2030 may comprise analyzing the one or more images obtained by step 710 to determine whether at least one rider rides the two-wheeler vehicle detected by step 2020. For example, a machine learning model may be trained using training examples to determine whether riders ride two-wheeler vehicles from images and/or videos, and step 2030 may use the trained machine learning model to analyze the one or more images obtained by step 710 and determine whether at least one rider rides the two-wheeler vehicle detected by step 2020. An example of such training example may include an image and/or a video depicting a two-wheeler vehicle, together with a label indicating whether at least one rider rides the depicted two-wheeler vehicle. In another example, an artificial neural network (such as a deep neural networks, convolutional neural networks, etc.) may be configured to determine whether riders ride two-wheeler vehicles from images and/or videos, and step 2030 may use the artificial neural network to analyze the one or more images obtained by step 710 and determine whether at least one rider rides the two-wheeler vehicle detected by step 2020. In yet another example, visual person detector may be used to detect persons in the one or more images obtained by step 710, the location of the detect persons may be compared with the location of the two-wheeler vehicle detected by step 2020, and when a person is detected substantially above the two-wheeler vehicle detected by step 2020, step 2030 may determine that the detected person is riding the two-wheeler vehicle detected by step 2020. Additionally or alternatively, position of two legs of the detected person may be analyzed to determine whether the two legs of the detected person are on opposite sides of the two-wheeler vehicle detected by step 2020, and when the two legs of the detected person are on opposite sides of the two-wheeler vehicle detected by step 2020, step 2030 may determine that the detected person is riding the two-wheeler vehicle detected by step 2020.

In some embodiments, step 2040 may comprise, for example in response to a determination that no rider rides the two-wheeler vehicle detected by step 2020 (e.g., as determined by step 2030), causing the first vehicle to initiate an action responding to the two-wheeler vehicle. Some non-limiting examples of such action may include signaling, stopping, changing a speed of the first vehicle, changing a motion direction of the first vehicle, passing the two-wheeler vehicle, forgoing passing the two-wheeler vehicle, keeping a minimal distance of at least a selected length from the two-wheeler vehicle (for example, the selected length may be less than 100 feet, may be at least 100 feet, may be at least 200 feet, etc.), turning, performing a U-turn, driving in reverse, generating an audible warning, and so forth. For example, step 2040 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the two-wheeler vehicle detected by step 2020. In another example, step 2040 may provide information related to the two-wheeler vehicle to such external device, and the information may be configured to cause the external device to cause the first vehicle to initiate the action responding to the two-wheeler vehicle detected by step 2020. In one example, in response to a determination that at least one rider rides the two-wheeler vehicle detected by step 2020 (e.g., as determined by step 2030), step 2040 may cause the first vehicle to initiate a second action, the second action may differ from the action. For example, in response to a determination that no rider rides the two-wheeler vehicle detected by step 2020 (e.g., as determined by step 2030), step 2040 may cause the first vehicle to initiate a first action, and in response to a determination that at least one rider rides the two-wheeler vehicle detected by step 2020 (e.g., as determined by step 2030), step 2040 may cause the first vehicle to initiate a second action, the second action may differ from the first action. In another example, in response to a determination that no rider rides the two-wheeler vehicle detected by step 2020 (e.g., as determined by step 2030), step 2040 may cause the first vehicle to initiate a first action, and in response to a determination that at least one rider rides the two-wheeler vehicle detected by step 2020 (e.g., as determined by step 2030), step 2040 may withhold and/or forgo causing the first vehicle to initiate the first action.

In some embodiments, the one or more images obtained by step 710 may be analyzed to determine whether a leg of the at least one rider of the two-wheeler vehicle touches the ground, for example as described below. In some examples, in response to a determination that the leg of the at least one rider touches the ground, step 2040 may cause the first vehicle to initiate a first action responding to the two-wheeler vehicle, and in response to a determination that the leg of the at least one rider do not touch the ground, step 2040 may withhold and/or forgo causing the first vehicle to initiate the first action responding to the two-wheeler vehicle. In some examples, in response to a determination that the leg of the at least one rider touches the ground, step 2040 may cause the first vehicle to initiate a first action responding to the two-wheeler vehicle, and in response to a determination that the leg of the at least one rider do not touch the ground, step 2040 may cause the first vehicle to initiate a second action responding to the two-wheeler vehicle, the second action may differ from the first action.

In some examples, the one or more images obtained by step 710 may be analyzed to determine whether a leg of the at least one rider of the two-wheeler vehicle touches the ground. For example, a machine learning model may be trained using training examples to determine whether legs of riders of two-wheeler vehicles touch the ground from images and/or videos, and the trained machine learning model may be used to analyze the one or more images obtained by step 710 and determine whether a leg of the at least one rider of the two-wheeler vehicle touches the ground. An example of such training example may include an image and/or a video depicting a rider of a two-wheeler vehicle, together with an indication of whether a leg of the depicted rider touches the ground. In another example, an artificial neural network (such as a deep neural networks, convolutional neural networks, etc.) may be configured to determine whether legs of riders of two-wheeler vehicles touch the ground from images and/or videos, and the artificial neural network may be used to analyze the one or more images obtained by step 710 and determine whether a leg of the at least one rider of the two-wheeler vehicle touches ground.

In some examples, a motion of the two-wheeler vehicle may be determined, for example as described above in relation to motion of the second vehicle. Further, in some examples, in response to the determined motion of the two-wheeler vehicle and/or the determination that no rider rides the two-wheeler vehicle, the first vehicle may be caused to initiate the action (for example as described above). For example, in response to a first determined motion of the two-wheeler vehicle and the determination that no rider rides the two-wheeler vehicle, the first vehicle may be caused to initiate a first action; and in response to a second determined motion of the two-wheeler vehicle and the determination that no rider rides the two-wheeler vehicle, the first vehicle may be caused to initiate a second action. In another example, in response to a first determined motion of the two-wheeler vehicle and the determination that no rider rides the two-wheeler vehicle, the first vehicle may be caused to initiate a first action; and in response to a second determined motion of the two-wheeler vehicle and the determination that no rider rides the two-wheeler vehicle, causing the first vehicle to initiate the first action may be withheld and/or forwent.

In some examples, it may be determining that the two-wheeler vehicle is signaling, for example as described above in relation to signaling of the second vehicle. Further, in some examples, a type of the signaling of the two-wheeler vehicle may be determined, for example as described above in relation to type of signaling of the second vehicle. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the two-wheeler vehicle is signaling and/or the determined type of the signaling and/or the determination that no rider rides the two-wheeler vehicle, the first vehicle may be caused to initiate the action (for example as described above). For example, in response to a first determined type of the signaling and the determination that no rider rides the two-wheeler vehicle, the first vehicle may be caused to initiate a first action; and in response to a second determined type of the signaling and the determination that no rider rides the two-wheeler vehicle, the first vehicle may be caused to initiate a second action. In another example, in response to a first determined type of the signaling and the determination that no rider rides the two-wheeler vehicle, the first vehicle may be caused to initiate a first action; and in response to a second determined type of the signaling and the determination that no rider rides the two-wheeler vehicle, causing the first vehicle to initiate the first action may be withheld and/or forwent. In an additional example, in response to the determination that the two-wheeler vehicle is signaling and the determination that no rider rides the two-wheeler vehicle, the first vehicle may be caused to initiate a first action; and in response to the determination that the two-wheeler vehicle is not signaling and the determination that no rider rides the two-wheeler vehicle, the first vehicle may be caused to initiate a second action. In yet another example, in response to the determination that the two-wheeler vehicle is signaling and the determination that no rider rides the two-wheeler vehicle, the first vehicle may be caused to initiate a first action; and in response to the determination that the two-wheeler vehicle is not signaling and the determination that no rider rides the two-wheeler vehicle, causing the first vehicle to initiate the first action may be withheld and/or forwent.

In some examples, a position of the two-wheeler vehicle may be determined, for example as described above in relation to position of the second vehicle. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the two-wheeler vehicle is in a lane of the first vehicle, for example as described above in relation to the second vehicle. Further, in some examples, it may be determining that the two-wheeler vehicle is in a planned path of the first vehicle, for example as described above in relation to the second vehicle. Further, in some examples, in response to the determined position of the two-wheeler vehicle and/or the determination that no rider rides the two-wheeler vehicle, the first vehicle may be caused to initiate the action (for example as described above). For example, in response to a first determined position of the two-wheeler vehicle and the determination that no rider rides the two-wheeler vehicle, the first vehicle may be caused to initiate a first action; and in response to a second determined position of the two-wheeler vehicle and the determination that no rider rides the two-wheeler vehicle, the first vehicle may be caused to initiate a second action. In another example, in response to a first determined position of the two-wheeler vehicle and the determination that no rider rides the two-wheeler vehicle, the first vehicle may be caused to initiate a first action; and in response to a second determined position of the two-wheeler vehicle and the determination that no rider rides the two-wheeler vehicle, causing the first vehicle to initiate the first action may be withheld and/or forwent. In an additional example, in response to the determination that the two-wheeler vehicle is in a lane and/or a planned path of the first vehicle and the determination that no rider rides the two-wheeler vehicle, the first vehicle may be caused to initiate a first action; and in response to the determination that the two-wheeler vehicle is not in a lane and/or is not in a planned path of the first vehicle and the determination that no rider rides the two-wheeler vehicle, the first vehicle may be caused to initiate a second action. In yet another example, in response to the determination that the two-wheeler vehicle is in a lane and/or a planned path of the first vehicle and the determination that no rider rides the two-wheeler vehicle, the first vehicle may be caused to initiate a first action; and in response to the determination that the two-wheeler vehicle is not in a lane and/or is not in a planned path of the first vehicle and the determination that no rider rides the two-wheeler vehicle, causing the first vehicle to initiate the first action may be withheld and/or forwent.

In some examples, a motion of the two-wheeler vehicle may be determined, for example as described above in relation to motion of the second vehicle. Further, in some examples, in response to the determined motion of the two-wheeler vehicle and/or the determination that at least one rider rides the two-wheeler vehicle, the first vehicle may be caused to initiate the action (for example as described above). For example, in response to a first determined motion of the two-wheeler vehicle and the determination that at least one rider rides the two-wheeler vehicle, the first vehicle may be caused to initiate a first action; and in response to a second determined motion of the two-wheeler vehicle and the determination that at least one rider rides the two-wheeler vehicle, the first vehicle may be caused to initiate a second action. In another example, in response to a first determined motion of the two-wheeler vehicle and the determination that at least one rider rides the two-wheeler vehicle, the first vehicle may be caused to initiate a first action; and in response to a second determined motion of the two-wheeler vehicle and the determination that at least one rider rides the two-wheeler vehicle, causing the first vehicle to initiate the first action may be withheld and/or forwent.

In some examples, it may be determining that the two-wheeler vehicle is signaling, for example as described above in relation to signaling of the second vehicle. Further, in some examples, a type of the signaling of the two-wheeler vehicle may be determined, for example as described above in relation to type of signaling of the second vehicle. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the two-wheeler vehicle is signaling and/or the determined type of the signaling and/or the determination that at least one rider rides the two-wheeler vehicle, the first vehicle may be caused to initiate the action (for example as described above). For example, in response to a first determined type of the signaling and the determination that at least one rider rides the two-wheeler vehicle, the first vehicle may be caused to initiate a first action; and in response to a second determined type of the signaling and the determination that at least one rider rides the two-wheeler vehicle, the first vehicle may be caused to initiate a second action. In another example, in response to a first determined type of the signaling and the determination that at least one rider rides the two-wheeler vehicle, the first vehicle may be caused to initiate a first action; and in response to a second determined type of the signaling and the determination that at least one rider rides the two-wheeler vehicle, causing the first vehicle to initiate the first action may be withheld and/or forwent. In an additional example, in response to the determination that the two-wheeler vehicle is signaling and the determination that at least one rider rides the two-wheeler vehicle, the first vehicle may be caused to initiate a first action; and in response to the determination that the two-wheeler vehicle is not signaling and the determination that at least one rider rides the two-wheeler vehicle, the first vehicle may be caused to initiate a second action. In yet another example, in response to the determination that the two-wheeler vehicle is signaling and the determination that at least one rider rides the two-wheeler vehicle, the first vehicle may be caused to initiate a first action; and in response to the determination that the two-wheeler vehicle is not signaling and the determination that at least one rider rides the two-wheeler vehicle, causing the first vehicle to initiate the first action may be withheld and/or forwent.

In some examples, a position of the two-wheeler vehicle may be determined, for example as described above in relation to position of the second vehicle. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the two-wheeler vehicle is in a lane of the first vehicle, for example as described above in relation to the second vehicle. Further, in some examples, it may be determining that the two-wheeler vehicle is in a planned path of the first vehicle, for example as described above in relation to the second vehicle. Further, in some examples, in response to the determined position of the two-wheeler vehicle and/or the determination that at least one rider rides the two-wheeler vehicle, the first vehicle may be caused to initiate the action (for example as described above). For example, in response to a first determined position of the two-wheeler vehicle and the determination that at least one rider rides the two-wheeler vehicle, the first vehicle may be caused to initiate a first action; and in response to a second determined position of the two-wheeler vehicle and the determination that at least one rider rides the two-wheeler vehicle, the first vehicle may be caused to initiate a second action. In another example, in response to a first determined position of the two-wheeler vehicle and the determination that at least one rider rides the two-wheeler vehicle, the first vehicle may be caused to initiate a first action; and in response to a second determined position of the two-wheeler vehicle and the determination that at least one rider rides the two-wheeler vehicle, causing the first vehicle to initiate the first action may be withheld and/or forwent. In an additional example, in response to the determination that the two-wheeler vehicle is in a lane and/or a planned path of the first vehicle and the determination that at least one rider rides the two-wheeler vehicle, the first vehicle may be caused to initiate a first action; and in response to the determination that the two-wheeler vehicle is not in a lane and/or is not in a planned path of the first vehicle and the determination that at least one rider rides the two-wheeler vehicle, the first vehicle may be caused to initiate a second action. In yet another example, in response to the determination that the two-wheeler vehicle is in a lane and/or a planned path of the first vehicle and the determination that at least one rider rides the two-wheeler vehicle, the first vehicle may be caused to initiate a first action; and in response to the determination that the two-wheeler vehicle is not in a lane and/or is not in a planned path of the first vehicle and the determination that at least one rider rides the two-wheeler vehicle, causing the first vehicle to initiate the first action may be withheld and/or forwent.

In some embodiments, it may be determined whether a vehicle (such as the second vehicle, the two-wheeler vehicle, etc.) is moving. In one example, the a motion of the vehicle may be determined, for example as described above, and the determined motion of the vehicle may be analyzed to determine whether the vehicle is moving. In another example, the one or more images obtained by step 710 may be analyzed to determine whether the vehicle is moving. In yet another example, a machine learning model may be trained using training examples to determine whether vehicles are moving from images and/or videos, and the trained machine learning model may be used to analyze the one or more images obtained by step 710 and determine whether the vehicle is moving. An example of such training example may include an image and/or a video depicting a vehicle, together with a label indicating whether the depicted vehicle is moving. In one example, in response to a determination that the vehicle (such as the second vehicle, the two-wheeler vehicle, etc.) is not moving, an action (such as causing the first vehicle to perform an action as described herein) may be performed, and in response to a determination that the vehicle (such as the second vehicle, the two-wheeler vehicle, etc.) is moving, performing the action may be forgone. In another example, in response to a determination that the vehicle (such as the second vehicle, the two-wheeler vehicle, etc.) is moving, an action (such as causing the first vehicle to perform an action as described herein) may be performed, and in response to a determination that the vehicle (such as the second vehicle, the two-wheeler vehicle, etc.) is not moving, performing the action may be forgone. In one example, in response to a determination that the two-wheeler vehicle is not moving and the determination by step 2030 that no rider rides the two-wheeler vehicle, step 2040 may cause the first vehicle to initiate the action. In one example, in response to the determination that the two-wheeler vehicle is not moving and a determination by step 2030 that at least one rider rides the two-wheeler vehicle, step 2040 may forgo causing the first vehicle to initiate the action. In one example, in response to the determination that the two-wheeler vehicle is moving, step 2040 may forgo causing the first vehicle to initiate the action.

In some embodiments, it may be determined whether a vehicle (such as the second vehicle, the two-wheeler vehicle, etc.) is an autonomous vehicle configured to drive without a driver (such as an autonomous two-wheeler vehicle configured to drive without a driver). In one example, the one or more images obtained by step 710 may be analyzed to determine whether the vehicle is an autonomous vehicle configured to drive without a driver. In another example, a machine learning model may be trained using training examples to determine whether vehicles are autonomous vehicles configured to drive without drivers from images and/or videos, and the trained machine learning model may be used to analyze the one or more images obtained by step 710 and determine whether the vehicle is an autonomous vehicle configured to drive without a driver. An example of such training example may include an image and/or a video depicting a vehicle, together with a label indicating whether the depicted vehicle is an autonomous vehicle configured to drive without a driver. In yet another example, a model of the vehicle may be identified (for example using object recognition algorithms), and the model may be used to determine whether the vehicle is an autonomous vehicle configured to drive without a driver. In an additional example, a visual indicator visible on the vehicle may be detected (for example using object detection algorithms), and the detected visual indicator may be used to determine whether the vehicle is an autonomous vehicle configured to drive without a driver. In some examples, in response to a determination that the vehicle is an autonomous vehicle configured to drive without a driver, an action (such as causing the first vehicle to initiate the action) may be performed, and in response to a determination that the vehicle is not an autonomous vehicle configured to drive without a driver, performing the action may be forgone and/or a different action may be performed. In some examples, in response to a determination that the vehicle is not an autonomous vehicle configured to drive without a driver, an action (such as causing the first vehicle to initiate the action) may be performed, and in response to a determination that the vehicle is an autonomous vehicle configured to drive without a driver, performing the action may be forgone. In some examples, in response to a determination by step 2030 that the two-wheeler vehicle is an autonomous two-wheeler vehicle configured to drive without a driver and the determination that no rider rides the two-wheeler vehicle, step 2040 may perform an action (such as causing the first vehicle to initiate the action), and in response to a determination that the two-wheeler vehicle is not an autonomous two-wheeler vehicle configured to drive without a driver and the determination by step 2030 that no rider rides the two-wheeler vehicle, step 2040 may forgo performing the action. In some examples, in response to a determination that the two-wheeler vehicle is not an autonomous two-wheeler vehicle configured to drive without a driver and the determination by step 2030 that no rider rides the two-wheeler vehicle, step 2040 may perform an action (such as causing the first vehicle to initiate the action), and in response to a determination that the two-wheeler vehicle is an autonomous two-wheeler vehicle configured to drive without a driver and the determination by step 2030 that no rider rides the two-wheeler vehicle, step 2040 may forgo performing the action. In some examples, in response to a determination that the two-wheeler vehicle is not an autonomous two-wheeler vehicle configured to drive without a driver and the determination by step 2030 that no rider rides the two-wheeler vehicle, step 2040 may perform a first action, and in response to a determination that the two-wheeler vehicle is an autonomous two-wheeler vehicle configured to drive without a driver and the determination by step 2030 that no rider rides the two-wheeler vehicle, step 2040 may perform the a second action, the second action may differ from the first action.

In some embodiments, systems, methods and computer readable media for controlling vehicles in response to winter service vehicles are provided. In some embodiments, systems, methods and computer readable media for controlling vehicles in response to winter service vehicles are provided. One challenge of autonomous driving is to determine when a vehicle is moving slowly for a short period of time and therefore the autonomous vehicle needs to wait for the slow vehicle to resume normal speed, and when the vehicle is moving slowly for a longer period of time and the autonomous vehicle needs to pass the slow moving vehicle. In some cases, identifying that the vehicle is a winter service vehicle may indicate that the vehicle is moving slowly for a longer period of time. The provided systems, methods and computer readable media for controlling vehicles may detect a vehicle, identify whether the vehicle is a winter service vehicle, and control a response of an autonomous vehicle to the detected vehicle based on whether the vehicle is a winter service vehicle.

FIG. 21 illustrates an example of a method 2100 for controlling vehicles in response to winter service vehicles. In this example, method 2100 may comprise: obtaining images captured from an environment of a first vehicle (Step 710); analyzing the images to detect a second vehicle (Step 720); analyzing the images to determine that the second vehicle is a winter service vehicle (Step 2130); in response to the determination that the second vehicle is a winter service vehicle, causing the first vehicle to initiate an action responding to the second vehicle (Step 2140), and in response to the determination that the second vehicle is not a winter service vehicle, forgoing causing the first vehicle to initiate the action. In some implementations, method 2100 may comprise one or more additional steps, while some of the steps listed above may be modified or excluded. In some implementations, one or more steps illustrated in FIG. 21 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine whether the second vehicle is a winter service vehicle. Further, in examples, for example in response to the determination that the second vehicle is a winter service vehicle, the first vehicle may be caused to initiate an action responding to the second vehicle, for example as described above. Some non-limiting examples of such action may include signaling, stopping, changing a speed of the first vehicle, changing a motion direction of the first vehicle, passing the second vehicle, forgoing passing the second vehicle, turning, performing a U-turn, driving in reverse, generating an audible warning, keeping a minimal distance of at least a selected length from the second vehicle (for example, where the selected distance is at least 20 feet, at least 50 feet, at least 100 feet, at least 190 feet, at least 200 feet, etc.), and so forth.

In some embodiments, step 2130 may comprise analyzing the one or more images obtained by step 710 to determine whether the second vehicle detected by step 720 is a winter service vehicle. For example, a machine learning model may be trained using training examples to determine whether vehicles are winter service vehicles by analyzing images and/or videos, and step 2130 may use the trained machine learning model to analyze the one or more images obtained by step 710 and determine whether the second vehicle detected by step 720 is a winter service vehicle. An example of such training example may include an image and/or a video depicting a vehicle, together with a label indicating whether the depicted vehicle is a winter service vehicle. In another example, an artificial neural network (such as a deep neural networks, convolutional neural networks, etc.) may be configured to determine whether vehicles are winter service vehicles by analyzing images and/or videos, and step 2130 may use the artificial neural network to analyze the one or more images obtained by step 710 and determine whether the second vehicle detected by step 720 is a winter service vehicle. In yet another example, step 2130 may use image classification algorithms to analyze the one or more images obtained by step 710 and determine whether the second vehicle detected by step 720 is a winter service vehicle.

In some embodiments, step 2140 may comprise, for example in response to a determination that the second vehicle detected by step 720 is a winter service vehicle (e.g., as determined by step 2130), causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, keeping a minimal distance of at least a selected length from the second vehicle (for example, the selected length may be less than 100 feet, may be at least 100 feet, may be at least 200 feet, etc.), turning, performing a U-turn, driving in reverse, generating an audible warning, and so forth. For example, step 2140 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 2140 may provide information related to the second vehicle detected by step 720 (such as position, motion, type, activity status, dimensions, etc.) to such external device, and the information may be configured to cause the external device to cause the first vehicle to initiate the action responding to the second vehicle detected by step 720. In one example, in response to a determination that the second vehicle detected by step 720 is not a winter service vehicle (e.g., as determined by step 2130), step 2140 may cause the first vehicle to initiate a second action, the second action may differ from the action. In one example, in response to a determination that the second vehicle detected by step 720 is a winter service vehicle (e.g., as determined by step 2130), step 2140 may cause the first vehicle to initiate a first action, and in response to a determination that the second vehicle detected by step 720 is not a winter service vehicle (e.g., as determined by step 2130), step 2140 may cause the first vehicle to initiate a second action, the second action may differ from the first action. In another example, in response to a determination that the second vehicle detected by step 720 is a winter service vehicle (e.g., as determined by step 2130), step 2140 may cause the first vehicle to initiate a first action, and in response to a determination that the second vehicle detected by step 720 is not a winter service vehicle (e.g., as determined by step 2130), step 2140 may withhold and/or forgo causing the first vehicle to initiate the first action.

In some embodiments, the one or more images obtained by step 710 may be analyzed to determine whether a snow plough is mounted to the second vehicle detected by step 720, for example as described below. Further, in some examples, in response to the determination that a snow plough is mounted to the second vehicle detected by step 720, step 2130 may determine that the second vehicle is a winter service vehicle. Further, in some examples, in response to the determination that no snow plough is mounted to the second vehicle detected by step 720, step 2130 may determine that the second vehicle is not a winter service vehicle.

In some examples, the one or more images obtained by step 710 may be analyzed to determine whether a snow plough is mounted to the second vehicle detected by step 720. For example, a machine learning model may be trained using training examples to determine whether vehicles are mounted to snow ploughs, and the trained machine learning model may be used to analyze the one or more images obtained by step 710 and determine whether a snow plough is mounted to the second vehicle detected by step 720. An example of such training example may include an image and/or a video depicting a vehicle, together with a label indicating whether the depicted vehicle is connected to a snow plough. In another example, an artificial neural network (such as a deep neural networks, convolutional neural networks, etc.) may be configured to determine whether vehicles are mounted to snow ploughs from images and/or videos, and the artificial neural network may be used to analyze the one or more images and determine whether a snow plough is mounted to the second vehicle. In yet another example, an object detection algorithms (such as a visual snow plough detector) may be used to detect snow ploughs in the one or more images obtained by step 710, the location of the detected snow ploughs may be compared to the location of the second vehicle detected by step 720, and when a location of a snow plough is adjunct to the location of the second vehicle it may be determined that the snow plough is mounted to the second vehicle.

In some embodiments, the one or more images obtained by step 710 may be analyzed to detect snow moving in a vicinity of the second vehicle detected by step 720, for example as described below. Further, in some examples, the one or more images obtained by step 710 to identify a pattern of motion of the snow moving in the vicinity of the second vehicle detected by step 720, for example as described below. In one example, the identified pattern of the motion of the snow moving in the vicinity of the second vehicle detected by step 720 may be analyzed to determine whether the second vehicle detected by step 720 is a winter service vehicle, for example as described below. In one example, the identified pattern of the motion of the snow moving in the vicinity of the second vehicle detected by step 720 may be analyzed to determine a state of the winter service vehicle. Some non-limiting examples of such state may include engaged in removal of at least one of snow and ice, engaged in removal of snow, engaged in removal of ice, not engaged in removal of snow, not engaged in removal of ice, not engaged in removal of any one of snow and ice, and so forth.

In some examples, the one or more images obtained by step 710 may be analyzed to detect snow moving in a vicinity of the second vehicle. For example, a machine learning model may be trained using training examples to detect moving snow in images and/or videos, and the trained machine learning model may be used to analyze the one or more images obtained by step 710 and detect snow moving in a vicinity of the second vehicle detected by step 720. An example of such training example may include an image and/or a video, together with a label indicating whether snow is moving in particular areas of the image and/or the video. In another example, an artificial neural network (such as a deep neural networks, convolutional neural networks, etc.) may be configured to detect moving snow in images and/or videos, and the artificial neural network may be used to analyze the one or more images obtained by step 710 and detect snow moving in a vicinity of the second vehicle detected by step 720. In yet another example, a motion object detection algorithm may be used to detect snow moving in a vicinity of the second vehicle detected by step 720 in the one or more images obtained by step 710.

In some examples, the one or more images obtained by step 710 to identify a pattern of motion of the snow moving in the vicinity of the second vehicle detected by step 720. Some non-limiting examples of such patterns of motion of snow may include an average direction of motion, an average speed of motion, an histogram of directions of motion, an histogram of speeds of motion, a mapping of an average direction of motion at different areas, a mapping of an average speed of motion at different areas, a mapping of histograms of directions of motion at different areas, a mapping of histograms of speeds of motion at different areas, any combination of the above, a qualitative description of the motion (such as 'flat', 'solid stream', 'full cone', 'hollow cone', 'dropping', 'spraying', etc.), and so forth. For example, a machine learning model may be trained using training examples to identify patterns of motion of moving snow in images and/or videos, and the trained machine learning model may be used to analyze the one or more images obtained by step 710 and identify the pattern of motion of the snow moving in the vicinity of the second vehicle detected by step 720. An example of such training example may include an image and/or a video of a moving snow, together with a label indicating the pattern of motion of the snow. In another example, an artificial neural network (such as a deep neural networks, convolutional neural networks, etc.) may be configured to identify patterns of motion of moving snow in images and/or videos, and the artificial neural network may be used to analyze the one or more images obtained by step 710 and identify the pattern of motion of the snow moving in the vicinity of the second vehicle detected by step 720. In yet another example, a motion estimation algorithm may be used to identify the pattern of motion of the snow moving in the vicinity of the second vehicle.

In some examples, the identified pattern of the motion of the snow moving in the vicinity of the second vehicle detected by step 720 may be analyzed to determine whether the second vehicle detected by step 720 is a winter service vehicle. For example, a machine learning model may be trained using training examples to determine whether vehicles are winter service vehicles based on patterns of motion of snow moving in the vicinity of the vehicles, and the trained machine learning model may be used to analyze the identified pattern of the motion of the snow moving in the vicinity of the second vehicle detected by step 720 and determine whether the second vehicle detected by step 720 is a winter service vehicle. An example of such training example may include a pattern of motion of snow in a vicinity of a vehicle, together with a label indicating whether the vehicle is a winter service vehicle. In another example, an artificial neural network may be configured to determine whether vehicles are winter service vehicles based on patterns of motion of snow moving in the vicinity of the vehicles, and the artificial neural network may be used to analyze the identified pattern of the motion of the snow moving in the vicinity of the second vehicle detected by step 720 and determine whether the second vehicle is a winter service vehicle detected by step 720.

In some examples, the identified pattern of the motion of the snow moving in the vicinity of the second vehicle detected by step 720 may be analyzed to determine a state of the winter service vehicle. For example, a machine learning model may be trained using training examples to determine states of winter service vehicles based on patterns of motion of snow moving in the vicinity of the winter service vehicles, and the trained machine learning model may be used to analyze the identified pattern of the motion of the snow moving in the vicinity of the second vehicle detected by step 720 and determine the state of the winter service vehicle. An example of such training example may include a pattern of motion of snow, together with a label indicating the state of the winter service vehicle to be identified. In another example, an artificial neural network may be configured to determine states of winter service vehicles based on patterns of motion of snow moving in the vicinity of the winter service vehicles, and the artificial neural network may be used to analyze the identified pattern of the motion of the snow moving in the vicinity of the second vehicle and determine the state of the winter service vehicle.

In some embodiments, a state of the winter service vehicle may be determined, for example as described below. Some non-limiting examples of such state may include engaged in removal of at least one of snow and ice, engaged in removal of snow, engaged in removal of ice, not engaged in removal of snow, not engaged in removal of ice, not engaged in removal of any one of snow and ice, and so forth. In some examples, in response to a first determined state of the winter service vehicle (such as engaged in removal of at least one of snow and ice, engaged in removal of snow, engaged in removal of ice, not engaged in removal of snow, not engaged in removal of ice, not engaged in removal of any one of snow and ice, etc.), step 2140 may cause the first vehicle to initiate a first action responding to the second vehicle, and in response to a second determined state of the winter service vehicle (such as engaged in removal of at least one of snow and ice, engaged in removal of snow, engaged in removal of ice, not engaged in removal of snow, not engaged in removal of ice, not engaged in removal of any one of snow and ice, etc.), step 2140 may withhold and/or forgo causing the first vehicle to initiate the first action. In some examples, in response to a first determined state of the winter service vehicle (such as engaged in removal of at least one of snow and ice, engaged in removal of snow, engaged in removal of ice, not engaged in removal of snow, not engaged in removal of ice, not engaged in removal of any one of snow and ice, etc.), step 2140 may cause the first vehicle to initiate a first action responding to the second vehicle, and in response to a second determined state of the winter service vehicle (such as engaged in removal of at least one of snow and ice, engaged in removal of snow, engaged in removal of ice, not engaged in removal of snow, not engaged in removal of ice, not engaged in removal of any one of snow and ice, etc.), step 2140 may cause the first vehicle to initiate a second action responding to the second vehicle, where the second action may differ from the first action.

In some examples, the one or more images obtained by step 710 may be analyzed to determine a state of the winter service vehicle. For example, the one or more images obtained by step 710 may be analyzed to determine a state of the winter service vehicle based on patterns of motion of snow as described above. In another example, a machine learning model may be trained using training examples to determine states of winter service vehicles by analyzing images and/or videos, and the trained machine learning model may be used to analyze the one or more images obtained by step 710 and determine the state of the winter service vehicle. An example of such training example may include an image and/or a video depicting a winter service vehicle, together with a label indicating the state of the depicted winter service vehicle. In another example, an artificial neural network (such as a deep neural networks, convolutional neural networks, etc.) may be configured to determine states of winter service vehicles by analyzing images and/or videos, and the artificial neural network may be used to analyze the one or more images obtained by step 710 and determine the state of the winter service vehicle.

In some examples, audio data captured using one or more audio sensors from an environment of the first vehicle may be obtained and/or analyzed to determine a state of the winter service vehicle. For example, a machine learning model may be trained using training examples to determine states of winter service vehicles by analyzing audio input, and the trained machine learning model may be used to analyze the captured audio data and determine the state of the winter service vehicle. An example of such training example may include an audio recording, together with a label indicating the state of the depicted winter service vehicle. In another example, an artificial neural network (such as a recurrent neural networks, long short-term memory neural networks, etc.) may be configured to determine states of winter service vehicles by analyzing audio input, and the artificial neural network may be used to analyze the captured audio data and determine the state of the winter service vehicle. In yet another example, signal processing algorithms may be used to analyze the captured audio data and determine whether or not the winter service vehicle is engaged in removal of snow and/or ice.

In some examples, a motion of the second vehicle may be determined, for example as described above. Further, in some examples, in response to the determined motion of the second vehicle and/or the determination that the second vehicle is a winter service vehicle and/or based on the determined state of the winter service vehicle, the first vehicle may be caused to initiate the action (for example as described above). For example, in response to a first determined motion of the second vehicle and the determination that the second vehicle is a winter service vehicle, the first vehicle may be caused to initiate a first action; in response to a second determined motion of the second vehicle and the determination that the second vehicle is a winter service vehicle, the first vehicle may be caused to initiate a second action; and in response to the first determined motion of the second vehicle and the determination that the second vehicle is not a winter service vehicle, the first vehicle may be caused to initiate a third action. In another example, in response to a first determined motion of the second vehicle and the determination that the second vehicle is a winter service vehicle, the first vehicle may be caused to initiate a first action; and in response to a second determined motion of the second vehicle and the determination that the second vehicle is a winter service vehicle, causing the first vehicle to initiate the first action may be withheld and/or forwent. For example, in response to a first determined motion of the second vehicle and a first determined state of the winter service vehicle, the first vehicle may be caused to initiate a first action; in response to a second determined motion of the second vehicle and the first determined state of the winter service vehicle, the first vehicle may be caused to initiate a second action; and in response to the first determined motion of the second vehicle and a second determined state of the winter service vehicle, the first vehicle may be caused to initiate a third action. In another example, in response to a first determined motion of the second vehicle and a first determined state of the winter service vehicle, the first vehicle may be caused to initiate a first action; in response to a second determined motion of the second vehicle and the first determined state of the winter service vehicle and/or in response to the first determined motion of the second vehicle and a second determined state of the winter service vehicle, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the determination that the second vehicle is a winter service vehicle and/or based on the determined state of the winter service vehicle, the first vehicle may be caused to initiate the action (for example as described above). For example, in response to a first determined type of the signaling and the determination that the second vehicle is a winter service vehicle, the first vehicle may be caused to initiate a first action; in response to a second determined type of the signaling and the determination that the second vehicle is a winter service vehicle, the first vehicle may be caused to initiate a second action; and in response to the first determined type of the signaling and the determination that the second vehicle is not a winter service vehicle, the first vehicle may be caused to initiate a third action. In another example, in response to a first determined type of the signaling and the determination that the second vehicle is a winter service vehicle, the first vehicle may be caused to initiate a first action; in response to a second determined type of the signaling and the determination that the second vehicle is a winter service vehicle and/or in response to the first determined type of the signaling and the determination that the second vehicle is not a winter service vehicle, causing the first vehicle to initiate the first action may be withheld and/or forwent. For example, in response to a first determined type of the signaling and a first determined state of the winter service vehicle, the first vehicle may be caused to initiate a first action; in response to a second determined type of the signaling and the first determined state of the winter service vehicle, the first vehicle may be caused to initiate a second action; and in response to the first determined type of the signaling and a second determined state of the winter service vehicle, the first vehicle may be caused to initiate a third action. In another example, in response to a first determined type of the signaling and a first determined state of the winter service vehicle, the first vehicle may be caused to initiate a first action; in response to a second determined type of the signaling and the first determined state of the winter service vehicle and/or in response to the first determined type of the signaling and a second determined state of the winter service vehicle, causing the first vehicle to initiate the first action may be withheld and/or forwent. In an additional example, in response to the determination that the second vehicle is signaling and the determination that the second vehicle is a winter service vehicle, the first vehicle may be caused to initiate a first action; and in response to the determination that the second vehicle is not signaling and the determination that the second vehicle is a winter service vehicle, the first vehicle may be caused to initiate a second action. In yet another example, in response to the determination that the second vehicle is signaling and the determination that the second vehicle is a winter service vehicle, the first vehicle may be caused to initiate a first action; and in response to the determination that the second vehicle is not signaling and the determination that the second vehicle is a winter service vehicle, causing the first vehicle to initiate the first action may be withheld and/or forwent. In an additional example, in response to the determination that the second vehicle is signaling and a first determined state of the winter service vehicle, the first vehicle may be caused to initiate a first action; and in response to the determination that the second vehicle is not signaling and the first determined state of the winter service vehicle, the first vehicle may be caused to initiate a second action. In yet another example, in response to the determination that the second vehicle is signaling and a first determined state of the winter service vehicle, the first vehicle may be caused to initiate a first action; and in response to the determination that the second vehicle is not signaling and the first determined state of the winter service vehicle, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and/or the determination that the second vehicle is a winter service vehicle and/or based the first determined state of the winter service vehicle, the first vehicle may be caused to initiate the action (for example as described above). For example, in response to a first determined position of the second vehicle and the determination that the second vehicle is a winter service vehicle, the first vehicle may be caused to initiate a first action; in response to a second determined position of the second vehicle and the determination that the second vehicle is a winter service vehicle, the first vehicle may be caused to initiate a second action; and in response to the first determined position of the second vehicle and the determination that the second vehicle is not a winter service vehicle, the first vehicle may be caused to initiate a third action. In another example, in response to a first determined position of the second vehicle and the determination that the second vehicle is a winter service vehicle, the first vehicle may be caused to initiate a first action; in response to a second determined position of the second vehicle and the determination that the second vehicle is a winter service vehicle and/or in response to the first determined position of the second vehicle and the determination that the second vehicle is not a winter service vehicle, causing the first vehicle to initiate the first action may be withheld and/or forwent. In an additional example, in response to the determination that the second vehicle is in a lane and/or a planned path of the first vehicle and the determination that the second vehicle is a winter service vehicle, the first vehicle may be caused to initiate a first action; and in response to the determination that the second vehicle is not in a lane and/or is not in a planned path of the first vehicle and the determination that the second vehicle is a winter service vehicle, the first vehicle may be caused to initiate a second action. In yet another example, in response to the determination that the second vehicle is in a lane and/or a planned path of the first vehicle and the determination that the second vehicle is a winter service vehicle, the first vehicle may be caused to initiate a first action; and in response to the determination that the second vehicle is not in a lane and/or is not in a planned path of the first vehicle and the determination that the second vehicle is a winter service vehicle, causing the first vehicle to initiate the first action may be withheld and/or forwent. For example, in response to a first determined position of the second vehicle and a first determined state of the winter service vehicle, the first vehicle may be caused to initiate a first action; in response to a second determined position of the second vehicle and the first determined state of the winter service vehicle, the first vehicle may be caused to initiate a second action; and in response to the first determined position of the second vehicle and a second determined state of the winter service vehicle, the first vehicle may be caused to initiate a third action. In another example, in response to a first determined position of the second vehicle and a first determined state of the winter service vehicle, the first vehicle may be caused to initiate a first action; in response to a second determined position of the second vehicle and the first determined state of the winter service vehicle and/or in response to the first determined position of the second vehicle and a second determined state of the winter service vehicle, causing the first vehicle to initiate the first action may be withheld and/or forwent. In an additional example, in response to the determination that the second vehicle is in a lane and/or a planned path of the first vehicle and a first determined state of the winter service vehicle, the first vehicle may be caused to initiate a first action; and in response to the determination that the second vehicle is not in a lane and/or is not in a planned path of the first vehicle and the first determined state of the winter service vehicle, the first vehicle may be caused to initiate a second action. In yet another example, in response to the determination that the second vehicle is in a lane and/or a planned path of the first vehicle and a first determined state of the winter service vehicle, the first vehicle may be caused to initiate a first action; and in response to the determination that the second vehicle is not in a lane and/or is not in a planned path of the first vehicle and the first determined state of the winter service vehicle, causing the first vehicle to initiate the first action may be withheld and/or forwent.

In some embodiments, systems, methods and computer readable media for controlling vehicles in response to waste collection vehicles are provided. In some embodiments, systems, methods and computer readable media for controlling vehicles in response to waste collection vehicles are provided. One challenge of autonomous driving is to determine when a vehicle is moving slowly for a short period of time and therefore the autonomous vehicle needs to wait for the slow vehicle to resume normal speed, and when the vehicle is moving slowly for a longer period of time and the autonomous vehicle needs to pass the slow moving vehicle. In some cases, identifying that the vehicle is a waste collection vehicle may indicate that the vehicle is moving slowly for a longer period of time. The provided systems, methods and computer readable media for controlling vehicles may detect a vehicle, identify whether the vehicle is a waste collection vehicle, and control a response of an autonomous vehicle to the detected vehicle based on whether the vehicle is a waste collection vehicle.

FIG. 22 illustrates an example of a method 2200 for controlling vehicles in response to waste collection vehicles. In this example, method 2200 may comprise: obtaining images captured from an environment of a first vehicle (Step 710); analyzing the images to detect a second vehicle (Step 720); analyzing the images to determine that the second vehicle is a waste collection vehicle (Step 2230); in response to the determination that the second vehicle is a waste collection vehicle, causing the first vehicle to initiate an action responding to the second vehicle (Step 2240), and in response to the determination that the second vehicle is not a waste collection vehicle, forgoing causing the first vehicle to initiate the action. In some implementations, method 2200 may comprise one or more additional steps, while some of the steps listed above may be modified or excluded. In some implementations, one or more steps illustrated in FIG. 22 may be executed in a different order and/or one or more groups of steps may be executed simultaneously and/or a plurality of steps may be combined into single step and/or a single step may be broken down to a plurality of steps.

In some embodiments, one or more images captured using one or more image sensors from an environment of a first vehicle may be obtained, for example as described above. Further, in some examples, the one or more images may be analyzed to detect a second vehicle, for example as described above. Further, in some examples, the one or more images may be analyzed to determine whether the second vehicle is a waste collection vehicle. Further, in examples, for example in response to the determination that the second vehicle is a waste collection vehicle, the first vehicle may be caused to initiate an action responding to the second vehicle, for example as described above. Some non-limiting examples of such action may include signaling, stopping, changing a speed of the first vehicle, changing a motion direction of the first vehicle, passing the second vehicle, forgoing passing the second vehicle, keeping a minimal distance of at least a selected length from the second vehicle (for example, where the selected distance is at least 20 feet, at least 50 feet, at least 100 feet, at least 190 feet, at least 200 feet, etc.), turning, performing a U-turn, driving in reverse, generating an audible warning, and so forth.

In some embodiments, step 2230 may comprise analyzing the one or more images obtained by step 710 to determine whether the second vehicle detected by step 720 is a waste collection vehicle. Some non-limiting examples of such state may include engaged in waste collection, not engaged in waste collection, and so forth. For example, a machine learning model may be trained using training examples to determine whether vehicles are waste collection vehicles by analyzing images and/or videos, and step 2230 may use the trained machine learning model to analyze the one or more images obtained by step 710 and determine whether the second vehicle detected by step 720 is a waste collection vehicle. An example of such training example may include an image and/or a video depicting a vehicle, together with a label indicating whether the depicted vehicle is a waste collection vehicle. In another example, an artificial neural network (such as a deep neural networks, convolutional neural networks, etc.) may be configured to determine whether vehicles are waste collection vehicles by analyzing images and/or videos, and step 2230 may use the artificial neural network to analyze the one or more images obtained by step 710 and determine whether the second vehicle detected by step 720 is a waste collection vehicle. In yet another example, step 2230 may use image classification algorithms to analyze the one or more images obtained by step 710 and determine whether the second vehicle detected by step 720 is a waste collection vehicle.

In some embodiments, step 2240 may comprise, for example in response to a determination that the second vehicle detected by step 720 is a waste collection vehicle (e.g., as determined by step 2230), causing the first vehicle to initiate an action responding to the second vehicle detected by step 720. Some non-limiting examples of such action may include signaling, stopping, changing a speed of the first vehicle, changing a motion direction of the first vehicle, passing the second vehicle, forgoing passing the second vehicle, keeping a minimal distance of at least a selected length from the second vehicle (for example, where the selected distance is at least 20 feet, at least 50 feet, at least 100 feet, at least 190 feet, at least 200 feet, etc.), turning, performing a U-turn, driving in reverse, generating an audible warning, and so forth. For example, step 2240 may transmit a signal to an external device (such as a device controlling the first vehicle, a device navigating the first vehicle, the first vehicle, a system within the first vehicle, etc.), and the signal may be configured to cause the external device to cause the first vehicle to initiate the action responding to the second vehicle detected by step 720. In another example, step 2240 may provide information related to the second vehicle detected by step 720 (such as position, motion, type, activity status, dimensions, etc.) to such external device, and the information may be configured to cause the external device to cause the first vehicle to initiate the action responding to the second vehicle detected by step 720. In one example, in response to a determination that the second vehicle detected by step 720 is not a waste collection vehicle (e.g., as determined by step 2230), step 2240 may cause the first vehicle to initiate a second action, the second action may differ from the action. In one example, in response to a determination that the second vehicle detected by step 720 is a waste collection vehicle (e.g., as determined by step 2230), step 2240 may cause the first vehicle to initiate a first action, and in response to a determination that the second vehicle detected by step 720 is not a waste collection vehicle (e.g., as determined by step 2230), step 2240 may cause the first vehicle to initiate a second action, the second action may differ from the first action. In another example, in response to a determination that the second vehicle detected by step 720 is a waste collection vehicle (e.g., as determined by step 2230), step 2240 may cause the first vehicle to initiate a first action, and in response to a determination that the second vehicle detected by step 720 is not a waste collection vehicle (e.g., as determined by step 2230), step 2240 may withhold and/or forgo causing the first vehicle to initiate the first action.

In some embodiments, the one or more images obtained by step 710 may be analyzed to determine whether a waste pre-compressor is mounted to the second vehicle detected by step 720, for example as described below. Further, in some examples, in response to a determination that a waste pre-compressor is mounted to the second vehicle, step 2230 may determine that the second vehicle detected by step 720 is a waste collection vehicle. Further, in some examples, in response to a determination that no waste pre-compressor is mounted to the second vehicle detected by step 720, step 2230 may determine that the second vehicle detected by step 720 is not a waste collection vehicle.

In some examples, the one or more images obtained by step 710 may be analyzed to determine whether a waste pre-compressor is mounted to the second vehicle detected by step 720. For example, a machine learning model may be trained using training examples to determine whether vehicles are mounted to waste pre-compressors, and the trained machine learning model may be used to analyze the one or more images obtained by step 710 and determine whether a waste pre-compressor is mounted to the second vehicle detected by step 720. An example of such training example may include an image and/or a video depicting a vehicle, together with a label indicating whether the depicted vehicle is mounted to a waste pre-compressor. In another example, an artificial neural network (such as a deep neural networks, convolutional neural networks, etc.) may be configured to determine whether vehicles are mounted to waste pre-compressors from images and/or videos, and the artificial neural network may be used to analyze the one or more images obtained by step 710 and determine whether a waste pre-compressor is mounted to the second vehicle detected by step 720. In yet another example, object detection algorithms (such as visual waste pre-compressor detectors) may be used to detect waste pre-compressors in the one or more images obtained by step 710, the location of the detected waste pre-compressors may be compared to the location of the second vehicle detected by step 720, and when a location of a detected waste pre-compressor is adjunct to the location of the second vehicle detected by step 720, it may be determined that the waste pre-compressor is mounted to the second vehicle.

In some embodiments, the one or more images obtained by step 710 may be analyzed to detect waste collector person in a vicinity of the second vehicle detected by step 720. Further, in some examples, in response to a determination that a waste collector person is in a vicinity of the second vehicle detected by step 720, step 2230 may determine that the second vehicle detected by step 720 is a waste collection vehicle, and in response to a determination that no waste collector person is in a vicinity of the second vehicle detected by step 720, step 2230 may determine that the second vehicle detected by step 720 is not a waste collection vehicle.

In some examples, the one or more images obtained by step 710 may be analyzed to detect waste collector person in a vicinity of the second vehicle detected by step 720. For example, a machine learning model may be trained using training examples to detect waste collector people in images and/or videos, and the trained machine learning model may be used to analyze the one or more images obtained by step 710 and detect a waste collector person in a vicinity of the second vehicle detected by step 720. An example of such training example may include an image and/or a video, together with a label indicating whether a waste collector person appears in a particular area of the image and/or of the video. In another example, an artificial neural network (such as a deep neural networks, convolutional neural networks, etc.) may be configured to detect waste collector people in images and/or videos, and the artificial neural network may be used to analyze the one or more images obtained by step 710 and detect a waste collector person in a vicinity of the second vehicle detected by step 720. In yet another example, a person detection algorithm may be used to detect waste collector person in a vicinity of the second vehicle detected by step 720 in the one or more images obtained by step 710.

In some embodiments, a state of the waste collection vehicle may be determined, for example as described below. Some non-limiting examples of such state may include engaged in waste collection, not engaged in waste collection, and so forth. In some examples, in response to a first determined state of the waste collection vehicle (such as engaged in waste collection, not engaged in waste collection, etc.), step 2240 may cause the first vehicle to initiate a first action responding to the second vehicle detected by step 720, and in response to a second determined state of the waste collection vehicle (such as engaged in waste collection, not engaged in waste collection, etc.), step 2240 may withhold and/or forgo causing the first vehicle to initiate the first action. In some examples, in response to a first determined state of the waste collection vehicle (such as engaged in waste collection, not engaged in waste collection, etc.), step 2240 may cause the first vehicle to initiate a first action responding to the second vehicle detected by step 720, and in response to a second determined state of the waste collection vehicle (such as engaged in waste collection, not engaged in waste collection, etc.), step 2240 may cause the first vehicle to initiate a second action responding to the second vehicle detected by step 720, where the second action may differ from the first action.

In some examples, the one or more images obtained by step 710 may be analyzed to determine a state of the waste collection vehicle. Some non-limiting examples of such state may include engaged in waste collection, not engaged in waste collection, and so forth. For example, a machine learning model may be trained using training examples to determine states of waste collection vehicles by analyzing images and/or videos, and the trained machine learning model may be used to analyze the one or more images obtained by step 710 and determine the state of the waste collection vehicle. An example of such training example may include an image and/or a video depicting a waste collection vehicle, together with a label indicating the state of the depicted waste collection vehicle. In another example, an artificial neural network (such as a deep neural networks, convolutional neural networks, etc.) may be configured to determine states of waste collection vehicles by analyzing images and/or videos, and the artificial neural network may be used to analyze the one or more images obtained by step 710 and determine the state of the waste collection vehicle.

In some examples, audio data captured using one or more audio sensors from an environment of the first vehicle may be obtained and/or analyzed to determine a state of the waste collection vehicle. Some non-limiting examples of such state may include engaged in waste collection, not engaged in waste collection, and so forth. For example, a machine learning model may be trained using training examples to determine states of waste collection vehicles by analyzing audio inputs, and the trained machine learning model may be used to analyze the captured audio data and determine the state of the waste collection vehicle. An example of such training example may include an audio recording of a waste collection vehicle, together with a label indicating the state of the waste collection vehicle. In another example, an artificial neural network (such as a recurrent neural networks, long short-term memory neural networks, etc.) may be configured to determine states of waste collection vehicles by analyzing audio inputs, and the artificial neural network may be used to analyze the captured audio data and determine the state of the waste collection vehicle. In yet another example, signal processing algorithms may be used to analyze the captured audio data and determine whether the waste collection vehicle is engaged in waste collection or not.

In some examples, a motion of the second vehicle may be determined, for example as described above. Further, in some examples, in response to the determined motion of the second vehicle and/or the determination that the second vehicle is a waste collection vehicle and/or based on the determined state of the waste collection vehicle, the first vehicle may be caused to initiate the action (for example as described above). For example, in response to a first determined motion of the second vehicle and the determination that the second vehicle is a waste collection vehicle, the first vehicle may be caused to initiate a first action; in response to a second determined motion of the second vehicle and the determination that the second vehicle is a waste collection vehicle, the first vehicle may be caused to initiate a second action; and in response to the first determined motion of the second vehicle and the determination that the second vehicle is not a waste collection vehicle, the first vehicle may be caused to initiate a third action. In another example, in response to a first determined motion of the second vehicle and the determination that the second vehicle is a waste collection vehicle, the first vehicle may be caused to initiate a first action; and in response to a second determined motion of the second vehicle and the determination that the second vehicle is a waste collection vehicle, causing the first vehicle to initiate the first action may be withheld and/or forwent. For example, in response to a first determined motion of the second vehicle and a first determined state of the waste collection vehicle, the first vehicle may be caused to initiate a first action; in response to a second determined motion of the second vehicle and the first determined state of the waste collection vehicle, the first vehicle may be caused to initiate a second action; and in response to the first determined motion of the second vehicle and a second determined state of the waste collection vehicle, the first vehicle may be caused to initiate a third action. In another example, in response to a first determined motion of the second vehicle and a first determined state of the waste collection vehicle, the first vehicle may be caused to initiate a first action; in response to a second determined motion of the second vehicle and the first determined state of the waste collection vehicle and/or in response to the first determined motion of the second vehicle and a second determined state of the waste collection vehicle, causing the first vehicle to initiate the first action may be withheld and/or forwent.

In some examples, it may be determining that the second vehicle is signaling, for example as described above. Further, in some examples, a type of the signaling of the second vehicle may be determined, for example as described above. Some non-limiting examples of such type of signaling may include signaling using light, signaling using sound, signaling left, signaling right, signaling break, signaling hazard warning, signaling reversing, signaling warning, and so forth. Further, in some examples, in response to the determination that the second vehicle is signaling and/or the determined type of the signaling and/or the determination that the second vehicle is a waste collection vehicle and/or based on the determined state of the waste collection vehicle, the first vehicle may be caused to initiate the action (for example as described above). For example, in response to a first determined type of the signaling and the determination that the second vehicle is a waste collection vehicle, the first vehicle may be caused to initiate a first action; in response to a second determined type of the signaling and the determination that the second vehicle is a waste collection vehicle, the first vehicle may be caused to initiate a second action; and in response to the first determined type of the signaling and the determination that the second vehicle is not a waste collection vehicle, the first vehicle may be caused to initiate a third action. In another example, in response to a first determined type of the signaling and the determination that the second vehicle is a waste collection vehicle, the first vehicle may be caused to initiate a first action; in response to a second determined type of the signaling and the determination that the second vehicle is a waste collection vehicle and/or in response to the first determined type of the signaling and the determination that the second vehicle is not a waste collection vehicle, causing the first vehicle to initiate the first action may be withheld and/or forwent. For example, in response to a first determined type of the signaling and a first determined state of the waste collection vehicle, the first vehicle may be caused to initiate a first action; in response to a second determined type of the signaling and the first determined state of the waste collection vehicle, the first vehicle may be caused to initiate a second action; and in response to the first determined type of the signaling and a second determined state of the waste collection vehicle, the first vehicle may be caused to initiate a third action. In another example, in response to a first determined type of the signaling and a first determined state of the waste collection vehicle, the first vehicle may be caused to initiate a first action; in response to a second determined type of the signaling and the first determined state of the waste collection vehicle and/or in response to the first determined type of the signaling and a second determined state of the waste collection vehicle, causing the first vehicle to initiate the first action may be withheld and/or forwent. In an additional example, in response to the determination that the second vehicle is signaling and the determination that the second vehicle is a waste collection vehicle, the first vehicle may be caused to initiate a first action; and in response to the determination that the second vehicle is not signaling and the determination that the second vehicle is a waste collection vehicle, the first vehicle may be caused to initiate a second action. In yet another example, in response to the determination that the second vehicle is signaling and the determination that the second vehicle is a waste collection vehicle, the first vehicle may be caused to initiate a first action; and in response to the determination that the second vehicle is not signaling and the determination that the second vehicle is a waste collection vehicle, causing the first vehicle to initiate the first action may be withheld and/or forwent. In an additional example, in response to the determination that the second vehicle is signaling and a first determined state of the waste collection vehicle, the first vehicle may be caused to initiate a first action; and in response to the determination that the second vehicle is not signaling and the first determined state of the waste collection vehicle, the first vehicle may be caused to initiate a second action. In yet another example, in response to the determination that the second vehicle is signaling and a first determined state of the waste collection vehicle, the first vehicle may be caused to initiate a first action; and in response to the determination that the second vehicle is not signaling and the first determined state of the waste collection vehicle, causing the first vehicle to initiate the first action may be withheld and/or forwent.

In some examples, a position of the second vehicle may be determined, for example as described above. For example, the determined position may be in relation to the ground, in relation to a map, in relation to a road, in relation to a lane, in relation to an object in the environment, in relation to the at least part of the first vehicle, in relation to the image sensor, and so forth. Further, in some examples, it may be determining that the second vehicle is in a lane of the first vehicle, for example as described above. Further, in some examples, it may be determining that the second vehicle is in a planned path of the first vehicle, for example as described above. Further, in some examples, in response to the determined position of the second vehicle and/or the determination that the second vehicle is a waste collection vehicle and/or based the first determined state of the waste collection vehicle, the first vehicle may be caused to initiate the action (for example as described above). For example, in response to a first determined position of the second vehicle and the determination that the second vehicle is a waste collection vehicle, the first vehicle may be caused to initiate a first action; in response to a second determined position of the second vehicle and the determination that the second vehicle is a waste collection vehicle, the first vehicle may be caused to initiate a second action; and in response to the first determined position of the second vehicle and the determination that the second vehicle is not a waste collection vehicle, the first vehicle may be caused to initiate a third action. In another example, in response to a first determined position of the second vehicle and the determination that the second vehicle is a waste collection vehicle, the first vehicle may be caused to initiate a first action; in response to a second determined position of the second vehicle and the determination that the second vehicle is a waste collection vehicle and/or in response to the first determined position of the second vehicle and the determination that the second vehicle is not a waste collection vehicle, causing the first vehicle to initiate the first action may be withheld and/or forwent. In an additional example, in response to the determination that the second vehicle is in a lane and/or a planned path of the first vehicle and the determination that the second vehicle is a waste collection vehicle, the first vehicle may be caused to initiate a first action; and in response to the determination that the second vehicle is not in a lane and/or is not in a planned path of the first vehicle and the determination that the second vehicle is a waste collection vehicle, the first vehicle may be caused to initiate a second action. In yet another example, in response to the determination that the second vehicle is in a lane and/or a planned path of the first vehicle and the determination that the second vehicle is a waste collection vehicle, the first vehicle may be caused to initiate a first action; and in response to the determination that the second vehicle is not in a lane and/or is not in a planned path of the first vehicle and the determination that the second vehicle is a waste collection vehicle, causing the first vehicle to initiate the first action may be withheld and/or forwent. For example, in response to a first determined position of the second vehicle and a first determined state of the waste collection vehicle, the first vehicle may be caused to initiate a first action; in response to a second determined position of the second vehicle and the first determined state of the waste collection vehicle, the first vehicle may be caused to initiate a second action; and in response to the first determined position of the second vehicle and a second determined state of the waste collection vehicle, the first vehicle may be caused to initiate a third action. In another example, in response to a first determined position of the second vehicle and a first determined state of the waste collection vehicle, the first vehicle may be caused to initiate a first action; in response to a second determined position of the second vehicle and the first determined state of the waste collection vehicle and/or in response to the first determined position of the second vehicle and a second determined state of the waste collection vehicle, causing the first vehicle to initiate the first action may be withheld and/or forwent. In an additional example, in response to the determination that the second vehicle is in a lane and/or a planned path of the first vehicle and a first determined state of the waste collection vehicle, the first vehicle may be caused to initiate a first action; and in response to the determination that the second vehicle is not in a lane and/or is not in a planned path of the first vehicle and the first determined state of the waste collection vehicle, the first vehicle may be caused to initiate a second action. In yet another example, in response to the determination that the second vehicle is in a lane and/or a planned path of the first vehicle and a first determined state of the waste collection vehicle, the first vehicle may be caused to initiate a first action; and in response to the determination that the second vehicle is not in a lane and/or is not in a planned path of the first vehicle and the first determined state of the waste collection vehicle, causing the first vehicle to initiate the first action may be withheld and/or forwent.

In some embodiments, systems, methods and computer readable media for controlling vehicles in response to windows are provided. One challenge of autonomous driving is to identify stopping positions for the autonomous vehicle. The provided systems, methods and computer readable media for controlling vehicles may detect a window in the environment (such as a drive-through window, a window of another vehicle, a gatekeeper window, etc.), and select the stopping position based on the detected window.

FIG. 23 illustrates an example of a method 2300 for controlling vehicles in response to windows. In this example, method 2300 may comprise: obtaining images captured from an environment of a vehicle (Step 710); analyzing the images to detect a first window in the environment (Step 2320); and navigating the vehicle to a stopping position (Step 2330), where in the stopping position a window of the vehicle is positioned at a selected position with respect to the first window. In some implementations, method 2300 may comprise one or more additional steps, while some of the steps listed above may be modified or excluded. In some implementations, one or more steps illustrated in FIG. 23 may be executed in a different order and/or one or more groups of steps may be executed simultaneously and/or a plurality of steps may be combined into single step and/or a single step may be broken down to a plurality of steps. Some non-limiting examples of such first window may include a window of a building, a window of a second vehicle, a window configured to allow a service provider (such as a sales person, a gatekeeper, etc.) to communicate with a passenger of the vehicle, a window configured to allow a service provider to exchange items (such as payment methods, products, etc.) with a passenger of the vehicle, a drive-through window, allow a service provider to deliver an item to a passenger of the vehicle, allow a service provider to receive an item to a passenger of the vehicle, and so forth.

In some embodiments, step 2320 may comprise analyzing the one or more images obtained by step 710 to detect a first window in the environment. For example, step 2320 may use an object detection algorithm to detect the window. In another example, a machine learning model may be trained using training examples to detect windows in images and/or videos, and step 2320 may use the trained machine learning model to analyze the one or more images obtained by step 710 to detect the first window. An example of such training example may include an image and/or a video, together with a label indicating a depiction of a window in the image and/or in the video, or together with a label indicating that no window in depicted in the image and/or in the video. In yet another example, an artificial neural network (such as a deep neural networks, convolutional neural networks, etc.) may be configured to detect windows in images and/or videos, and step 2320 may use the artificial neural network to analyze the one or more images obtained by step 710 to detect the first window.

In some embodiments, step 2330 may comprise navigating the vehicle to a stopping position, where in the stopping position a window of the vehicle is positioned at a selected position with respect to the first window. For example, at the stopping position the window of the vehicle may be positioned less than a selected distance from the first window (for example, less than two meters, less than one meter, than half meter, less than one decimeter, and so forth). In another example, at the stopping position the window of the vehicle may be positioned substantially parallel to the first window (for example, where the degree between the window of the vehicle and the first window is at most one degree, is at most two degrees, is at most five degrees, is at most ten degrees, is at most twenty degrees, and so forth). In some examples, step 2330 may select the stopping position (such as a real world position, a relative position with respect to the window, a relative position with respect to the current position of the vehicle, a set of coordinates, an orientation, a direction, etc.) based on properties of the first window. Some non-limiting examples of such properties of the first window may include absolute real world position of the window, relative real world position of the window (for example, with respect to the vehicle, with respect to the ground, etc.), position of the window in the one or more images, type of window, state of the window (such as 'close', 'open', 'partly close', 'fully open', 'active', 'operative', 'occupied', 'idle', 'out of service', 'inoperative', "unoccupied', etc.), height of the window (for example, with respect to ground, absolute, etc.), dimensions of the window (such as width, height, area, etc.), and so forth. For example, such properties of the first window may be determined by analyzing the one or more images, for example using a classification model, using an object detection algorithm, and so forth. In another example, the first window (or an external system associated with the first window) may be configured to transmit a signal indicating one or more such properties of the first window, and the properties of the first window may be determined by receiving and/or analyzing the transmitted signal. In one example, in response to a first determined property of the first window, step 2330 may select a first stopping position, and in response to a second determined property of the first window, step 2330 may select a second stopping position, the second stopping position may differ from the first stopping position. In some examples, step 2330 may transmit a signal to an external device (such as a device controlling the vehicle, a device navigating the vehicle, the vehicle, a system within the vehicle, etc.), and the signal may be configured to cause the external device to cause the vehicle to move to the stopping position. In another example, information related to the stopping position and/or the first window may be provided to such external device, and the information may cause the external device to cause the vehicle to move to the stopping position.

In some embodiments, method 2300 may further comprise causing the window of the vehicle to open, for example after step 2330, before step 2330, concurrently with step 2330, and so forth. For example, a signal may be transmitted to an external device (such as a device controlling the window of the vehicle, a device controlling the vehicle, the vehicle, a system within the vehicle, etc.), and the signal may be configured to cause the external device to cause the window of the vehicle to open.

In some examples, method 2300 may further comprise analyzing the one or more images obtained by step 710 to determine a state of the first window, for example as described below. In some other examples, the first window (or an external system associated with the first window) may be configured to transmit a signal indicating the state of the first window, and the state of the first window may be determined by receiving and/or analyzing the transmitted signal. Further, in some examples, in response to a first determined state of the first window, step 2330 may navigate the vehicle to the stopping position, and in response to a second determined state of the first window, step 2330 may forgo navigating the vehicle to the stopping position. Some non-limiting examples of such first determined state may include 'open', 'active', 'operative', 'occupied', and so forth. Some non-limiting examples of such second determined state of the first window may include 'close', 'out of service', 'inoperative', "unoccupied', and so forth.

In some examples, the one or more images obtained by step 710 may be analyzed to determine a state of the first window. Some non-limiting examples of such state may include 'close', 'open', 'partly close', 'fully open', 'active', 'operative', 'occupied', 'idle', 'out of service', 'inoperative', "unoccupied', and so forth. For example, a machine learning model may be trained using training examples to determine states of windows from images and/or videos, and the trained machine learning model may be used to analyze the one or more images obtained by step 710 to determine a state of the first window. An example of such training examples may include an image and/or a video depicting a window, together with a label indicating the state of the depicted window. In one example, a visual indicator (such as a sign, a 'Sorry We're Closed' sign, an 'Open' sign, a led indicator, a visual textual indicator, etc.) may indicate the state of the first window, the analysis of the one or more images obtained by step 710 may identify the visual indicator and determine the state of the first window based on the identified visual indicator. In another example, the analysis of the one or more images obtained by step 710 may identify whether a person occupies a station corresponding to the first window (for example, using a face detector, using an image classification algorithm, etc.) and determine the state of the first window based on whether a person occupies the station.

In some embodiments, step 2330 may select the selected position with respect to the first window based on an analysis of the one or more images obtained by Step 710. For example, a machine learning model may be trained using training examples to select position with respect to windows from images and/or videos, and step 2330 may use the trained machine learning model to analyze the one or more images obtained by Step 710 and select the selected position with respect to the first window. An example of such training example may include a sample image of a sample window, together with a label indicating a desired selection of position with respect to the sample window. In one example, the one or more images obtained by Step 710 may be analyzed to determine a type of the first window (for example, using an image classifier trained to classify windows to different type using training examples), and step 2330 may select the selected position with respect to the first window based on the determined type of the first window. Some non-limiting examples of such type may include service window, casement, awning, manned, unmanned, openable, open, close, a drive-through window, a window of another vehicle, a gatekeeper window, and so forth. In another example, the one or more images obtained by Step 710 may be analyzed to estimate a height of the first window (for example, by analyzing depth image to directly measure the height from the image, by estimating the height from a 2D image using a model configured to estimate 3D positions from 2D images, and so forth), and step 2330 may select the selected position with respect to the first window based on the estimated height of the first window. The height may be estimated relative to a ground, relative to another object, relative to a road, relative to the vehicle, absolute, and so forth. In yet another example, the one or more images may be analyzed to determine road conditions in a vicinity of the first window, and step 2330 may select the selected position with respect to the first window based on the determined road conditions in the vicinity of the first window. Some non-limiting examples of such road conditions may include dry, wet, icy, snowy, cracked, blocked, partly blocked, and so forth. For example, a machine learning model may be trained using training examples to determine road conditions in an area from images, and step 2330 may use the trained machine learning model to analyze the one or more images and determine road conditions in a vicinity of the first window. An example of such training example may include a sample image of a sample road with an indication of an area, together with a label indicating a condition of the sample road.

In some embodiments, the first window may be configured to allow a service provider to exchange items with a passenger of the vehicle. Further, in some examples, method 2300 may comprise obtaining one or more additional images captured from the environment, and analyzing the one or more additional images to determine a transfer of at least one item between the service provider and the passenger of the vehicle through the first window. For example, method 2300 may analyze the one or more additional images to determine a transfer of items of particular types, of items of particular dimensions, of items of any type, and so forth. For example, the one or more additional images may be captured after step 2330, any may be obtained using step 710. For example, the one or more additional images may be captured using at least one image sensor included in the one or more image sensors used to capture the one or more images of method 2300, using at least one image sensor not included in the one or more image sensors used to capture the one or more images of method 2300, and so forth. In one example, a machine learning model may be trained using training examples to determine that items are transferred between service providers and passengers of vehicles through windows (for example, of items of particular types, of items of particular dimensions, of items of any type, etc.), and the trained machine learning model may be used to analyze the additional one or more images and determine the transfer of the at least one item between the service provider and the passenger of the vehicle through the first window. An example of such training example may include an image and/or a video, together with a label indicating whether the image and/or the video depicts a transfer of an item (or of an item of a particular type, an item of particular dimension, etc.) between a service providers and a passenger of a vehicle through a window. In one example, an artificial neural network (such as a deep neural networks, convolutional neural networks, etc.) may be configured to determine that items are transferred between service providers and passengers of vehicles through windows (for example, of items of particular types, of items of particular dimensions, of items of any type, etc.), and the artificial neural network may be used to analyze the additional one or more images and determine the transfer of the at least one item between the service provider and the passenger of the vehicle through the first window.

In some examples, method 2300 may further comprise causing an action and/or providing information in response to a determination of the transfer of the at least one item (or of an item of a particular type, an item of particular dimension, etc.) between the service provider and the passenger of the vehicle through the first window. Some non-limiting examples of such actions may include navigating the vehicle (for example, from the stopping position, to a selected position, in a selected direction, etc.), moving the vehicle, closing the first window, recording the transfer of the at least one item, updating billing records according to the transfer of the at least one item, and so forth.

In some embodiments, the first window may be configured to allow a service provider to communicate with a passenger of the vehicle. Further, in some examples, method 2300 may further comprise obtaining audio data captured using one or more audio sensors, the obtained audio data may include a communication between the service provider and the passenger of the vehicle through the first window, and analyzing the communication between the service provider and the passenger of the vehicle. For example, the obtained audio data may be analyzed using speech recognition algorithms to determine the content of the communication between the service provider and the passenger of the vehicle, and the content of the communication may be analyzed, for example using a Natural Language Processing algorithms. In another example, the obtained audio data may be analyzed using speaker recognition algorithms to determine an amount of communication between the service provider and the passenger of the vehicle (or an amount of speech produced by the passenger in the communication, an amount of speech produced by the service provider in the communication, and so forth). In some examples, the obtained audio data may be analyzed to determine an ending of communication between the service provider and the passenger of the vehicle. For example, a machine learning model may be trained using training examples to identify endings of conversations in audio streams, and the trained machine learning model may be used to analyze the obtained audio data and determine the ending of communication between the service provider and the passenger of the vehicle. An example of such training example may include an audio recording, together with a label indicating an ending of a conversation within the audio recording. In another example, an artificial neural network (such as a recurrent neural networks, long short-term memory neural networks, etc.) may be configured to identify endings of conversations in audio streams, and the artificial neural network may be used to analyze the obtained audio data and determine the ending of communication between the service provider and the passenger of the vehicle.

In one example, method 2300 may further comprise causing an action and/or providing information based on the analysis of the communication between the service provider and the passenger of the vehicle. In one example, method 2300 may further comprise causing the first window to close based on the analysis of the communication between the service provider and the passenger of the vehicle, for example in response to a determination of the ending of communication between the service provider and the passenger of the vehicle. In another example, method 2300 may further comprise causing the first vehicle to move based on the analysis of the communication between the service provider and the passenger of the vehicle. For example, method 2300 may cause the first vehicle to move to a position selected based on the analysis of the communication between the service provider and the passenger of the vehicle, to a direction selected based on the analysis of the communication between the service provider and the passenger of the vehicle, and so forth.

It will also be understood that the system according to the invention may be a suitably programmed computer, the computer including at least a processing unit and a memory unit. For example, the computer program can be loaded onto the memory unit and can be executed by the processing unit. Likewise, the invention contemplates a computer program being readable by a computer for executing the method of the invention. The invention further contemplates a machine-readable memory tangibly embodying a program of instructions executable by the machine for executing the method of the invention.

What is claimed is:

1. A non-transitory computer readable medium storing a software program comprising data and computer implementable instructions that when executed by at least one processor cause the at least one processor to perform operations for controlling vehicles in response to outriggers, the operations comprising:
   obtaining one or more images captured using one or more image sensors from an environment of a first vehicle;
   analyzing the one or more images to detect a second vehicle;
   analyzing the one or more images to determine that the second vehicle is connected to an outrigger;
   analyzing the one or more images to determine a state of the outrigger;
   causing the first vehicle to initiate an action responding to the second vehicle based on the determined state of the outrigger.

2. The non-transitory computer readable medium of claim 1, wherein the operations further comprise:
   in response to a first determined state of the outrigger, causing the first vehicle to initiate the action responding to the second vehicle; and
   in response to a second determined state of the outrigger, forgoing causing the first vehicle to initiate the action.

3. The non-transitory computer readable medium of claim 2, wherein in response to the second determined state of the outrigger, causing the first vehicle to initiate a second action, wherein the second action differs from the action.

4. The non-transitory computer readable medium of claim 1, wherein the action comprises at least one of signaling, changing a speed of the first vehicle, changing a motion direction of the first vehicle, driving in reverse, or generating an audible warning.

5. The non-transitory computer readable medium of claim 1, wherein the action is selected based on the determined state of the outrigger.

6. The non-transitory computer readable medium of claim 1, wherein the determined state of the outrigger is outrigger in use.

7. The non-transitory computer readable medium of claim 1, wherein the determined state of the outrigger is outrigger lifting at least part of the second vehicle.

8. The non-transitory computer readable medium of claim 1, wherein the determined state of the outrigger is outrigger not in use.

9. The non-transitory computer readable medium of claim 1, wherein the determined state of the outrigger is outrigger is touching the ground.

10. The non-transitory computer readable medium of claim 1, wherein the determined state of the outrigger is based on an orientation of at least part of the outrigger in relation to at least part of the second vehicle.

11. The non-transitory computer readable medium of claim 1, wherein the determined state of the outrigger is based on an orientation of at least part of the outrigger in relation to ground.

12. The non-transitory computer readable medium of claim 1, wherein the determined state of the outrigger is based on a distance of at least part of the outrigger from at least a part of the second vehicle.

13. The non-transitory computer readable medium of claim 1, wherein the determined state of the outrigger is based on a distance of at least part of the outrigger from ground.

14. The non-transitory computer readable medium of claim 1, wherein the determined state of the outrigger is based on a motion of at least part of the outrigger in relation to at least part of the second vehicle.

15. The non-transitory computer readable medium of claim 1, wherein the operations further comprise:
 determining a motion of the second vehicle; and
 further basing the causing the first vehicle to initiate the action on the determined motion of the second vehicle.

16. The non-transitory computer readable medium of claim 1, wherein the operations further comprise:
 determining that the second vehicle is signaling; and
 further basing the causing the first vehicle to initiate the action on the determination that the second vehicle is signaling.

17. The non-transitory computer readable medium of claim 1, wherein the operations further comprise:
 determining that the second vehicle is in a lane of the first vehicle; and
 further basing the causing the first vehicle to initiate the action on the determination that the second vehicle is in the lane of the first vehicle.

18. The non-transitory computer readable medium of claim 1, wherein the operations further comprise:
 determining that the second vehicle is in a planned path of the first vehicle; and
 further basing the causing the first vehicle to initiate the action on the determination that the second vehicle is in the planned path of the first vehicle.

19. A system for controlling vehicles in response to outriggers, the system comprising:
 at least one processing unit configured to perform operations, the operations comprise:
  obtaining one or more images captured using one or more image sensors from an environment of a first vehicle;
  analyzing the one or more images to detect a second vehicle;
  analyzing the one or more images to determine that the second vehicle is connected to an outrigger;
  analyzing the one or more images to determine a state of the outrigger;
  causing the first vehicle to initiate an action responding to the second vehicle based on the determined state of the outrigger.

20. A method for controlling vehicles in response to outriggers, the method comprising:
 obtaining one or more images captured using one or more image sensors from an environment of a first vehicle;
 analyzing the one or more images to detect a second vehicle;
 analyzing the one or more images to determine that the second vehicle is connected to an outrigger;
 analyzing the one or more images to determine a state of the outrigger;
 causing the first vehicle to initiate an action responding to the second vehicle based on the determined state of the outrigger.

* * * * *